(12) United States Patent
Golden et al.

(10) Patent No.: US 9,012,353 B2
(45) Date of Patent: Apr. 21, 2015

(54) PALLADIUM SOLID SOLUTION CATAYST AND METHODS OF MAKING

(75) Inventors: Stephen J. Golden, Santa Barbara, CA (US); Randal Hatfield, Oxnard, CA (US); Jason D. Pless, Pottstown, PA (US); Johnny T. Ngo, Oxnard, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 13/569,724

(22) Filed: Aug. 8, 2012

(65) Prior Publication Data

US 2013/0236380 A1 Sep. 12, 2013

Related U.S. Application Data

(60) Provisional application No. 61/521,835, filed on Aug. 10, 2011.

(51) Int. Cl.
*B01J 21/00* (2006.01)
*B01J 21/04* (2006.01)
(Continued)

(52) U.S. Cl.
CPC ............... *B01J 23/63* (2013.01); *F01N 3/101* (2013.01); *F01N 2510/0684* (2013.01); *F01N 2570/16* (2013.01); *Y02T 10/22* (2013.01); *B01D 53/945* (2013.01); *B01D 2255/1023* (2013.01); *B01D 2255/204* (2013.01); *B01D 2255/2061* (2013.01); *B01D 2255/2063* (2013.01); *B01D 2255/2065* (2013.01); *B01D 2255/2068* (2013.01); *B01D 2255/2073* (2013.01); *B01D 2255/20753* (2013.01); *B01D 2255/20761* (2013.01); *B01D 2255/407* (2013.01); *B01D 2255/908* (2013.01); *B01J 37/0244* (2013.01); *B01J 37/038* (2013.01); *B01J 35/0006* (2013.01); *B01J 23/002* (2013.01); *B01J 23/34* (2013.01); *B01J 23/44* (2013.01); *B01J 23/83* (2013.01); *B01J 35/002* (2013.01); *B01J 35/0073* (2013.01); *B01J 37/0036* (2013.01);
(Continued)

(58) Field of Classification Search
CPC .......... B01J 21/066; B01J 23/10; B01J 23/34; B01J 23/40; B01J 23/42; B01J 23/44; B01J 23/56; B01J 23/58; B01J 23/63; B01J 23/6562; B01J 23/70; B01J 23/72; B01J 23/755; B01J 23/78; B01J 23/83; B01J 23/8892; B01J 23/892; B01J 23/8926; B01J 23/894; B01J 23/8946; B01J 23/8986
USPC ......... 502/258, 259, 261, 262, 302–304, 324, 502/326–328, 331–335, 337, 339, 345, 346, 502/349, 355, 439
See application file for complete search history.

(56) References Cited

U.S. PATENT DOCUMENTS 4,868,148 A * 9/1989 Henk et al. .................. 502/303
4,923,842 A * 5/1990 Summers ..................... 502/261

(Continued)

*Primary Examiner* — Cam N. Nguyen
(74) *Attorney, Agent, or Firm* — Thaddius J. Carvis

(57) ABSTRACT

Disclosed are three-way catalysts that are able to simultaneously convert nitrogen oxides, carbon monoxide, and hydrocarbons in exhaust gas emissions into less toxic compounds. Also disclosed are three-way catalyst formulations comprising palladium (Pd)-containing oxygen storage materials. In some embodiments, the three-way catalyst formulations of the invention do not contain rhodium. Further disclosed are improved methods for making Pd-containing oxygen storage materials. The relates to methods of making and using three-way catalyst formulations of the invention.

15 Claims, 27 Drawing Sheets

(51) Int. Cl.

| | |
|---|---|
| *B01J 23/00* | (2006.01) |
| *B01J 23/02* | (2006.01) |
| *B01J 23/08* | (2006.01) |
| *B01J 23/10* | (2006.01) |
| *B01J 23/32* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01J 23/70* | (2006.01) |
| *B01J 23/72* | (2006.01) |
| *B01J 23/63* | (2006.01) |
| *F01N 3/10* | (2006.01) |
| *B01D 53/94* | (2006.01) |
| *B01J 37/02* | (2006.01) |
| *B01J 37/03* | (2006.01) |
| *B01J 35/00* | (2006.01) |
| *B01J 23/34* | (2006.01) |
| *B01J 23/83* | (2006.01) |
| *B01J 37/00* | (2006.01) |

(52) U.S. Cl.
    CPC .......... *B01J 37/0201* (2013.01); *B01J 2523/00* (2013.01)

(56) References Cited

U.S. PATENT DOCUMENTS

| | | | | |
|---|---|---|---|---|
| 5,597,771 | A * | 1/1997 | Hu et al. | 502/304 |
| 5,898,014 | A * | 4/1999 | Wu et al. | 502/302 |
| 5,948,723 | A * | 9/1999 | Sung | 502/303 |
| 6,087,298 | A * | 7/2000 | Sung et al. | 502/333 |
| 6,528,451 | B2 * | 3/2003 | Koranne et al. | 502/304 |
| 6,585,944 | B1 * | 7/2003 | Nunan et al. | 423/239.1 |
| 6,680,036 | B1 * | 1/2004 | Fisher et al. | 423/213.2 |
| 6,764,665 | B2 * | 7/2004 | Deeba et al. | 423/239.1 |
| 7,229,948 | B2 * | 6/2007 | Chigapov et al. | 502/327 |
| 7,396,516 | B2 * | 7/2008 | Fisher et al. | 423/213.2 |
| 7,485,599 | B2 * | 2/2009 | Muhammed et al. | 502/304 |
| 7,517,510 | B2 * | 4/2009 | Chen et al. | 423/213.2 |
| 7,550,124 | B2 * | 6/2009 | Chen et al. | 423/213.2 |
| 7,754,171 | B2 * | 7/2010 | Chen et al. | 423/213.2 |
| 7,758,834 | B2 * | 7/2010 | Chen et al. | 423/213.2 |
| 7,795,172 | B2 * | 9/2010 | Foong et al. | 502/327 |
| 7,811,962 | B2 * | 10/2010 | Hu et al. | 502/304 |
| 7,875,250 | B2 * | 1/2011 | Nunan | 422/177 |
| 7,879,755 | B2 * | 2/2011 | Wassermann et al. | 502/304 |
| 8,007,750 | B2 * | 8/2011 | Chen et al. | 423/239.1 |
| 8,148,290 | B2 * | 4/2012 | Mueller et al. | 502/300 |
| 8,211,392 | B2 * | 7/2012 | Grubert et al. | 423/213.2 |
| 8,246,923 | B2 * | 8/2012 | Southward et al. | 423/213.5 |
| 8,323,599 | B2 * | 12/2012 | Nunan et al. | 423/213.2 |
| 8,530,372 | B2 * | 9/2013 | Luo et al. | 502/303 |
| 8,697,600 | B2 * | 4/2014 | Nobukawa et al. | 502/327 |
| 8,828,343 | B2 * | 9/2014 | Liu et al. | 423/213.5 |
| 8,833,064 | B2 * | 9/2014 | Galligan et al. | 60/299 |
| 2002/0032123 | A1 * | 3/2002 | Shigapov et al. | 502/304 |
| 2006/0051272 | A1 * | 3/2006 | Endruschat et al. | 423/213.5 |
| 2008/0269046 | A1 * | 10/2008 | Minoshima et al. | 502/304 |
| 2009/0084092 | A1 * | 4/2009 | Miyoshi et al. | 60/299 |
| 2009/0324468 | A1 * | 12/2009 | Golden et al. | 423/210 |
| 2010/0215557 | A1 * | 8/2010 | Liu et al. | 423/213.5 |
| 2010/0240525 | A1 * | 9/2010 | Golden et al. | 502/65 |
| 2011/0217216 | A1 * | 9/2011 | Liu et al. | 423/213.5 |
| 2012/0055141 | A1 * | 3/2012 | Hilgendorff | 60/301 |
| 2012/0124975 | A1 * | 5/2012 | Wei et al. | 60/297 |

* cited by examiner

- The addition of La-Al$_2$O$_3$ to the IWCP, disrupts the OSM-to-OSM connection
  - Thereby minimizing sintering of the OC during aging

- The addition of La-Al$_2$O$_3$ improves openness of pore structure
  - Which counteracts potential physical blocking The metalized slurry (IWCP) and La-doped alumina plus BaCO₃ are made in parallel prior to mixing to generate the overcoat (OC).

PALLADIUM SOLID SOLUTION CATAYST AND METHODS OF MAKING

CROSS REFERENCE TO RELATED APPLICATIONS

This application claims priority to U.S. Provisional Application No. 61/521,835, filed Aug. 10, 2011, which is incorporated herein by reference in its entirety.

TECHNICAL FIELD OF INVENTION

The invention relates generally to three-way catalysts that are able to simultaneously convert nitrogen oxides, carbon monoxide, and hydrocarbons in exhaust gas emissions into less toxic compounds. The invention relates specifically to three-way catalyst formulations comprising palladium (Pd)-containing oxygen storage materials. In some embodiments, the three-way catalyst formulations of the invention do not contain rhodium (Rh). The invention further relates to improved methods for making Pd-containing oxygen storage materials. Furthermore, the present invention relates to methods of making and using three-way catalyst formulations of the invention.

BACKGROUND OF THE INVENTION

Nitrogen oxides, carbon monoxide, and hydrocarbons are toxic and environmentally damaging byproducts found in the exhaust gas from internal combustion engines. Methods of catalytically converting nitrogen oxides, carbon monoxide, and hydrocarbons into less harmful compounds include the simultaneous conversion of these by-products (i.e., "three-way conversion" or "TWC"). Specifically, nitrogen oxides are converted to nitrogen and oxygen, carbon monoxide is converted to carbon dioxide, and hydrocarbons are converted to carbon dioxide and water.

It has generally been found that TWC significantly increases the efficiency of conversion of these pollutants and, thus, aids in meeting emission standards for automobiles and other vehicles. In order to achieve an efficient three-way conversion of the toxic components in the exhaust gas, conventional TWC contain large quantities of precious metals, such as Pd (Palladium), Pt (Platinum) and Rh (Rhodium), dispersed on suitable oxide carriers. Because Rh-containing catalysts demonstrate a very high activity for the conversion of $NO_x$, Rh is typically considered to be an essential component of the TWC system. As NO emission standards tighten and Rh becomes scarce (and, thus, more expensive), there is an increasing need for new TWC catalyst compositions which require lower amounts of precious metal catalysts and maintain efficient TWC of exhaust byproducts.

Thus, there remains a need for TWC catalyst formulations that do not contain Rh and that exhibit efficient TWC of exhaust byproducts. There also remains a need for efficient methods of producing such TWC catalyst formulations.

SUMMARY OF THE INVENTION

In some embodiments, the present invention relates to an oxygen storage material (OSM) comprising a metal oxide doped with at least one transition metal, wherein the transition metal and OSM are present as a solid solution. In some embodiments, the OSM is a Ce-based oxygen storage material.

The OSM may be doped with a particular amount of the transition metal. For example, the OSM may be doped with 0.5-10% of the transition metal. In some embodiments, the OSM is doped with about 2%, 5% or 10% of the transition metal. In a particular embodiment, the OSM is doped with about 2% of the transition metal. In other embodiments, the OSM is doped with about 0.5-4% of the transition metal. In yet other embodiments, the OSM is doped with about 1-2.5% of the transition metal. In particular embodiments, the OSM may be doped with up to about 2% of the transition metal. In other particular embodiments, the OSM is doped with about 2, 2.21 or 4.08% of the transition metal.

The OSM may comprise about 5-100 $g/ft^3$, 5-50 $g/ft^3$, or 5-20 $g/ft^3$ of the transition metal. In some embodiments, the OSM comprises about 5-20 $g/ft^3$ of the transition metal.

A variety of transition metals may be used in the OSMs of the present invention. For example, the transition metal may be Pd, Cu, Mn or Ni. In some embodiments, the transition metal is Pd.

In particular embodiments, the OSM is a SS Pd-IWCP OSM, as described herein.

In another aspect, the present invention relates to a washcoat comprising the OSM described above. In some embodiments, the washcoat further comprises a compound which retards the poisoning of a catalyst, such as barium. Barium can be present in the washcoat at about 19-21, 18-22, 17-23, 16-24, 15-25, 29-31, 28-32, 27-33, 26-34, or 25-35 g/L. In some embodiments, the barium is present in the washcoat at a concentration of about 20 g/L or about 30 g/L. The washcoat may also comprise an amount of $La-Al_2O_3$. In some embodiments, the $La-Al_2O_3$ constitutes about 9-11%, 8-12%, 7-13%, 6-14%, or 5-15% of the washcoat by weight. In other embodiments, the $La-Al_2O_3$ constitutes about 10% of the washcoat by weight.

In yet another aspect, the present invention relates to an overcoat comprising the OSM described above. In some embodiments, the overcoat further comprises a compound which retards the poisoning of a catalyst, such as barium. Barium can be present in the overcoat at about 19-21, 18-22, 17-23, 16-24, 15-25, 29-31, 28-32, 27-33, 26-34, or 25-35 g/L. In some embodiments, the barium is present in the overcoat at a concentration of about 20 g/L or about 30 g/L. The overcoat may also comprise an amount of $La-Al_2O_3$. In some embodiments, the $La-Al_2O_3$ constitutes about 9-11%, 8-12%, 7-13%, 6-14%, or 5-15% of the overcoat by weight. In other embodiments, the $La-Al_2O_3$ constitutes about 10% of the overcoat by weight.

The present invention further relates to a catalyst system comprising: a substrate and a washcoat, wherein the washcoat comprises an OSM, and wherein the OSM is as described above. In other embodiments, the present invention relates to a catalyst system comprising: a substrate, a washcoat, and an overcoat, wherein the washcoat comprises an OSM, wherein the OSM is as described above, and the overcoat comprises a support oxide, an OSM and a metal catalyst. In addition, the present invention refers to a catalyst system comprising: a substrate, a washcoat, and an overcoat, wherein the washcoat comprises a support oxide, an OSM and a metal catalyst, and the overcoat comprises an OSM as described above.

The metal catalyst present in the washcoat may be a platinum group metal (PGM) catalyst. For example, the PGM catalyst may be Pd, Pt or Rh. In some embodiments, the PGM catalyst is Pd. The Pd may be present in the overcoat at a concentration of about 5-100 $g/ft^3$. In some embodiments, the Pd is present in the overcoat at a concentration of about 5, 10, 15, 20, 50 or 100 $g/ft^3$. In other embodiments, the Pd at is present in the overcoat a concentration of about 5, 10, or 15 $g/ft^3$. Similarly, the Pd may be present in the washcoat at a concentration of about 5-100 $g/ft^3$. In some embodiments, the Pd is present in the washcoat at a concentration of about 5, 10, 15, 20, 50 or 100 g/ft$^3$. In other embodiments, the Pd at is present in the washcoat a concentration of about 5, 10, or 15 g/ft$^3$. In some embodiments of the catalyst systems, the overcoat comprises Pd at a concentration of about 5-100 g/ft$^3$ and the washcoat comprises Pd at a concentration of about 5-100 g/ft$^3$. In other embodiments of the catalyst systems, the overcoat comprises Pd at a concentration of about 10 g/ft$^3$ and the washcoat comprises Pd at a concentration of about 10 g/ft$^3$. In further embodiments of the catalyst systems, the overcoat comprises Pd at a concentration of about 50 g/ft$^3$ and the washcoat comprises Pd at a concentration of about 50 g/ft$^3$. In yet other embodiments of the catalyst systems, the overcoat comprises less Pd than the washcoat. In other embodiments of the catalyst systems, the overcoat comprises Pd at a concentration of about 5 g/ft$^3$ and the washcoat comprises Pd at a concentration of about 15 g/ft$^3$. In some embodiments, the catalyst system is substantially free of Rh.

The catalyst systems may contain washcoats comprising the OSM described above. In addition, the catalyst systems may contain overcoats comprising the OSM described above.

The washcoats and overcoats of the catalyst systems may, independently, further comprise Ca, Sr, Ba or La. In some embodiments, the washcoats and overcoats of the catalyst systems independently comprise Ba.

The present invention also relates to methods of making the OSMs described above. In particular embodiments, the method is the IWCP method and comprises the: 1) adding an amount of transition metal salt to an aqueous slurry of milled OSM; and 2) adding an amount of base to generate an IWCP-OSM slurry.

The present invention further relates to methods of making a catalyst composition comprising the OSMs described above, comprising: 1) generating an IWCP-OSM slurry by adding an amount of transition metal salt to an aqueous slurry of milled OSM and then adding an amount of base to generate an IWCP-OSM slurry; 2) generating a support oxide mixture by milling an amount of support oxide with acetic acid and then adding an amount of BaCO$_3$ or CaCO$_3$ and stiffing to generate a support oxide mixture; 3) adding the support oxide mixture of 2) to the IWCP-OSM slurry of 1) and coating the resulting composition on to a washcoat; and 4) calcining the resulting mixture of 3) to yield a catalyst composition. If needed, the IWCP process may be repeated multiple times on a substrate.

In some embodiments of the methods above, the base used is tetraethylammonium hydroxide, tetramethylammonium hydroxide, tetrapropylammonium hydroxide, tetrabutylammonium hydroxide, BaO, Ba(OH)$_2$, BaCO$_3$, SrO, Sr(OH)$_2$ or SrCO$_3$. In a particular embodiment, the base is tetraethylammonium hydroxide.

The present invention additionally relates to methods of making the OSMs described above, comprising: 1) co-milling a Ce-based oxygen storage material and a transition metal salt; and 2) spraying the resulting mixture of 1) into a furnace. In some embodiments, the transition metal salt is PdNO$_3$.

In some embodiments of the methods above, the base and transition metal are present in a fixed ratio. In particular embodiments, the molar ratio of base to transition metal is between 2:1 and 3:1. In some embodiments the molar ratio is 2.5:1 or 2.75:1. In particular embodiments of the methods above, the base is tetraethylammonium hydroxide and the transition metal is Pd. In some embodiments, tetraethylammonium hydroxide and Pd are present in a molar ratio of 2.5:1 or 2.75:1.

Further methods of the present invention include methods of reducing toxic exhaust gas emissions comprising contacting the gas emissions with the catalyst systems described above.

The present invention also relates to methods of increasing oxygen flow through a catalyst system by utilizing an OSM described above, wherein the OSM is present in the washcoat, overcoat, or both.

In addition, the present invention relates to methods of increasing the oxygen storage capacity of a catalyst system by utilizing an OSM described above, wherein the OSM is present in the washcoat, overcoat, or both.

Additional methods encompassed by the invention include methods of improving the lifetime of a PGM catalyst present in a catalyst system by utilizing an OSM described above, wherein the OSM is present in the washcoat, overcoat, or both.

Further, the invention refers to methods of improving the light-off performance of a catalyst system by utilizing an OSM described above, wherein the OSM is present in the washcoat, overcoat, or both. In some embodiments, the initial exotherm on contact of the catalyst with CO is increased.

Other methods include methods for reducing the amount of Rh present in a catalyst system while maintaining catalyst efficiency by utilizing an OSM described above, wherein the OSM is present in the washcoat, overcoat, or both. In some embodiments, the washcoat, overcoat, or entire catalyst system (washcoat and overcoat) is substantially free of Rh.

In addition, the present invention refers to methods of simultaneously converting a) nitrogen oxides to nitrogen and oxygen; b) carbon monoxide to carbon dioxide; and c) hydrocarbons to carbon dioxide and water present in exhaust gas emissions, comprising contacting the gas emissions with the catalyst systems described above.

In another aspect, the present invention refers to a catalytic convertor system comprising a catalyst system described above. In some embodiments, the catalytic convertor system comprises two or more catalytic converters. In further embodiments, the catalytic convertor system comprises at least one close coupled catalytic converter. In some embodiments, the close coupled catalytic converter comprises an OSM described above. In some embodiments, the catalyst systems described above are present in a close coupled catalytic converter.

In a particular aspect, the present invention refers to a catalyst system comprising a washcoat and an overcoat as follows: a) an overcoat comprising an OSM and a Pd metal catalyst, wherein the OSM comprises 30% CeO$_2$, 60% ZrO$_2$, 5% Nd$_2$O$_3$, and 5% Pr$_6$O$_{11}$ (% by weight), and the overcoat comprises 5 g/ft$^3$ of Pd; and b) a washcoat comprising an OSM and a Pd metal catalyst, wherein the OSM comprises 30% CeO$_2$, 60% ZrO$_2$, 5% Nd$_2$O$_3$ and 5% Y$_2$O$_3$ (% by weight), and the washcoat comprises 15 g/ft$^3$ of Pd.

DETAILED DESCRIPTION OF THE INVENTION

Figure 1:
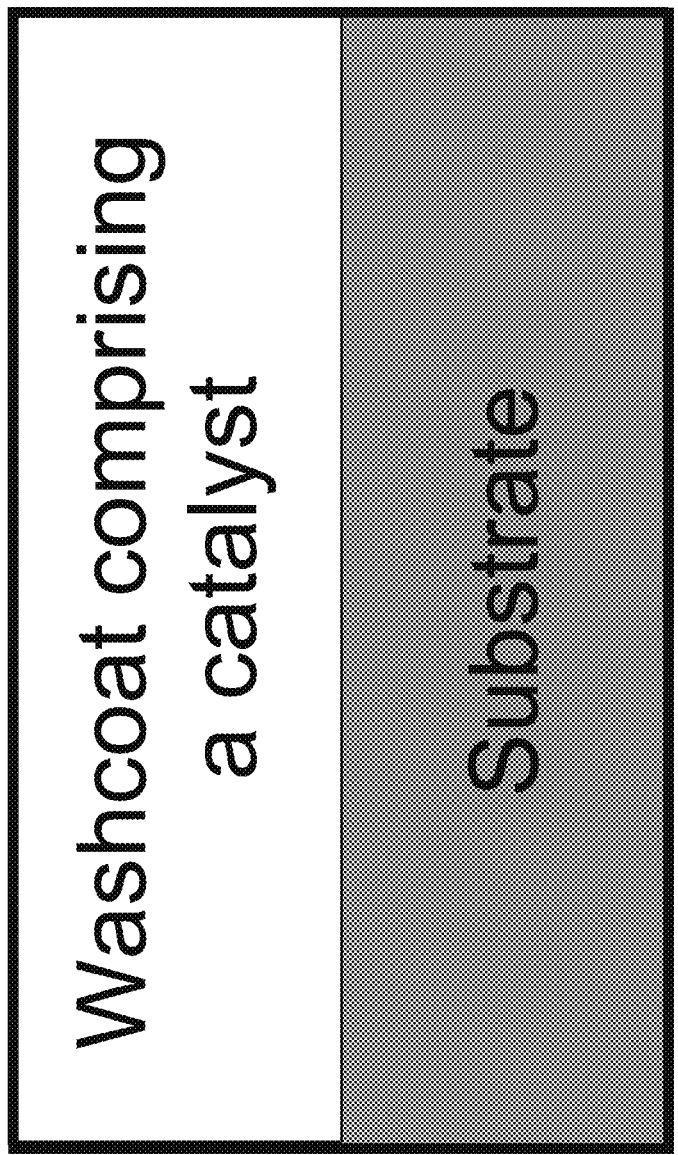
FIG. 1 is a schematic representation of a TWC catalyst comprising (1) a substrate, and (2) a washcoat containing at least one metal catalyst, wherein the washcoat is supported by the substrate.
Figure 2:
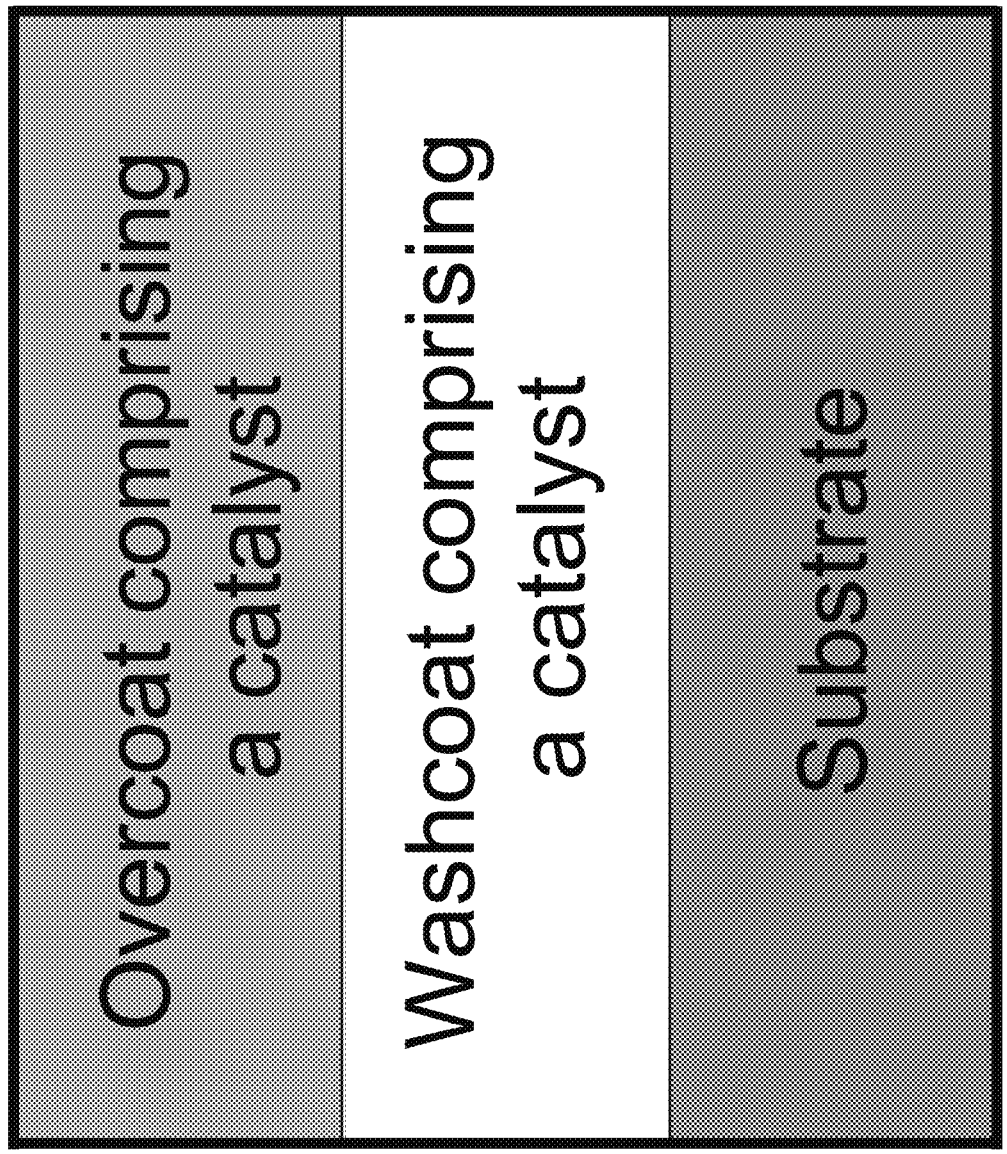
FIG. 2 is a schematic representation of a TWC catalyst comprising (1) a substrate, (2) a washcoat containing at least one metal catalyst, wherein the washcoat is supported by the substrate, and (3) an overcoat containing at least one metal catalyst, wherein the overcoat is supported by the washcoat.
Figure 3:
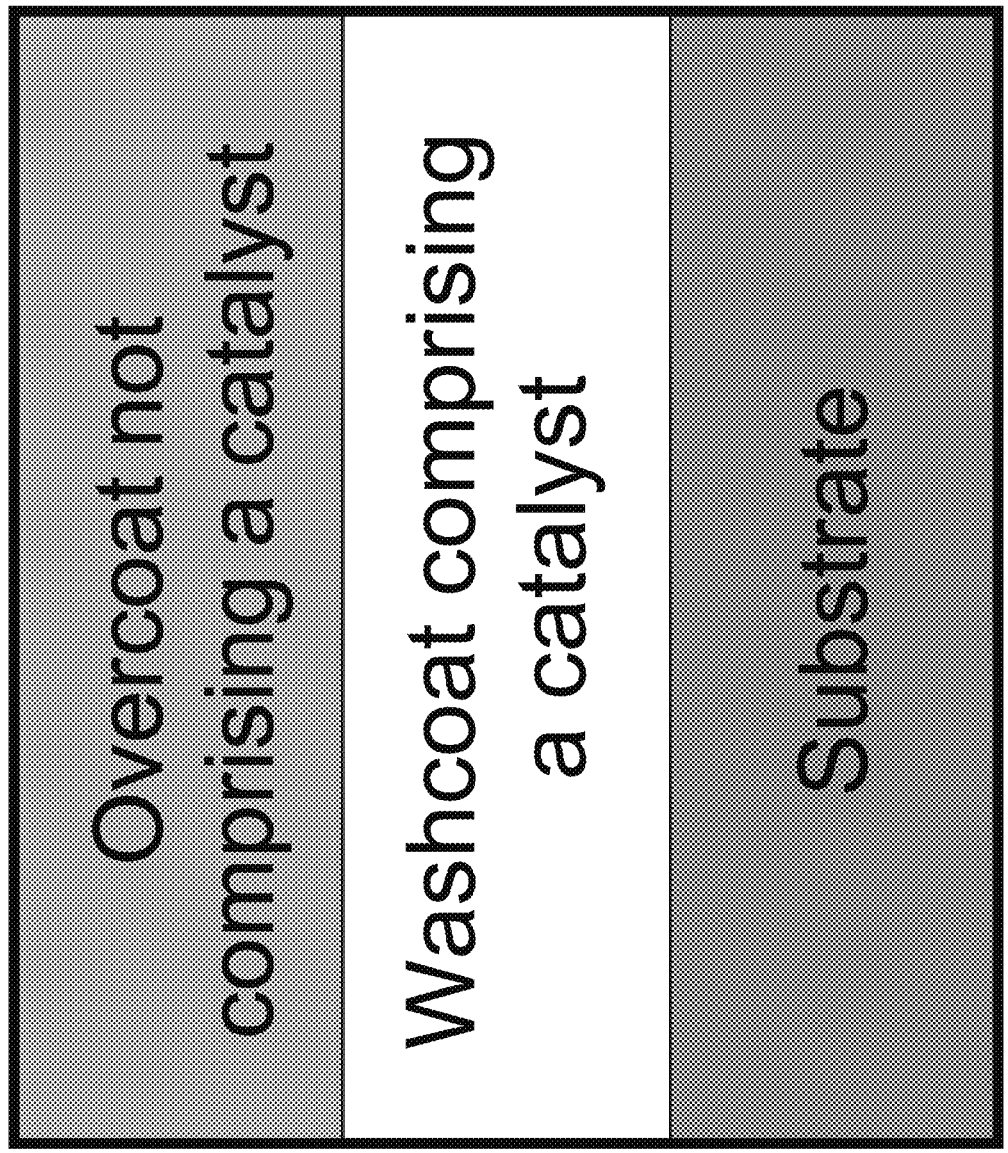
FIG. 3 is a schematic representation of a TWC catalyst comprising (1) a substrate, (2) a washcoat containing at least one metal catalyst, wherein the washcoat is supported by the substrate, and (3) an overcoat which is free of metal catalyst.
Figure 4:
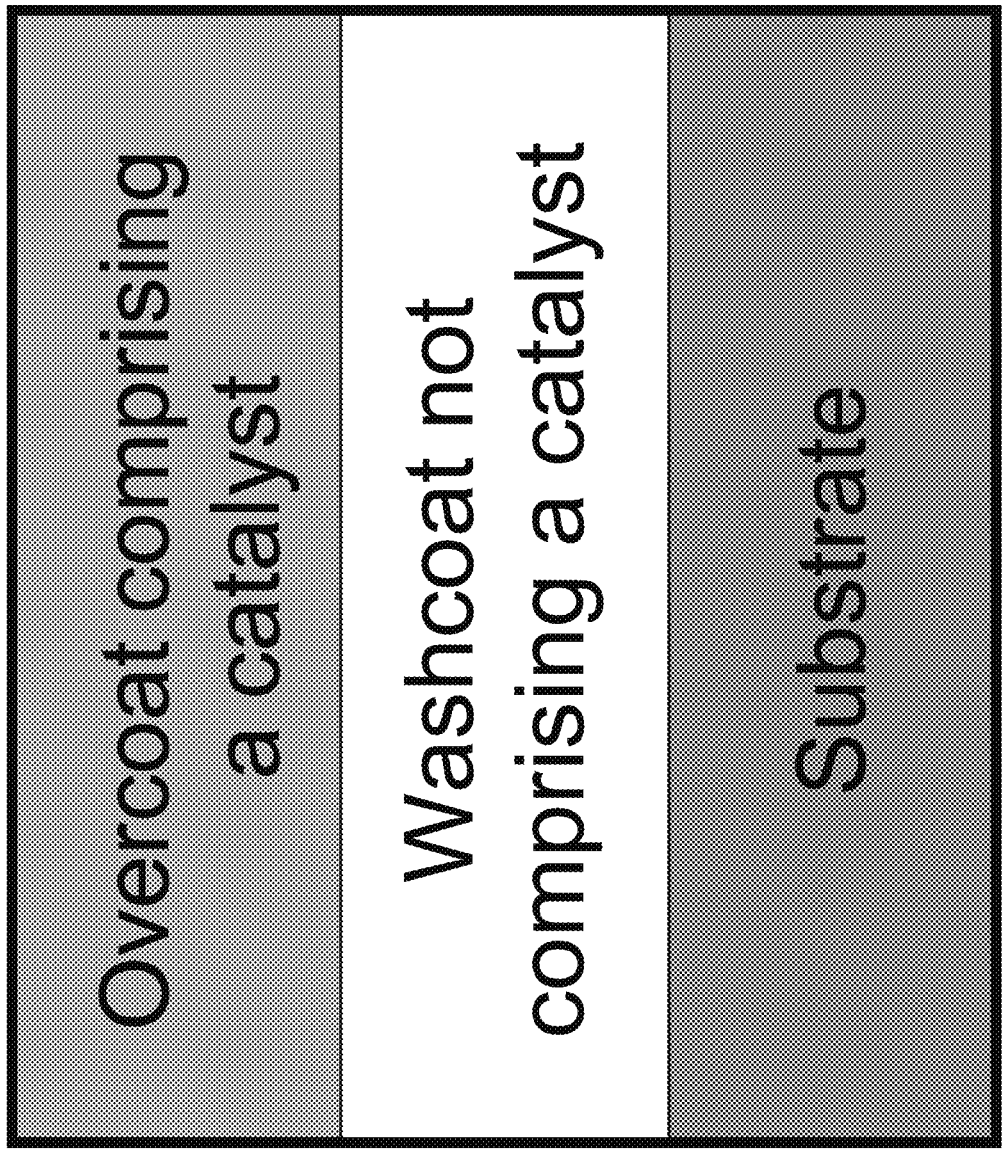
FIG. 4 is a schematic representation of a TWC catalyst comprising (1) a substrate, (2) a washcoat which is free of metal catalyst and (3) an overcoat containing at least one metal catalyst, wherein the overcoat is supported by the washcoat.
Figure 5:
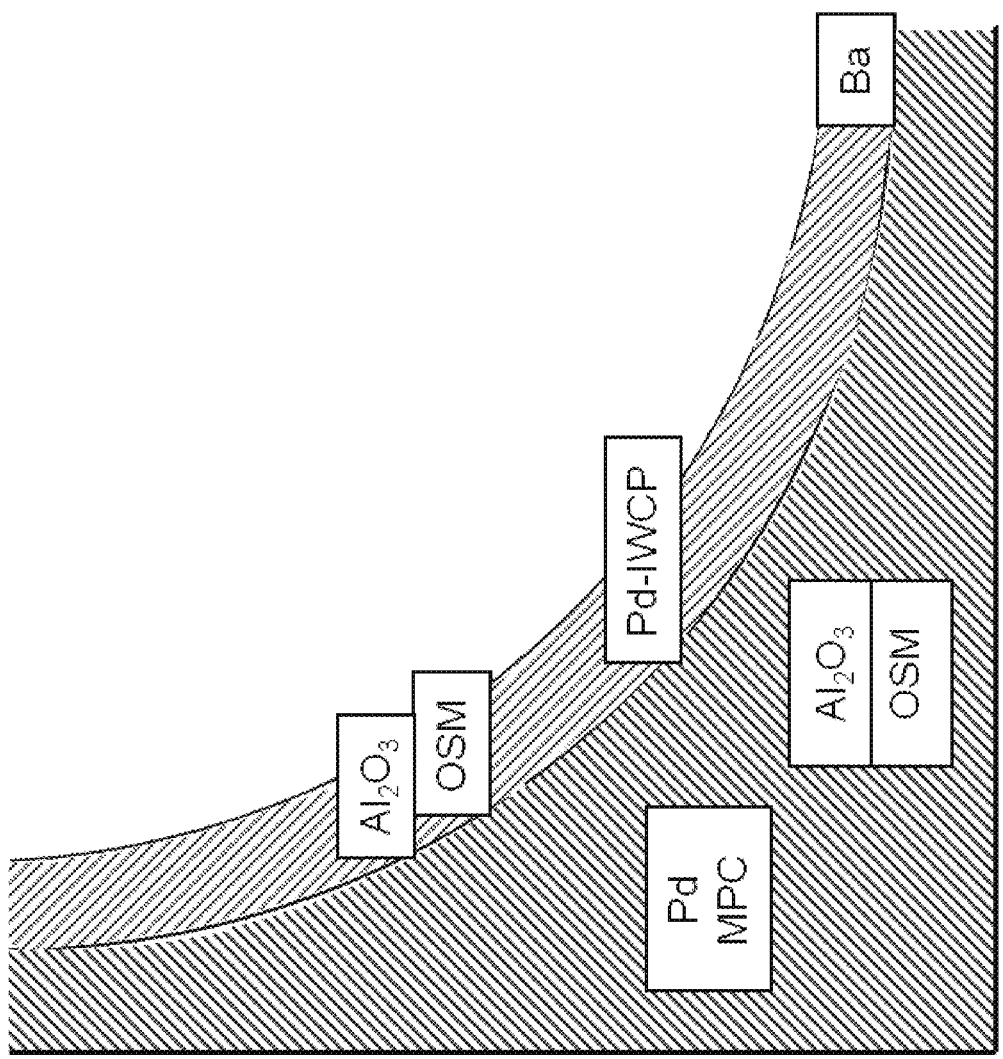
FIG. 5 is a schematic representation of a TWC catalyst system comprising a MPC Pd in the washcoat (lower layer) and Pd-IWCP OSM in the overcoat (upper layer).

In order that the invention herein described may be fully understood, the following detailed description is set forth.

Unless defined otherwise, all technical and scientific terms used herein have the same meaning as those commonly understood by one of ordinary skill in the art to which this invention belongs. Although methods and materials similar or equivalent to those described herein can be used in the practice or testing of the present invention, suitable methods and materials are described below. The materials, methods and examples are illustrative only, and are not intended to be limiting. All publications, patents and other documents mentioned herein are incorporated by reference in their entirety.

Throughout this specification, the word "comprise" or variations such as "comprises" or "comprising" will be understood to imply the inclusion of a stated integer or groups of integers but not the exclusion of any other integer or group of integers.

In order to further define the invention, the following terms and definitions are provided herein.

Definitions

The term "catalyst system" refers to any system comprising a catalyst such as a Platinum Group Metal (PGM) catalyst. In some embodiments, the catalyst system comprises a substrate, a washcoat, and optionally an overcoat. Select examples of catalyst systems are depicted in FIGS. 1-5.

The term "catalytic converter system" refers to a system comprising one or more catalyst systems. For example, a catalytic converter system may comprise a close-coupled catalyst system, an underfloor catalyst, or both.

The term "close-coupled catalyst" or "CC catalyst" refers to, for example, a catalytic converter which is placed close to the engine so as to be exposed to the heat generated by operation of the engine. Such CC catalysts may be TWC catalysts.

The term "Ce-containing mixed metal oxide" refers to materials based on a fluorite structure and containing Ce, Zr and, typically, several lanthanide metals. Typical examples are expressed in terms of the relative quantity of Ce and Zr (e.g., Ce-rich or Zr-rich). Lanthanides are present as dopants, typically at 1-10%. Commonly used lanthanides include Pr, Nd, La, Sm, Gd and Y.

The term "cold start" refers to the beginning of the operation of a vehicle after it has been inoperative for a significant period of time, such that the engine (including the working components of the exhaust system—e.g., sensors, catalytic converter(s), etc.) are all at ambient temperature.

The term "conversion efficiency" refers to the percentage of emissions passing through the catalyst that are converted to their target compounds.

The term "coupled with" refers to a relationship (e.g., functional or structural) between components of a catalyst system (e.g., the relationship between the washcoat and the substrate and/or overcoat, or the relationship between the overcoat and the washcoat). In some embodiments, components which are coupled to each other are in direct contact with each other (e.g., the washcoat may be in direct contact with and, thus, coupled with the substrate). In other cases, components which are coupled to each other are coupled via additional component(s) (e.g., an overcoat is coupled to the substrate via the washcoat).

The term "high-surface area alumina" refers to aluminum oxides that have a high specific surface area—i.e., a high surface area per unit weight. High surface area aluminas typically have crystal structures designated as gamma, delta or theta.

The term "high-temperature conditions" refers to engine conditions wherein hot exhaust gas passes through a catalyst. Such exhaust gas is typically in excess of 800° C., and in extreme circumstances, in excess of 1000° C.

The term "Lanthanide group of elements" refers to the elements La, Pr, Sm, Nd, Pm, Gd, Eu, Tb, Dy, Ho, Er, Tm, Yb and Lu.

The term "Ln-doped Zirconia" refers to an oxide comprising zirconium and an amount of dopant from the lanthanide group of elements, where Ln denotes any of the lanthanide group.

The term "light-off temperature" refers to the temperature at which a catalyst is able to convert 50% of the emissions passing through the catalyst (e.g., nitrogen oxides, carbon monoxide and unburnt hydrocarbons) to their target compounds (e.g., nitrogen and oxygen, carbon dioxide, and carbon dioxide and water, respectively).

The term "multiphase catalyst" or "MPC" refers to a catalyst represented by the general formula $Ce_yLn_{1-x}A_{x+s}MO_z$. Such catalysts are described in, e.g., U.S. Pat. No. 7,641,875, which is hereby incorporated by reference in its entirety.

The term "mixed metal oxide" refers to an oxide, wherein the cation positions in the oxide's crystal structure can be occupied by a variety of cations. Such cations may be selected from one or a variety of lanthanides.

The term "overcoat" refers to a coating comprising one or more oxide solids that are coupled with a substrate and a washcoat. The oxide solids in the overcoat may be, for example, support oxides, one or more catalyst oxides, or a mixture of support oxides and catalyst oxides.

The term "oxygen storage capacity" or "OSC" refers to the ability of the oxygen storage material component of a TWC catalyst to store oxygen. TWC catalysts with high oxygen storage capacities are able to supply oxygen to rich exhaust and take up oxygen from lean exhaust, thus buffering a catalyst system against the fluctuating supply of oxygen by maintaining a steady air/fuel ratio. This process increases catalyst efficiency. Oxygen storage capacity is typically measured in terms of "delay in time"—i.e., the amount of time the oxygen storage material is able to absorb and/or release oxygen, thus buffering the air/fuel ratio. The air/fuel ratio is preferably buffered at the stoichiometric ratio.

The term "oxygen storage material" or "OSM" refers to a composition which supplies oxygen to rich exhaust and takes up oxygen from lean exhaust, thus buffering a catalyst system against the fluctuating supply of oxygen. Oxygen storage materials increase catalyst efficiency. Oxygen storage materials may be present in the washcoat and/or the overcoat of a catalyst composition.

The term "platinum group metal" or "PGM" refers to one of the following six elements: ruthenium (Ru), rhodium (Rh), palladium (Pd), osmium (Os), iridium (Ir), and platinum (Pt).

The term "poisoning" or "catalyst poisoning" refers to the inactivation of a catalyst by virtue of its exposure to lead or phosphorus in, for example, engine exhaust.

The term "rare-earth metal" refers to any lanthanide element of the periodic table of the chemical elements.

The term "solid solution" refers to the doping of a metal either onto the crystallographic site of a host material, or in between crystallographic sites of a host material. Such solid solutions are composed of a single homogenous phase. The solid solution has the same crystallographic type or structure as the un-doped host material. Typically the lattice parameters of the solid solution increase or decrease with increasing dopant amount. Whether or not an increase or decrease in lattice parameters occurs depends on whether the doping cation is smaller or larger than the host cations (in addition to other specific chemical and crystallographic factors).

The term "solid solution limit" refers to the maximum amount of dopant that can exist on the host sites in a solid solution. Above this limit, any increase in the amount of dopant produces a two-phase material: 1) a phase comprising the solid solution (with the maximum dopant level); and 2) a phase comprising the excess dopant.

The term "stoichiometric point" or "stoichiometric ratio" refers to a particular air-fuel ratio (i.e., the ratio of air to fuel present in an engine during combustion). An engine operates at the stoichiometric point when exactly enough air is present in the fuel mixture to burn all of the fuel present.

The term "stabilized alumina" refers to alumina wherein modifiers are added to retard undesired phase transitions of the alumina from, for example, the gamma phase to the alpha phase, when the alumina is exposed to elevated temperatures. Such modifiers aid in stabilizing the surface area of the alumina. Alumina is exposed to high temperatures during formation of the catalyst system and during operation of the catalyst system (e.g., when it is exposed to exhaust gas). The modifiers or thermal stabilizers may include, for example, one or more modifiers or stabilizers selected from, but not limited to, rare earth oxides, silicon oxides, oxides of Group IVB metals (e.g., zirconium, hafnium, or titanium) and alkaline earth oxides. For example, lanthanide nitrate and/or strontium nitrate may be added to washcoats and/or overcoats (m, e.g., support oxides) as a modifier for the alumina. The lanthanide nitrate solution may contain a single lanthanide nitrate (e.g., lanthanum nitrate), or the solution may contain a mixture of lanthanide nitrates. Heating or calcining the lanthanide nitrate and/or strontium nitrate forms lanthanide oxide ($Ln_2O_3$) and/or strontium oxide.

The term "substrate" refers to any material known in the art for supporting a catalyst. Substrates can be of any shape or configuration that yields a sufficient surface area for the deposit of the washcoat and/or overcoat. Examples of suitable configurations for substrates include, but are not limited to, honeycomb, pellet, and bead configurations. Substrates can be made of a variety of materials including, but not limited to, alumina, cordierite, ceramic and metal.

The term "support oxide" refers to porous solid oxides which are used to provide a high surface area which aids in oxygen distribution and exposure of catalysts to reactants such as $NO_x$, CO, and hydrocarbons. Support oxides are typically mixed metal oxides. Support oxides typically have a large surface area. For example, a support oxide may have a BET (Brunauer, Emmett and Teller) surface area of 60 $m^2/g$ or more and, often, about 200 $m^2/g$ or more. In general, support oxides should remain stable in the presence of exhaust gas temperatures which can reach up to 800-1100° C. Suitable compounds for use as support oxides include, but are not limited to, gamma-alumina, ceria-based powders, or any mixture of titania, silica, alumina (transition and alpha-phase), ceria, zirconia, $Ce_{1-\alpha}Zr_\alpha O_2$, and any possible doped ceria formulations. A transition phase is a meta-stable phase of alumina (beta, gamma, theta, delta) that transforms to the stable alpha-alumina with sufficient time and temperature.

The term "three-way conversion catalyst" or "TWC catalyst" refers to a catalyst that simultaneously: a) reduces nitrogen oxides to nitrogen and oxygen; b) oxidizes carbon monoxide to carbon dioxide; and c) oxidizes unburnt hydrocarbons to carbon dioxide and water. Typically, TWC catalysts require the use of precious metals such as platinum group metals.

The term "transition metal" refers to any element of the d block of the periodic table of the chemical elements.

The term "washcoat" refers to a coating comprising one or more oxide solids that is coupled to a substrate or solid support structure. The oxide solids in the washcoat may be, for example, support oxides, one or more catalyst oxides, or a mixture of support oxides and catalyst oxides.

Catalyst Systems

Catalyst systems in, for example, catalytic converters may be used in conjunction with an internal combustion engine. Thus, in some embodiments, the catalyst of the catalyst system is a TWC catalyst. In light of the expense associated with Rh-containing catalyst systems, there remains a need for catalyst systems with reduced Rh-loadings that retain the ability to efficiently purify engine exhaust. Thus, in one aspect, the present invention provides catalyst system components which contain little to no Rh and, when incorporated into catalyst systems, are able to participate in efficient TWC of compounds in engine exhaust.

The catalyst systems (including TWC catalyst systems) of the present invention may have a variety of architectures. TWC catalyst systems typically comprise (1) a substrate, (2) a washcoat supported by the substrate, and (3) an optional overcoat supported by the washcoat (see FIGS. 1-5). For example, the TWC catalyst systems of the present invention may comprise (1) a substrate, and (2) a washcoat containing at least one metal catalyst, wherein the washcoat is supported by the substrate (see FIG. 1). The catalyst systems of the present invention may also comprise (1) a substrate, (2) a washcoat containing at least one metal catalyst, wherein the washcoat is supported by the substrate, and (3) an overcoat containing at least one metal catalyst, wherein the overcoat is supported by the washcoat (see, FIG. 2). The catalyst systems of the present invention may also comprise (1) a substrate, (2) a washcoat containing at least one metal catalyst, wherein the washcoat is supported by the substrate, and (3) an overcoat which is relatively free of metal catalyst, preferably at least 95%, 99%, or at least 99.99% free of metal catalyst, or completely free of metal catalyst (see FIG. 3). Further, the catalyst systems of the present invention may comprise (1) a substrate, (2) a washcoat which is relatively free of metal catalyst, preferably at least 95%, 99%, or at least 99.99% free of catalyst, or completely free of metal catalyst, and (3) an overcoat containing at least one metal catalyst, wherein the overcoat is supported by the washcoat (see, FIG. 4).

Catalyst systems are typically present in two locations in automobile engines. For example, an automobile may contain two catalytic converters: 1) a close-coupled catalyst ("CC catalyst") placed near the engine; and 2) a larger catalyst placed, for example, under the floor of the vehicle where there is more room ("underfloor catalyst" of "UF catalyst"). CC catalysts are placed near the engine so they are exposed to the heat generated by operation of the engine. This heat allows the CC catalyst to more quickly reach its light-off temperature and, thus, more quickly reach its maximum efficiency. CC catalysts, however, suffer for at least two major drawbacks. First, their exposure to high temperatures leads to thermal degradation of the catalyst system. Second, their close proximity to the engine exposes them to a higher amount of phosphorus and sulfur which acts to poison the catalyst. The improved catalyst system components of the present invention address these issues.

Improved Catalyst Systems

One aspect of the present invention is the provision of catalyst system components which allow for efficient TWC conversion with little or no Rh-based catalysts. Such components may be used in the washcoat and/or overcoats of catalyst systems. Specifically, the present invention provides oxygen storage materials (OSMs) for using in washcoats and/or overcoats which contain reduced amounts of Rh-based catalysts. In some embodiments, the OSMs contain no Rh-based catalysts.

Pd-Based Oxygen Storage Materials (Pd-OSMs)

The OSMs of the present invention have several advantages over OSMs traditionally used in catalyst systems such as catalytic converters. As discussed herein, these advantages include, for example, improved oxygen storage capacity ("OSC"), light-off temperatures, and catalyst efficiency. The incorporation of the OSMs of the present invention into catalyst systems has a beneficial impact on the overall performance of such systems.

The OSMs of the present invention contain a catalyst, such as a Pd, wherein the catalyst is present as a solid solution ("SS") within the OSM (i.e., a SS Pd-OSM). For example, a SS Pd-OSM of the present invention would comprise Pd present as a solid solution within a Ce-containing mixed metal oxide. Without being bound by a particular theory, it is believed that when Pd is present in a SS with the OSM, it is evenly dispersed throughout the OSM and the surface of the OSM (see Examples 7-9 and FIGS. 17-18). The even dispersion of Pd on the surface of the OSM allows for improved access of the Pd to both oxygen and substrates in the exhaust. In addition, the Pd dispersion allows for more facile diffusion of oxygen from within the OSM to the surface of the OSM.

When the Pd is present as a SS, the Pd cations are doped onto the OSMs to yield the SS Pd-OSMs of the present invention. Without being bound by a particular theory, it is believed that the doping of the OSM with Pd leads to the observed performance benefits of the SS Pd-OSMs of the present invention. For example, as discussed herein, the SS Pd-OSMs of the present invention display higher OSCs when compared to traditional catalysts and OSMs. The doping of the OSM with Pd replaces a $Ce^{4+}$ ion of the Ce-containing mixed metal oxide with a Pe ion. As a result of this doping, the SS Pd-OSM comprises ions with a lower charge (i.e., $Pd^{2+}$ vs $Ce^{4+}$) which, in turn, creates a vacancy which may be occupied by additional $O^{2-}$ ions. (see, Example 10 and FIG. 6). Thus, there is a drive to form vacancies in order to balance the overall charge of the system.

The increased ability to accommodate $O^{2-}$ (i.e., to absorb $O^{2-}$ into the OSM) results in an increase in raw OSC. In addition, the vacancies formed by $Pd^{2+}$ incorporation (and $Ce^{4+}$ replacement) allow for more facile diffusion of $O^{2-}$ from the interior to the surface of the OSM (sometimes referred to as $O^{2-}$"hopping" between layers of the Ce-mixed metal oxide). Such an improvement is useful as $O^{2-}$ must be able to freely move to the surface of the OSM in order to access substrates present in engine emissions and to buffer the catalyst environment in case of exposure to a lean or rich air/fuel mixture (see, Example 10 and FIG. 7).

The dispersed Pd found in the SS Pd-OSM of the present invention is significantly different in structure when compared to bulk form Pd. Bulk form Pd, which is typically formed when traditional methods are used to generate catalyst systems, is agglomerated as large particles on the surface of the OSM. Agglomerated Pd is not considered to be in a SS. Instead, the agglomerated Pd is largely present as clumps of Pd (as PdO) on the surface of the OSM—i.e., it is in a different phase from the OSM. This form of Pd is less capable of interacting with oxygen and substrates in the exhaust. In addition, Pd present as PdO on the surface of the OSM does not positively contribute to OSC. Specifically, PdO does not allow for the replacement of $Ce^{4+}$ with $Pd^{2+}$ throughout the OSM.

Figure 8:
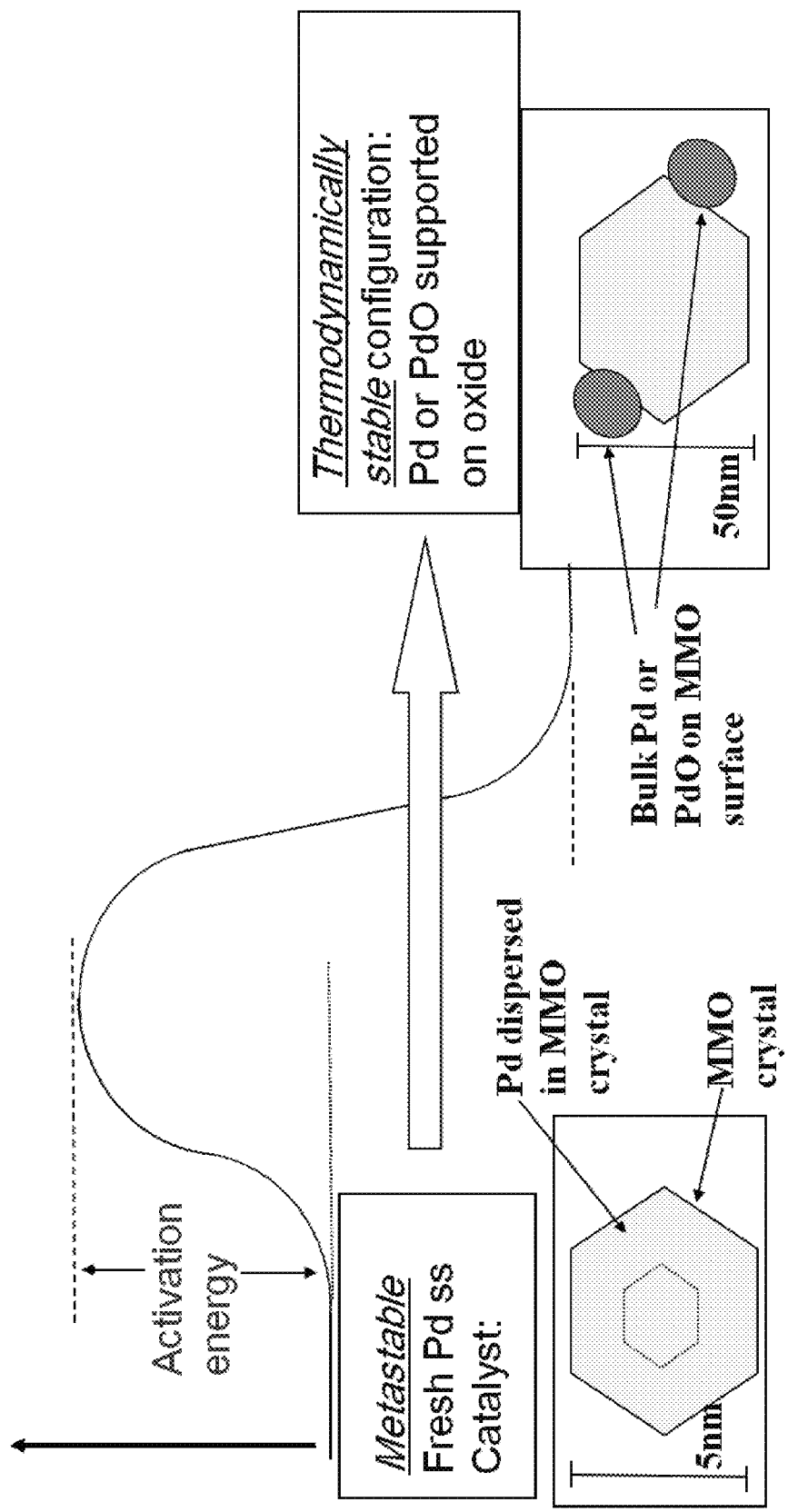
FIG. 8 is a diagram that illustrates the metastability of the Pd-solid solution (SS) due to the significant energy required to drive Pd from the dispersed to the bulk state.

Pd in bulk form and present on the surface of the OSM is more thermodynamically stable when compared to Pd dispersed as a SS throughout the OSM. Yet, the SS Pd-OSMs of the present invention are suitable for use in catalyst systems which are routinely exposed to high temperatures. It is believed that the metastability of the Pd dispersed as a SS throughout the OSM allows for the maintenance of Pd in SS form. Thus, even though the bulk form Pd is the more thermodynamically stable form, the significant energy required to drive the Pd from its SS form to the bulk form Pd allows catalyst to remain in SS form (see FIG. 8).

The amount of Pd present in the SS Pd-OSMs affects the form of the Pd. For example, attempts to dope the OSM with high amounts of Pd are typically met with lackluster rates of Pd incorporation into the OSM as a SS. The use of high amounts of Pd in the doping process leads to the undesirable formation of PdO particles on the surface of the OSM (see Examples 7-9 and FIGS. 16-20).

Thus, in some embodiments, the OSM is doped with approximately 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% Pd. In some embodiments, the OSM is doped with approximately 0.5-10%, 0.5-5%, 0.5-4.5%, 0.5-4%, 0.5-3.5%, 0.5-3%, 0.5-2.5%, 0.5-2%, 1-3% or 1-2% Pd. In some embodiments, the OSM is doped with approximately 2%, 2.21% or 4.08% Pd. In particular embodiments, the OSM is doped with 2%, 2.21% or 4.08% Pd.

In other embodiments, the OSM is doped with up to approximately 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% Pd. In some embodiments, the OSM is doped with up to approximately 0.5-10%, 0.5-5%, 0.5-4.5%, 0.5-4%, 0.5-3.5%, 0.5-3%, 0.5-2.5%, 0.5-2%, 1-3% or 1-2% Pd. In some embodiments, the OSM is doped with up to approximately 2%, 2.21% or 4.08% Pd. In particular embodiments, the OSM is doped with up to 2%, 2.21% or 4.08% Pd.

Improved Performance of SS Pd-OSMs

Figure 15:
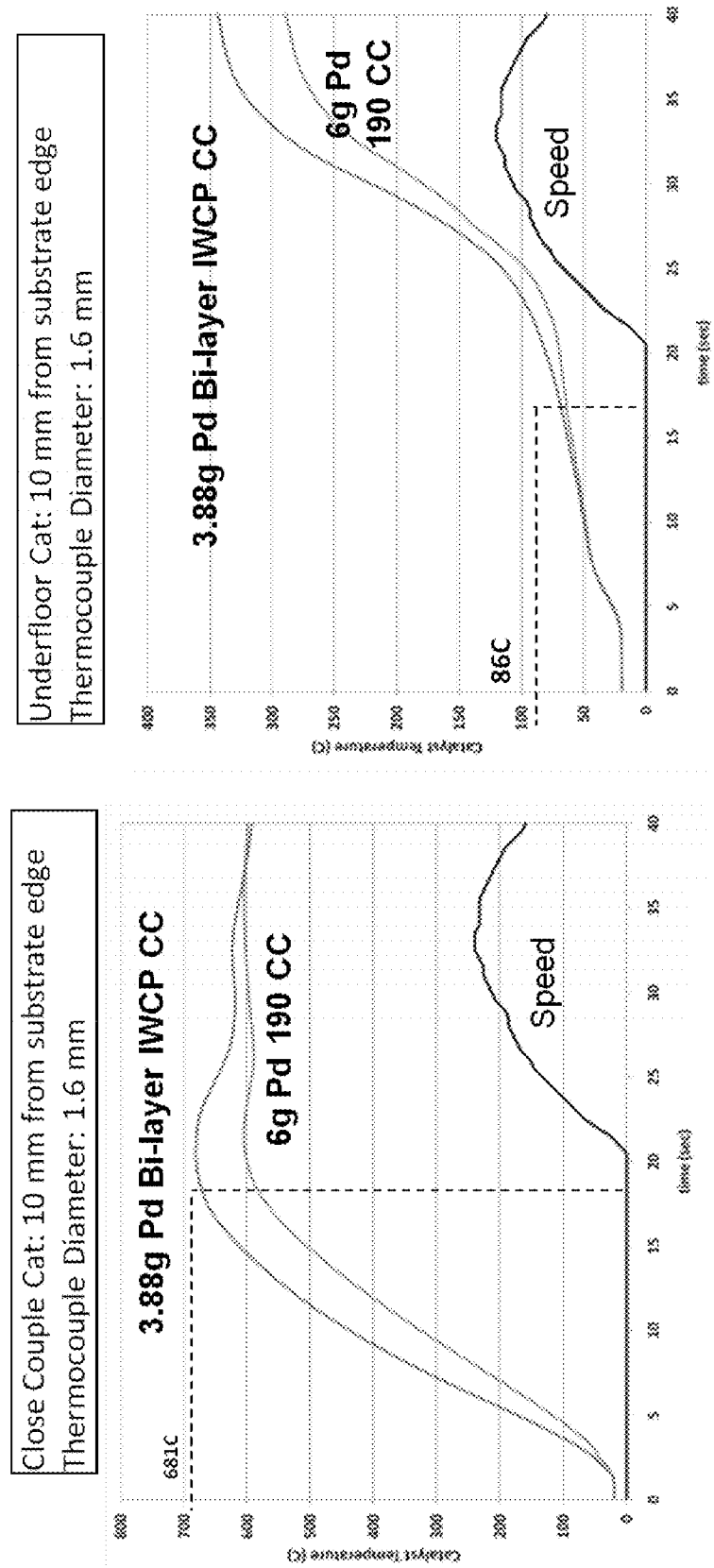
FIG. 15 shows graphs of catalyst temperature versus time for close-coupled (left) and underfloor (right) catalysts and showing the comparison of increase of temperature with catalyst systems containing SS Pd-IWCP OSM and Pd-MCP as CC catalysts. The data was generated using FTP testing. When the SS Pd—IWCP OSM was used in the CC catalyst, a more rapid increase of temperature was observed in both the CC and UF catalysts.
Figure 16:
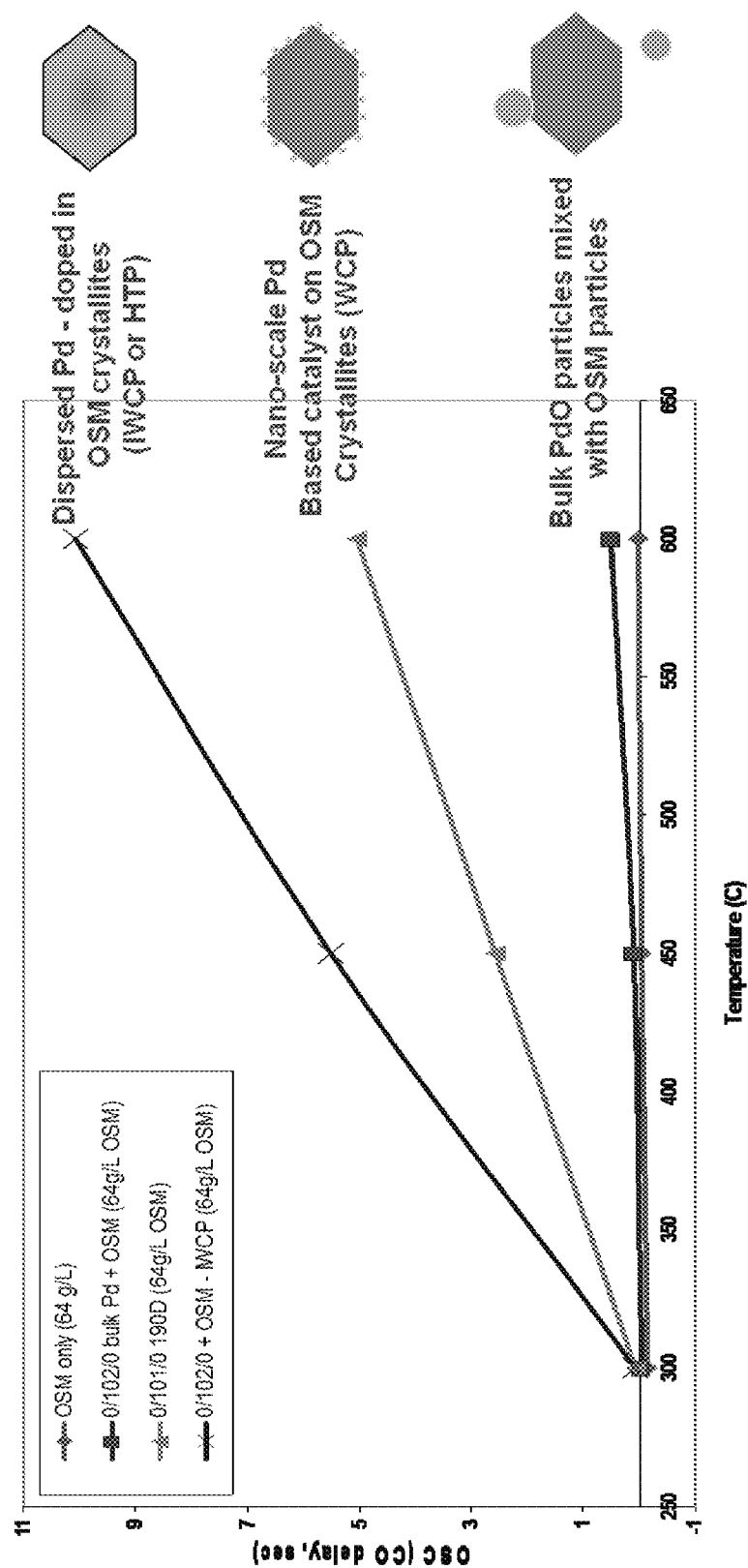
FIG. 16 is a graph of OSC versus temperature that illustrates that the OSC is influenced by the relative dispersion of Pd and OSM. OSMs generated using the IWCP (where the Pd is best dispersed on the surface and throughout the OSM) exhibit the best OSC.

It has been found that SS Pd-OSMs are able to efficiently catalyze the conversion of compounds present in, for example, engine exhaust without the need for supporting a catalyst on a support oxide. While the SS Pd-OSMs of the present invention are able to efficiently participate in the general TWC of engine exhaust, they are particularly efficient in catalyzing the conversion of CO to $CO_2$. The oxidation of CO is particularly exothermic and, thus, beneficial to the SS Pd-OSMs. Thus, the SS Pd-OSMs of the present invention are able to more quickly reach their light-off temperature in part due to the heat generated from the CO oxidation reaction. In addition, the SS Pd-OSMs of the present invention are able to reach a higher operating temperature—again stemming from the exothermic CO oxidation (see Example 5 and FIG. 15).

This self-heating process enables the use of the SS Pd-OSMs in catalysts placed further away from the engine—i.e., there is less need to place SS Pd-OSMs in catalyst systems that are near engines. There are benefits to such systems, including the reduced thermal degradation of the precious metal catalysts and the reduced amount of catalyst poisoning. These benefits are observed in the context of the Federal Test Procedure drive cycle (i.e., standard operating temperature). In addition, these benefits are observed in the context of CC-catalyst and underfloor catalysts (see Example 4 and Table 4).

Interestingly, additional benefits of SS Pd-OSMs allow them to be used even in CC catalysts. Specifically, it has been shown that the SS Pd-OSMs reduce the aging of the Pd catalyst present, even if it is present in a high-heat environment and even without the presence of $BaCO_3$ or $La-Al_2O_3$. Moreover, the SS Pd-OSMs of the present invention also reduce the poisoning of the Pd catalyst. This may be due to the lack of nano-scale Pd particles onto which poisons normally bond or associate.

As discussed above, SS Pd-OSMs exhibit improved OSCs compared to standard catalyst systems (e.g., MPCs). OSC is a measure of an OSM's ability to supply oxygen to rich exhaust and take up oxygen from lean exhaust, thus buffering a catalyst system against the fluctuating supply of oxygen by maintaining a steady air/fuel ratio. In some embodiments, the SS Pd-OSMs of the present invention are able to buffer the air/fuel ratio at the stoichiometric point.

The OSC of an OSM is typically measured by exposing the OSM to either lean or rich air/fuel mixtures. In such environments, the OSM must either absorb $O_2$ from the exhaust stream (e.g., in lean air/fuel mixture environments) or release $O_2$ (e.g., in rich air/fuel mixture environments) in order to maintain efficient catalysis of exhaust compounds. The amount of time for which an OSM can buffer the lean/rich air/fuel mixture is one way to quantify the OSC of an OSM. This time is usually referred to as the "delay time"—i.e., the amount of time that it takes for a perturbation in the air/fuel mixture to manifest itself as a change in $O_2$ levels within the catalyst environment. The delay time can also be measured by the amount of time that it takes for a perturbation in the air/fuel mixture to manifest itself as a change in CO levels within the catalyst environment.

In some embodiments of the present invention, the SS Pd-OSM, such as SS Pd-IWCP OSM, exhibits a CO delay time of approximately 2-25, 2-20, 5-20, 5-15, 7-15, 10-15, or 12-15 seconds when exposed to a rich air/fuel mixture. In some embodiments, the SS Pd-OSM exhibits a CO delay time of approximately 2, 3, 4, 5, 6, 7, 8, 9, 10, 11, 12, 13, 14, 15, 16, 17, 18, 19, 20, 21, 22, 23, 24 or 25, or more, seconds when exposed to a rich air/fuel mixture. In some embodiments, the SS Pd-OSM exhibits a CO delay time of up to approximately 2, 3, 4, 5, 6, 7, 8, 9, 10, 11, 12, 13, 14, 15, 16, 17, 18, 19, 20, 21, 22, 23, 24 or 25, or more, seconds when exposed to a rich air/fuel mixture. In some embodiments, the SS Pd-OSM exhibits a CO delay time of at least approximately 2, 3, 4, 5, 6, 7, 8, 9, 10, 11, 12, 13, 14, 15, 16, 17, 18, 19, 20, 21, 22, 23, 24 or 25, or more, seconds when exposed to a rich air/fuel mixture. In a particular embodiment, the OSM exhibits a delay time of approximately 14 seconds when exposed to a rich air/fuel mixture. In another particular embodiment, the OSM exhibits a delay time of 14.3 seconds when exposed to a rich air/fuel mixture.

In other embodiments, the OSM exhibits an $O_2$ delay time of approximately 2-33, 2-30, 2-28, 5-28, 5-25, 5-20, 8-20, 8-18, 8-16, 10-16, 12-16, or 14-16 seconds when exposed to a lean air/fuel mixture. In some embodiments, the OSM exhibits an $O_2$ delay time of approximately 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33, or more, seconds when exposed to a lean air/fuel mixture. In other embodiments, the OSM exhibits an $O_2$ delay time of up to approximately 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33, or more, seconds when exposed to a lean air/fuel mixture. In other embodiments, the OSM exhibits a delay time of at least approximately 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32 or 33, or more, seconds when exposed to a lean air/fuel mixture. In a particular embodiment, the OSM exhibits a delay time of approximately 23 seconds when exposed to a lean air/fuel mixture. In another particular embodiment, the OSM exhibits a delay time of 22.7 seconds when exposed to a lean air/fuel mixture.

Figure 13:
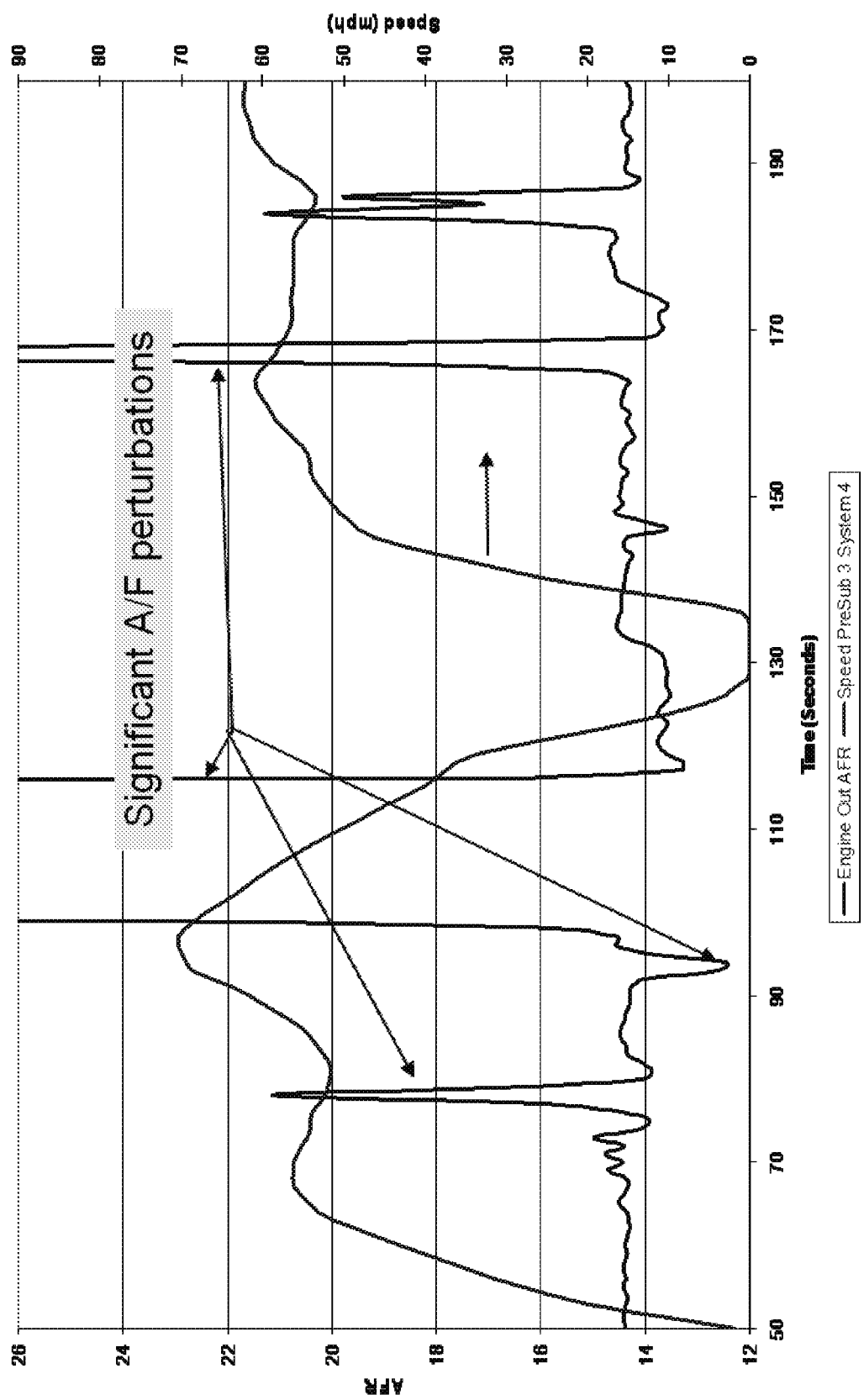
FIG. 13 is a graph of air/fuel ratio versus time during the early part of US06 cycle. The air/fuel ratio shows major lean perturbation around 100 seconds.
Figure 14:
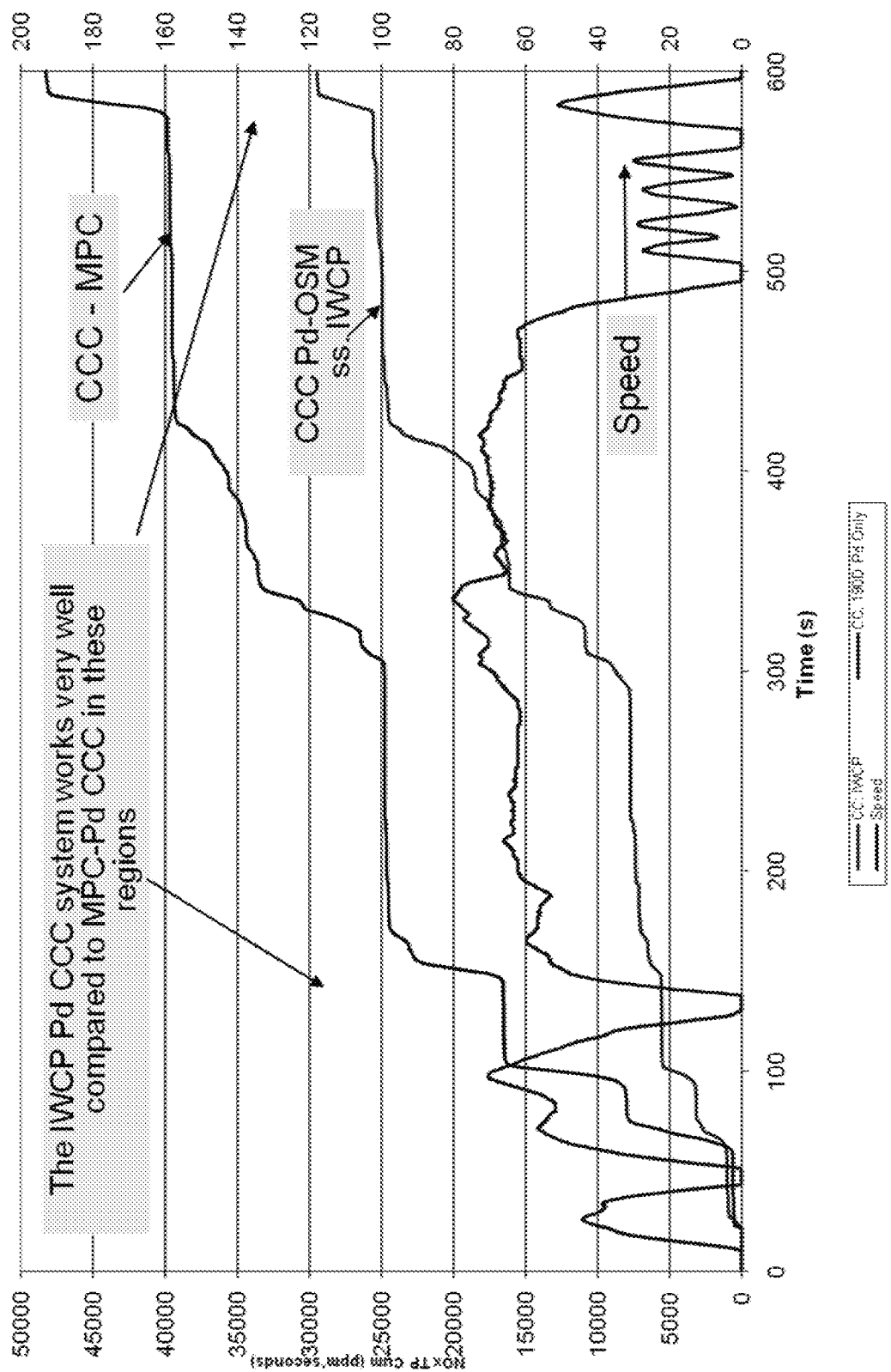
FIG. 14 is a graph of $NO_x$ emission (left Y-axis) and speed (right Y-axis) versus time illustrating the comparative levels of $NO_x$ emissions of the SS Pd-IWCP OSM and Pd-MPC catalyst systems.

The SS Pd-OSMs of the present invention also exhibit increased catalytic efficiency and are particularly useful in high engine speed environments Improved OSCs are especially important in these environments because of the very high temperatures and exhaust stream space velocities present (see Example 3 and FIGS. 13-14). These high temperature and high speed conditions make it difficult to maintain conversion efficiencies of $NO_x$, CO and hydrocarbons, resulting in increased tailpipe emissions. Without being bound by a particular theory, it may be that the high speed conditions produce a high velocity exhaust gas which reduces the amount of time the exhaust interacts with the catalyst sites.

As engine speeds fluctuate during normal use, the air/fuel mixture may also fluctuate. Thus, the SS Pd-OSMs of the present invention are better able to buffer the air/fuel mixture present in exhaust from engines operating at varying speeds (see Example 3, and FIGS. 13-14).

Catalyst Systems Comprising SS Pd-OSMs
Overview

The catalyst systems (including TWC catalyst systems) of the present invention may have a variety of architectures. For example, a catalytic converter system present in an automobile may contain both a CC catalyst and an UF catalyst, wherein the CC catalyst is placed closer to the engine in comparison to the UF catalyst.

Both CC and/or UF catalysts typically comprise (1) a substrate, (2) a washcoat supported by the substrate, and (3) an optional overcoat supported by the washcoat. In particular embodiments, the CC and/or UF catalyst comprises (1) a substrate, (2) a washcoat supported by the substrate, and (3) an overcoat supported by the washcoat. In some embodiments of the present invention, the catalyst systems comprise CC and UF catalysts comprising a SS Pd-OSM. The SS Pd-OSM may be present in either the washcoat, the overcoat, or both of either the CC catalyst, UF catalyst, or both. In particular embodiments, the catalyst systems comprise (1) a substrate, (2) a washcoat comprising a multi-phase catalyst (MPC), wherein the washcoat is supported by the substrate, and (3) an overcoat comprising a SS Pd-OSM, wherein the overcoat is supported by the washcoat.

In particular embodiments wherein the catalytic converter system comprises both a CC and UF catalyst, the CC catalyst comprises (1) a substrate, (2) a washcoat comprising a MPC, wherein the washcoat is supported by the substrate, and (3) an overcoat comprising a SS Pd-OSM, wherein the overcoat is supported by the washcoat. The CC catalyst overcoats and washcoats are substantially free, and preferably completely free, of Rh. In some embodiments, the CC catalyst overcoats and washcoats contain Pd as the metal catalyst. The CC catalyst washcoats may comprise perovskite-type compounds which are present as a phase of the MPC and which function as OSMs. In some embodiments, the metal catalyst (such as Pd) present in the CC catalyst washcoat is supported only by the perovskite-type compound. The CC catalyst washcoats and overcoats may contain additional components/additives as described herein.

In some embodiments wherein the catalytic converter system comprises both a CC and UF catalyst, the UF catalyst has the same composition as the CC catalyst describe above.

In particular embodiments wherein the catalytic converter system comprises both a CC and UF catalyst, the UF catalyst comprises (1) a substrate, (2) a washcoat comprising a MPC, wherein the washcoat is supported by the substrate, and (3) an overcoat comprising a MPC, wherein the overcoat is supported by the washcoat. In such embodiments, the UF catalyst may contain Pd and/or Rh as metal catalysts. In some embodiments, the UF washcoat may contain Pd as a metal catalyst while the UF overcoat contains Rh as a metal catalyst. As discussed in the context of the CC catalysts, the UF catalyst washcoats and overcoats may contain additional components/additives as described herein. In addition, the UF catalyst washcoats and overcoats may comprise perovskite-type compounds which are present as a phase of the MPC and which function as OSMs. In some embodiments, the metal catalyst present in the UF catalyst washcoats and overcoats are supported only by the perovskite-type compound.

Substrates

A variety of materials are appropriate as substrates for the present invention. For example, the substrate may be a refractive material, a ceramic substrate, a honeycomb structure, a metallic substrate, a ceramic foam, a metallic foam, a reticulated foam, or suitable combinations, where the substrate has a plurality of channels and at least the required porosity. As is known in the art, the number of channels present may vary depending upon the substrate used. It is preferred that the substrate offer a three-dimensional support structure.

The substrate may be in the form of beads or pellets. In such embodiments, the beads or pellets may be formed from, for example, alumina, silica alumina, silica, titania, mixtures thereof, or any suitable material. In a particular embodiment, the substrate may be a honeycomb substrate, for example a ceramic honeycomb substrate or a metal honeycomb substrate. The ceramic honeycomb substrate may be formed from, for example, sillimanite, zirconia, petalite, spodumene (lithium aluminum silicate), magnesium silicates, mullite, alumina, cordierite, other alumino-silicate materials, silicon carbide, aluminum nitride, or combinations thereof. Other ceramic substrates would be apparent to one of ordinary skill in the art.

In embodiments wherein the substrate is a metal honeycomb substrate, the metal may be, for example, a heat-resistant base metal alloy, particularly an alloy in which iron is a substantial or major component. In addition, metal substrate surface may be oxidized at elevated temperatures (e.g., above about 1000° C.) to improve the corrosion resistance of the alloy by forming an oxide layer on the surface of the alloy. This oxide layer on the surface of the alloy may also enhance the adherence of a washcoat to the surface of the monolith substrate.

In one embodiment, the substrate may be a monolithic carrier having a plurality of fine, parallel flow passages extending through the monolith. Such passages may be of any suitable cross-sectional shape and/or size. For example, such passages may be trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

Washcoats

The washcoats of the catalyst systems of the present invention typically comprise, inter alia, a metal catalyst, an OSM, a support oxide, and additives which aid in retarding metal catalyst poisoning.

Such washcoats may comprise multiphase catalysts (MPCs) and may generally be produced using standard techniques known in the art (see, for example, U.S. Pat. No. 7,641,875). See also Example 1. MPCs typically comprise, inter alia, a metal catalyst, an OSM, and a support oxide, and are represented by the general formula $Ce_yLn_{1-x}A_{x+s}MO_z$, wherein:

A is an element selected from the group consisting of Mg, Ca, Sr, Ba, Li, Na, K, Cs, Rb, La and any combination thereof, preferably La, Ca or Ba and more preferably Ba;

Ln is a mixture of elements originally in the form of single-phase mixed lanthanides collected from natural ores, a single lanthanide, or a mixture of artificial lanthanides, preferable La;

M is an element selected from the group consisting of Fe, Mn, Cr, Ni, Co, Cu, V, Zr, Pt, Pd, Rh, Ru, Ag, Au, Al, Ga, Mo, W, Ti, and any combination thereof, preferably Pd, and preferably not Rh;

x is a number defined by $0 \leq x < 1.0$;
y is a number defined by $0 \leq y < 10$;
s is a number defined by $0 \leq s < 10$; and
z is a number defined by $z > 0$,
where s=0 only when y>0 and y=0 only when s>0.

Washcoats present in the catalyst systems of the present invention may comprise perovskite-type compounds which are present as a phase of the MPC and which function as OSMs. In some embodiments, the metal catalyst present in the washcoat is supported only by the perovskite-type compound. Washcoats which comprise metal catalysts supported only by the perovskite-type compound are typically found in CC catalysts.

It has been observed that the amount (or thickness) of the washcoat present, wherein the same amount of catalyst is present in washcoats of varying thicknesses, can affect certain properties of the catalyst system. For example, the thickness of the washcoat can affect thermal and phosphorus (poisoning) aging as measured by the OSC, light-off temperatures ("T90s"), and conversion efficiencies (i.e., conversion of nitrogen oxides, carbon monoxide and unburnt hydrocarbons to their target compounds) after exposure to heat and poisoning agents such as phosphorus.

Increasing the total amount of washcoat, while keeping the amount of catalyst constant, has a beneficial effect on the OSC of catalyst systems which have been aged by either exposure to heat or simultaneous exposure to heat and phosphorus (see Examples 15 and 16 and Tables 11-12). Interestingly, while increasing the washcoat thickness improves the OSC after thermal aging, the OSC effect appears to taper in systems which have been exposed to simultaneous thermal and phosphorus aging. For example, as the washcoat thickness is increased from 150 g/L→180 g/L→210 g/L, a maximum beneficial effect on OSC is observed at 180 g/L (see Examples 15 and 16 and Tables 11-12). Without being bound by a particular theory, the decreased OSC benefit observed at 210 g/L may be due to the fact that the catalyst (in this case, Pd) is present at too dilute of a concentration at this large washcoat volume to effect the OSC.

In addition, it has been generally found that increasing the total amount of washcoat present in the catalyst system decreases (i.e., improves) the light-off temperature of the system, likely due to the fact that a larger mass of cold material takes longer to heat up.

Moreover, increasing the total amount of washcoat has a beneficial effect on the conversion efficiencies of the catalyst system after thermal and phosphorus aging (see Examples 15 and 16 and Tables 11-12).

Thus, in some embodiments, the catalyst system of the present invention comprises a washcoat, where the washcoat is present at between about 100 g/L-250 g/L. In some embodiments, the washcoat is present at between about 120 g/L-210 g/L, 150 g/L-210 g/L, 120 g/L-180 g/L, 120 g/L-150 g/L, or 150 g/L-180 g/L. In some embodiments, the washcoat is present at about 120 g/L, 150 g/L, 180 g/L, or 210 g/L. In particular embodiments, the washcoat is present at 120 g/L, 150 g/L, 180 g/L, or 210 g/L.

In other embodiments, the catalyst system of the present invention comprises a washcoat, where the washcoat is present at between up to about 100 g/L-250 g/L. In some embodiments, the washcoat is present at between up to about 120 g/L-210 g/L, 150 g/L-210 g/L, 120 g/L-180 g/L, 120 g/L-150 g/L, or 150 g/L-180 g/L. In some embodiments, the washcoat is present at up to about 120 g/L, 150 g/L, 180 g/L, or 210 g/L. In particular embodiments, the washcoat is present at up to 120 g/L, 150 g/L, 180 g/L, or 210 g/L.

The washcoats of the catalyst systems of the present invention may contain additives which aid in retarding the poisoning of precious metal catalysts by phosphorus and sulfur. Consumption of engine lubricants results in the generation of phosphorus and, in turn, the poisoning and deactivation of precious metal catalysts. Thus, additives such as calcium, barium, lanthanides and/or cerium may be added to the washcoats and/or overcoats (if present) as a means of retarding the poisoning process. In some embodiments, the additive is $CaCO_3$, $La_2O_3$ or $BaCO_3$. In a particular embodiment, the additive is $BaCO_3$.

Figure 9:
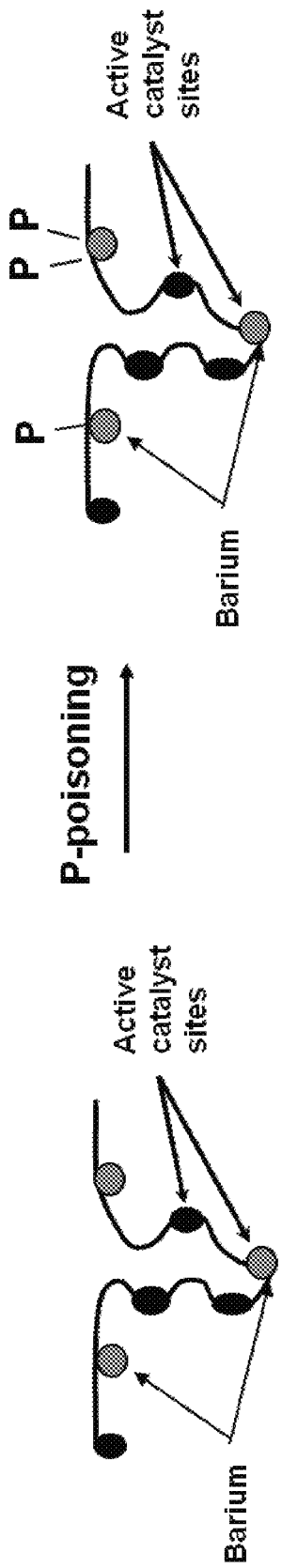
FIG. 9 is a diagram that illustrates how addition of barium to the overcoat reduces poisoning of the PGM by phosphorus. Barium reacts with exhaust phosphorus to form $Ba_3(PO_4)_2$.

Without being bound by a particular theory, the addition of barium provides a barium source ($BaCO_3$) which is able to react with exhaust phosphorus to form a stable compound (i.e., $Ba_3(PO_4)_2$). Because the reaction of $BaCO_3$ with exhaust phosphorus is thermodynamically favored and the $Ba_3(PO_4)_2$ product is thermodynamically stable, the barium acts to efficiently trap passing exhaust phosphorus in a form which does not poison the metal catalyst (see Examples 12 and 13 and FIG. 9). It is noted that, upon exposure to exhaust containing, for example phosphorus, $CaCO_3$, $La_2O_3$ and $BaCO_3$ are converted to $Ca_3(PO_4)_2$, $LaPO_4$ and $Ba_3(PO_4)_2$, respectively.

In some embodiments, the additive, such as $La_2O_3$ or $BaCO_3$, is impregnated into the washcoat at a concentration of 6M.

Overcoats

The overcoats of the catalyst systems of the present invention may comprise, inter alia, a metal catalyst, an OSM, a support oxide, and an additive which aids in retarding metal catalyst poisoning.

The overcoats of the present invention may comprise MPCs as discussed in the context of the washcoats and, thus, may be generated using the techniques and methods described in, for example, U.S. Pat. No. 7,641,875). See also Example 1.

The overcoats of the present invention may also comprise SS Pd-OSMs instead of MPCs, as discussed herein. In such embodiments, the overcoat may be generated using the IWCP. (see Example 2). Thus, in some embodiments, the overcoats of the present invention comprise, inter alia, a catalyst, a SS Pd-OSM, and an additive which aids in retarding catalyst poisoning. In other embodiments, the overcoat may further contain an amount of a support oxide which serves to improve the stability of the overcoat, as discussed below. In some embodiments, the SS Pd-OSM is present in the overcoat of the CC catalyst, but not the washcoat of the CC catalyst nor in the washcoat or overcoat of the UF catalyst.

As discussed in the context of the washcoats above, the overcoats of the catalyst systems may also contain additives which aid in retarding the poisoning of precious metal catalysts by phosphorus and sulfur. For example, calcium, barium, lanthanides and/or cerium may be added to the overcoats as a means of retarding the poisoning process. In some embodiments, the additive is $CaCO_3$, $La_2O_3$ or $BaCO_3$. In a particular embodiment, the additive is $BaCO_3$.

It has been found that the addition of $BaCO_3$ to the overcoat improves certain properties of the catalyst system, presumably due to the reduction in catalyst poisoning. For example, the addition of $BaCO_3$ yields overcoats whose conversion efficiencies (i.e., conversion of nitrogen oxides, carbon monoxide and unburnt hydrocarbons to their target compounds) resist aging. The addition of $BaCO_3$ to the overcoat significantly improves the nitrogen oxide and carbon monoxide performance (conversion efficiency) of catalysts after phosphorus aging when compared to overcoats which do not contain $BaCO_3$. In addition, overcoat containing $BaCO_3$ maintain a high level of total hydrocarbon conversion (see Example 14, Table 9). Interestingly, the addition of 20 grams of $BaCO_3$ appears to yield the most marked beneficial effects on conversion efficiencies.

Accordingly, in some embodiments, the overcoat comprises 0-50 g/L of $BaCO_3$. In other embodiments, the overcoat comprises about 0-10 g/L, 0-20 g/L, 0-30 g/L, 10-20 g/L, 10-30 g/L, or 15-25 g/L of $BaCO_3$. In other embodiments, the overcoat comprises about 25-35 g/L, 20-40 g/L, 55-65 g/L, or 50-60 g/L of $BaCO_3$. In yet other embodiments, the overcoat comprises about 10 g/L, 20 g/L, 30 g/L, or 60 g/L of $BaCO_3$. In still other embodiments, the overcoat comprises about 19-21 g/L, 18-22 g/L, 17-23 g/L, 16-24 g/L, 15-25 g/L, 29-31 g/L, 28-32 g/L, 27-33 g/L, 26-34 g/L, or 25-35 g/L of $BaCO_3$. In yet other embodiments, the overcoat comprises about 20 g/L or about 30 g/L of $BaCO_3$. In particular embodiments, the overcoat comprises 20 g/L or 30 g/L of $BaCO_3$.

The overcoat may also comprise up to about 0-50 g/L of $BaCO_3$. In other embodiments, the overcoat comprises up to about 0-10 g/L, 0-20 g/L, 0-30 g/L, 10-20 g/L, 10-30 g/L, or 15-25 g/L of $BaCO_3$. In other embodiments, the overcoat comprises up to about 25-35 g/L, 20-40 g/L, 55-65 g/L, or 50-60 g/L of $BaCO_3$. In yet other embodiments, the overcoat comprises up to about 10 g/L, 20 g/L, 30 g/L, or 60 g/L of $BaCO_3$. In still other embodiments, the overcoat comprises up to about 19-21 g/L, 18-22 g/L, 17-23 g/L, 16-24 g/L, 15-25 g/L, 29-31 g/L, 28-32 g/L, 27-33 g/L, 26-34 g/L, or 25-35 g/L of $BaCO_3$. In yet other embodiments, the overcoat comprises up to about 20 g/L or about 30 g/L of $BaCO_3$. In particular embodiments, the overcoat comprises up to 20 g/L or 30 g/L of $BaCO_3$.

Although overcoats comprising SS Pd-OSMs (e.g., overcoats present in a CC catalyst) effectively and efficiently purify engine exhaust without the need for a support oxide, the addition of an amount of support oxide, such as La—$Al_2O_3$, to the overcoat containing the SS Pd-OSM improves certain properties of the catalyst system. For example, addition of La—$Al_2O_3$ improves the light off temperature (see Example 14, Table 10).

Figure 10:
FIG. 10 is a diagram that illustrates how addition of $La—Al_2O_3$ to the OSM reduces sintering and helps to maintain an open pore structure.
Figure 10:
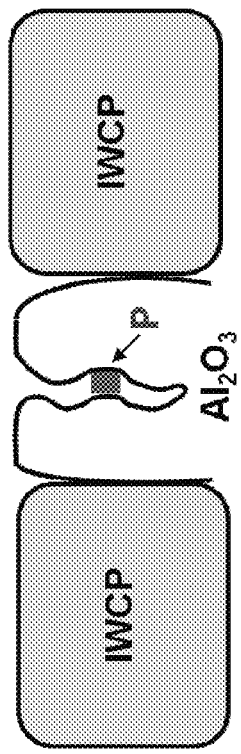

Further, the addition of an amount of support oxide, such as La—$Al_2O_3$, has been shown to minimize sintering of the overcoat during the aging process (see, FIG. 10). Sintering is a solid state mechanism where overcoat (or washcoat) particles contact and grow through solid-state diffusion. Without being bound by a particular theory, it is believed that the addition of La—$Al_2O_3$ disrupts the single, continuous OSM surface. This leads to the interspersing of La—$Al_2O_3$ throughout the overcoat and, in turn, leads to a decrease in aging-related sintering by reducing contact between particles of the overcoat. In addition, it is believed that the dispersion of La—$Al_2O_3$ throughout the overcoat leads to the formation of relatively open La—$Al_2O_3$ pores (see FIG. 10). These pores help to counteract the physical blocking of the overcoat by exhaust particulates and, thus, aid to reduce backpressure and increase the flow of exhaust through the catalyst system.

Figure 24:
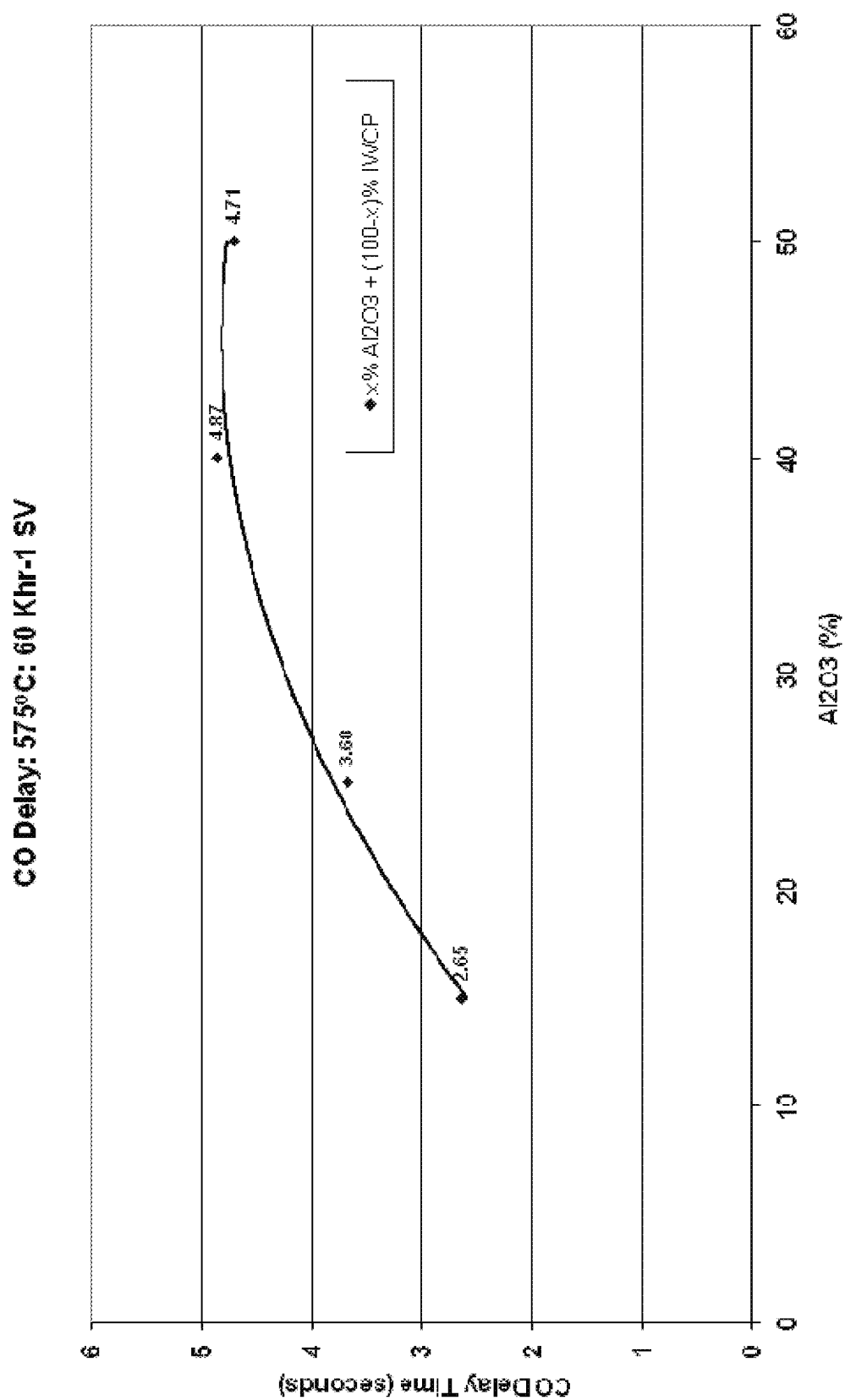
FIG. 24 is a graph that illustrates how CO delay time varies with the $La—Al_2O_3$ content of the overcoat. The OSC after phosphorus aging is improved by adding up to 40% $La—Al_2O_3$ to overcoats containing SS Pd-IWCP OSM.

It has been observed that the addition of up to 40% (by weight) of La—$Al_2O_3$ to the overcoat improves the OSC of the catalyst system (see Example 11 and FIG. 24). This is likely due to the improvement in sintering resistance of the OSM.

In some embodiments, the La—$Al_2O_3$ present in a SS Pd-OSM overcoat constitutes about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% of the overcoat by weight. In some embodiments, the La—$Al_2O_3$ constitutes about 0-50% of the SS Pd-OSM overcoat by weight. In other embodiments, the La—$Al_2O_3$ constitutes about 0-10%, 0-20%, 0-30%, or 0-40% of the SS Pd-OSM overcoat by weight. In other embodiments, the La—$Al_2O_3$ constitutes about 5-15%, 35-45%, or 30-50% of the SS Pd-OSM overcoat by weight. In yet other embodiments, the La—$Al_2O_3$ constitutes about 9-11%, 8-12%, 7-13%, 6-14%, 5-15%, 39-41%, 38-42%, 37-43%, 36-44%, or 5-15% of the SS Pd-OSM overcoat by weight. In still other embodiments, the La—$Al_2O_3$ constitutes about 10% or 40% of the SS Pd-OSM overcoat by weight. In particular embodiments, the alumina constitutes 10% or 40% of the SS Pd-OSM overcoat by weight.

The La—$Al_2O_3$ present in the SS Pd-OSM overcoat may also constitute up to about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% of the overcoat by weight. In some embodiments, the La—$Al_2O_3$ constitutes up to about 0-50% of the SS Pd-OSM overcoat by weight. In other embodiments, the La—$Al_2O_3$ constitutes up to about 0-10%, 0-20%, 0-30%, or 0-40% of the SS Pd-OSM overcoat by weight. In other embodiments, the La—$Al_2O_3$ constitutes up to about 5-15%, 35-45%, or 30-50% of the SS Pd-OSM overcoat by weight. In other embodiments, the La—$Al_2O_3$ constitutes up to about 10% or 40% of the SS Pd-OSM overcoat by weight. In particular embodiments, the alumina constitutes up to 10% or 40% of the SS Pd-OSM overcoat by weight In other embodiments, the SS Pd-OSM overcoat comprises about 0-40 g/L of La—$Al_2O_3$. In other embodiments, the SS Pd-OSM overcoat comprises about 0-20 g/L or 5-15 g/L of La—$Al_2O_3$. In other embodiments, the SS Pd-OSM overcoat comprises about 10 g/L of La—$Al_2O_3$. In particular embodiments, the SS Pd-OSM overcoat comprises 10 g/L of La—$Al_2O_3$.

In yet other embodiments, the SS Pd-OSM overcoat comprises up to about 0-40 g/L of La—$Al_2O_3$. In other embodiments, the SS Pd-OSM overcoat comprises up to about 0-20 g/L or 5-15 g/L of La—$Al_2O_3$. In other embodiments, the SS Pd-OSM overcoat comprises up to about 10 g/L of La—$Al_2O_3$. In particular embodiments, the SS Pd-OSM overcoat comprises up to 10 g/L of La—$Al_2O_3$.

Metal Catalysts

The metal catalysts present in the catalyst systems of the invention are typically present in the washcoat and/or overcoat (if one is present). Metal catalysts useful for the present invention include PGM, zirconia, alumina or lanthanide catalysts. In some embodiments, the catalyst systems comprise one or more metal catalysts. For example, the washcoat and overcoat may contain the same metal catalyst or different metal catalysts.

In some embodiments, the metal catalysts used are PGM catalysts—i.e., Ru, Rh, Pd, Os, Ir, Pt, or combinations thereof. In some embodiments, the metal catalysts used are Rh, Pd, Pt, or combinations thereof. In some embodiments, the metal catalysts used are Pd, Pt, or combinations thereof. In other embodiments, the metal catalyst is Pd. In yet other embodiments, the metal catalyst systems exclude Rh.

The metal catalyst used in a catalyst system may vary depending on the location of the metal catalyst. The identity of the metal catalyst may depend, for example, on whether the metal catalyst is present in a CC or UF catalyst and may further depend on whether the metal catalyst is present in the overcoat or washcoat of the CC or UF catalyst. For example, because Rh is a particularly expensive precious metal and CC catalysts are exposed to harsher conditions compared to UF catalysts (e.g., CC catalyst are exposed to higher heat conditions than UF catalysts) CC catalysts preferably contain reduced amounts of Rh and more preferably contain no Rh. In some embodiments, the CC washcoat contains a reduced amount of Rh, and preferably no Rh. In some embodiments, the CC overcoat contains a reduced amount of Rh, and preferably no Rh. In yet other embodiments, both the CC overcoat and washcoat contain a reduced amount of Rh, and preferably no Rh.

However, Rh is more suitable as a catalyst for the UF catalyst. Thus, in some embodiments, UF catalysts may contain Rh and/or Pd. In some embodiments, the UF washcoat and overcoat both contain Rh or both contain Pd. In other embodiments, the UF overcoat and washcoat contain different catalysts—i.e., one contains Rh while the other contains Pd. In some embodiments, the UF overcoat contains Rh while the washcoat contains Pd. In yet another embodiments, the both the UF overcoat and washcoat contain Pd.

The amount of metal catalyst present in the catalyst system may vary. In some embodiments, the catalyst system comprises a metal catalyst, such as Pd, at a concentration between about 5-200 g/ft$^3$, where the metal catalyst may be distributed between the overcoat (if present) and the washcoat. In embodiments where a washcoat and overcoat are present, the washcoat and overcoat may independently comprise a metal catalyst, such as Pd, at a concentration between about 5-100 g/ft$^3$. In some embodiments, the washcoat and overcoat independently comprise a metal catalyst, such as Pd, at a concentration between about 5-50 g/ft$^3$, 5-30 g/ft$^3$, 5-20 g/ft$^3$, 5-15 g/ft$^3$, 40-60 g/ft$^3$, 45-55 g/ft$^3$, 50-100 g/ft$^3$, 80-100 g/ft$^3$, or 90-100 g/ft$^3$. In some embodiments, the washcoat and overcoat independently comprise a metal catalyst, such as Pd, at a concentration of about 5, 10, 15, 20, 50 or 100 g/ft$^3$. In particular embodiments, the washcoat and overcoat independently comprise a metal catalyst, such as Pd, at a concentration of 5, 10, 15, 20, 50 or 100 g/ft$^3$.

In some embodiments, the washcoat and overcoat independently comprise a metal catalyst, such as Pd, at a concentration up to between about 5-50 g/ft$^3$, 5-30 g/ft$^3$, 5-20 g/ft$^3$, 5-15 g/ft$^3$, 40-60 g/ft$^3$, 45-55 g/ft$^3$, 50-100 g/ft$^3$, 80-100 g/ft$^3$, or 90-100 g/ft$^3$. In some embodiments, the washcoat and overcoat independently comprise a metal catalyst, such as Pd, at a concentration of up to about 5, 10, 15, 20, 50 or 100 g/ft$^3$. In particular embodiments, the washcoat and overcoat independently comprise a metal catalyst, such as Pd, at a concentration of up to 5, 10, 15, 20, 50 or 100 g/ft$^3$.

In some embodiments, the overcoat comprises a metal catalyst, such as Pd, at a concentration between about 0-50 g/ft$^3$, 0-30 g/ft$^3$, 0-20 g/ft$^3$, 0-15 g/ft$^3$, 0-10 g/ft$^3$, 0-5 g/ft$^3$, 5-10 g/ft$^3$, 5-15 g/ft$^3$, 5-20 g/ft$^3$, 10-15 g/ft$^3$ or 10-20 g/ft$^3$. In some embodiments, the overcoat comprises a metal catalyst, such as Pd, at a concentration of about 5, 10, 15, 20, 50 or 100 g/ft$^3$. In some embodiments, the overcoat comprises a metal catalyst, such as Pd, at a concentration of about 5, 10, 15 or 20 g/ft$^3$. In particular embodiments, the overcoat comprises a metal catalyst, such as Pd, at a concentration of 5, 10, 15 or 20 g/ft$^3$.

In some embodiments, the washcoat comprises a metal catalyst, such as Pd, at a concentration between about 0-50 g/ft$^3$, 0-30 g/ft$^3$, 0-20 g/ft$^3$, 0-15 g/ft$^3$, 0-10 g/ft$^3$, 0-5 g/ft$^3$, 5-10 g/ft$^3$, 5-15 g/ft$^3$, 5-20 g/ft$^3$, 10-15 g/ft$^3$ or 10-20 g/ft$^3$. In some embodiments, the washcoat comprises a metal catalyst, such as Pd, at a concentration of about 5, 10, 15, 20, 50 or 100 g/ft$^3$. In some embodiments, the washcoat comprises a metal catalyst, such as Pd, at a concentration of about 5, 10, 15 or 20 g/ft$^3$. In particular embodiments, the washcoat comprises a metal catalyst, such as Pd, at a concentration of 5, 10, 15 or 20 g/ft$^3$.

In some embodiments, the catalyst system contains a total amount of metal catalyst, such as Pd, of about 5-200 g/ft$^3$, 5-100 g/ft$^3$, 50-100 g/ft$^3$, 5-50 g/ft$^3$, 5-20 g/ft$^3$, or 5-10 g/ft$^3$. In other embodiments, the catalyst system contains a total amount of metal catalyst, such as Pd, of about 5-100 g/ft$^3$, 5-20 g/ft$^3$, or 5-10 g/ft$^3$. In particular embodiments, the catalyst system contains a total amount of metal catalyst, such as Pd, of about 5, 10, 15, 20, 50 or 100 g/ft$^3$. In particular embodiments, the catalyst system contains a total amount of metal catalyst, such as Pd, of 5, 10, 15, 20, 50 or 100 g/ft$^3$. The total amount of metal catalyst may be distributed evenly or unevenly between the washcoat and overcoat (if present).

In some embodiments, the catalyst system contains a total amount of metal catalyst, such as Pd, of up to about 5-200 g/ft$^3$, 5-100 g/ft$^3$, 50-100 g/ft$^3$, 5-50 g/ft$^3$, 5-20 g/ft$^3$, or 5-10 g/ft$^3$. In other embodiments, the catalyst system contains a total amount of metal catalyst, such as Pd, of up to about 5-100 g/ft³, 5-20 g/ft³, or 5-10 g/ft³. In some embodiments, the catalyst system contains a total amount of metal catalyst, such as Pd, of up to about 5, 10, 15, 20, 50 or 100 g/ft³. In particular embodiments, the catalyst system contains a total amount of metal catalyst, such as Pd, of up to 5, 10, 15, 20, 50 or 100 g/ft³.

In embodiments wherein both a washcoat and overcoat are present, the metal catalyst, such as Pd, may be distributed between the washcoat and overcoat in any proportion. For example, and without limitation, in embodiments wherein a total of about 20 g/ft³ of a metal catalyst, such as Pd, is present in the catalyst system: 1) the washcoat may contain about 15 g/ft³ of Pd and the overcoat may contain about 5 g/ft³ of Pd; 2) the washcoat may contain about 10 g/ft³ of Pd and the overcoat may contain about 10 g/ft³ of Pd; or 3) the washcoat may contain about 5 g/ft³ of Pd and the overcoat may contain about 15 g/ft³ of Pd. In addition, for example, in embodiments wherein a total of about 100 g/ft³ of a catalyst, such as Pd, is present in the catalyst system, the washcoat and overcoat may each contain about 50 g/ft³ of Pd.

In a particular embodiment, the catalyst system contains a total of 20 g/ft³ of Pd wherein 5 g/ft³ of Pd is present in the overcoat and 15 g/ft³ of Pd is present in the washcoat. In some embodiments, the 5 g/ft³ of Pd is present in the overcoat is present as a SS Pd-IWCP OSM.

It has been found, as is further discussed herein, that the uneven distribution of the catalyst, such as Pd, between the washcoat and overcoat can improve the overall performance of the catalyst system. For example, placing more than half the Pd present in the catalyst system in the washcoat has been shown to improve resistance to simultaneous thermal and phosphorus poisoning. This effect is manifested by an improvement in the OSC of the catalyst system after aging (see Example 17, Table 13). The benefit of placing the majority of the Pd in the washcoat likely stems from the susceptibility of Pd to phosphorus poisoning. Because phosphorus poisoning is more prevalent at the exterior of the catalyst (i.e., within the overcoat), the placement of the majority of Pd in the washcoat protects the metal. Thus, distribution of Pd in this manner is particularly beneficial in the context of CC catalysts due to the high exposure of such catalysts to phosphorus in engine exhaust.

In some embodiments comprising a CC and UF catalyst, the total amount of metal catalyst present in a CC catalyst is higher than the total amount of metal catalyst present in an UF catalyst. For example, in such embodiments, the total amount of Pd present in a CC catalyst would be more than the total amount of Pd and/or Rh (if Rh is present) present in the UF catalyst.

Support Oxides

Support oxides (mixed metal oxides) are, generally, porous solid oxides which are used to provide a high surface area which aids in oxygen distribution and exposure of catalysts to reactants such as $NO_x$, CO, and hydrocarbons. Support oxides are normally stable at high temperatures as well as at a range of reducing and oxidizing conditions.

Metal catalysts present in the washcoat, overcoat (if one is present), or both, are typically supported by support oxides. However, as discussed herein, in some embodiments, the washcoat and/or overcoat (if one is present) contains a catalyst, but does not contain a support oxide. In such embodiments, the washcoat and/or overcoat present in a CC and/or UF catalyst may contain a SS Pd-OSM which supports a metal catalyst without the need for a support oxide. The SS Pd-OSMs are preferably found in the CC catalyst. Thus, in one embodiment, the present invention contemplates a CC catalyst which comprises: 1) a washcoat which comprises, inter alia, a catalyst and a support oxide; and 2) an overcoat which comprises, inter alia, a catalyst present in a SS Pd-OSM, and no support oxide. In another embodiment, the present invention contemplates an UF catalyst comprising a washcoat and an overcoat wherein both comprise, inter alia, a catalyst and a support oxide.

The amount of support oxide present in a catalyst system may vary depending on where in the system the support oxide is present. In some embodiments, the washcoat and overcoat (if one is present) of a catalyst system may contain the same amount of support oxide. In other embodiments, the washcoat and overcoat (if one is present) of a catalyst system may contain different amounts of support oxide.

Suitable compounds for use as support oxides include, but are not limited to, gamma-alumina, ceria-based powders, or any mixture of titania, silica, alumina (transition and alpha-phase), ceria, zirconia, $Ce_{1-\alpha}Zr_\alpha O_2$, and any possible doped ceria formulations. In a preferred embodiment, the support oxide is alumina.

Modifiers may optionally be added to the alumina to retard undesired phase transitions of the alumina from the gamma phase to the alpha phase when the alumina is exposed to elevated temperatures—i.e., to stabilize the alumina. Examples of suitable modifiers (or thermal stabilizers) include, for example, rare earth oxides, silicon oxides, oxides of Group IVB metals (zirconium, hafnium, or titanium), alkaline earth oxides, or combinations thereof. Alumina is typically utilized in the washcoat as a high surface area carrier solid or support and is referred to as "gamma alumina" or "activated alumina." Suitable alumina compositions generally have a BET (Brunauer, Emmett and Teller) surface area of 60 m²/g or more and, often, about 200 m²/g or more.

Specific examples of suitable stabilizing agents include lanthanide oxides ($Ln_2O_3$) and/or strontium oxide (SrO). Such lanthanide- and strontium-based stabilizing agents are typically added to support oxides (e.g., alumina) as a solution of lanthanide nitrate, strontium nitrate, or mixtures thereof. Heating or calcining the lanthanide nitrate and/or strontium nitrate then forms the desired oxide. A particular example of a useful stabilized alumina is La—$Al_2O_3$.

In some embodiments, the washcoat contains alumina as the support oxide. In particular embodiments, the support oxide is comprised of La—$Al_2O_3$. Accordingly, in some embodiments, the alumina (e.g., La—$Al_2O_3$) present in the washcoat constitutes 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the washcoat by weight. In some embodiments, the alumina constitutes about 10-100% of the washcoat by weight. In other embodiments, the alumina constitutes about 20-60%, 30-50% or 35-45% of the washcoat by weight. In other embodiments, the alumina constitutes about 40-80%, 50-70% or 55-65% of the washcoat by weight. In some embodiments, the alumina constitutes about 20%, 40% or 60% of the washcoat by weight. In particular embodiments, the alumina constitutes 20%, 40% or 60% of the washcoat by weight. Such alumina amounts are suitable for Pd-MPC washcoats.

The alumina present in the washcoat may also constitute up to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the washcoat by weight. In some embodiments, the alumina constitutes up to about 10-100% of the washcoat by weight. In other embodiments, the alumina constitutes up to about 20-60%, 30-50% or 35-45% of the washcoat by weight. In other embodiments, the alumina constitutes up to about 40-80%, 50-70% or 55-65% of the washcoat by weight. In some embodiments, the alumina constitutes up to about 20%, 40% or 60% of the washcoat by weight. In particular embodiments, the alumina constitutes up to 20%, 40% or 60% of the washcoat by weight. Such alumina amounts are suitable for Pd-MPC washcoats.

In some embodiments, the alumina (e.g., La—$Al_2O_3$) present in the overcoat (if present) constitutes 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the overcoat by weight. In some embodiments, the alumina constitutes about 0-40% of the overcoat by weight. In other embodiments, the alumina constitutes about 0-5%, 0-10%, 0-15%, 5-10%, 5-15%, 5-20%, 10-20%, 10-15% or 0-20% of the overcoat by weight. In other embodiments, the alumina constitutes about 10-40%, 15-35% or 20-30% of the overcoat by weight. In yet other embodiments, the alumina constitutes about 40-80%, 50-70%, 55-65%, 60-100%, 70-90%, or 75-85% of the overcoat by weight. In other embodiments, the alumina constitutes about 0%, 5%, 10%, 15%, 20%, 25%, 40%, 60%, or 80%, of the overcoat by weight. In yet other embodiments, the alumina constitutes about 0%, 10%, 25%, 40%, 60%, or 80% of the overcoat by weight. In particular embodiments, the alumina constitutes 0%, 10%, 25%, 40%, 60%, or 80% of the overcoat by weight. Such alumina amounts are suitable for Pd-MPC overcoats. Alumina amounts suitable for SS Pd-OSM overcoats are discussed in the context of overcoats, above.

The alumina present in the overcoat may also constitute up to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the overcoat by weight. In some embodiments, the alumina constitutes up to about 0-40% of the overcoat by weight. In other embodiments, the alumina constitutes up to about 0-5%, 0-10%, 0-15%, 5-10%, 5-15%, 5-20%, 10-20%, 10-15% or 0-20% of the overcoat by weight. In other embodiments, the alumina constitutes up to about 10-40%, 15-35% or 20-30% of the overcoat by weight. In yet other embodiments, the alumina constitutes up to about 40-80%, 50-70%, 55-65%, 60-100%, 70-90%, or 75-85% of the overcoat by weight. In other embodiments, the alumina constitutes up to about 0%, 5%, 10%, 15%, 20%, 25%, 40%, 60%, or 80%, of the overcoat by weight. In yet other embodiments, the alumina constitutes up to about 0%, 10%, 25%, 40%, 60%, or 80% of the overcoat by weight. In particular embodiments, the alumina constitutes up to 0%, 10%, 25%, 40%, 60%, or 80% of the overcoat by weight. Such alumina amounts are suitable for Pd-MPC overcoats. Alumina amounts suitable for SS Pd-OSM overcoats are discussed in the context of overcoats, above.

Oxygen Storage Materials (OSMs)

During operation, catalytic converters may be exposed to exhaust that is either rich (contains a high amount of unburnt fuel compared to oxygen) or lean (contains a low amount of unburnt fuel compared to oxygen). Accordingly, washcoats and/or overcoats of catalyst systems may contain oxygen storage materials (OSMs) which supply oxygen to rich exhaust and take up oxygen from lean exhaust, buffering the catalyst systems against the fluctuating supply of oxygen and, in turn, increasing catalyst efficiency with respect to hydrocarbon and CO oxidation. Thus, OSMs present in, for example, TWC catalyst compositions, allow the conversion efficiency of the catalysts system to remain relatively constant even in the face of varying inlet air/fuel ratios. In some embodiments, the OSM maintains the air/fuel ratio at the stoichiometric point. OSMs may comprise zirconia, lanthanides, alkaline earth metals, transition metals, cerium oxide materials, or mixtures thereof. The use of cerium oxide in catalytic converters is described in "Critical Topics in Exhaust Gas Treatment" (Research Studies Press Ltd, Baldock, Hertfordshire, England, 2000), which is incorporated herein by reference in its entirety.

Traditionally, OSMs comprising cerium oxide have a composition according to the formula:

$Ce_{1-a}Zr_aO_{2-\delta}$, wherein:

$0 < a < 1$; and $\delta$ is an oxygen deficiency valued between $0 < \delta 1 < (1-a)/2$. The oxygen deficiency in the formula of the cerium oxide-based material changes as the cerium oxide-based material takes up and releases oxygen.

In some embodiments, "a" is in the range of approximately 0.07 to approximately 0.70. In other embodiments, "a" is in the range of approximately 0.15 to approximately 0.53. In yet other embodiments, "a" is in the range of approximately 0.15 to approximately 0.28. Typical OSM compositions are described in, for example, U.S. Pat. No. 7,641,875, which is incorporated herein by reference in its entirety.

As discussed above, the present invention refers to improved OSMs wherein the catalyst (e.g., Pd) is present as a SS within the OSM. Thus, in some embodiments, the OSM is a SS Pd-OSM.

The OSM used in a catalyst system (i.e., traditional OSM or SS Pd-OSM) may vary depending on the location of the OSM. The identity of the OSM may depend, for example, on whether the OSM is present in a CC or UF catalyst and may further depend on whether the OSM is present in the overcoat or washcoat of the CC or UF catalyst. The SS Pd-OSM may be used in either the overcoat or washcoat of both the CC and UF catalysts. In some embodiments, however, the SS Pd-OSM is present only in the CC catalyst. In other embodiments, the SS Pd-OSM is present in the overcoat of the CC catalyst, but not in the washcoat. In a particular embodiment, the SS Pd-OSM present in the overcoat of the CC catalyst, but not in the washcoat, is a SS Pd-IWCP OSM.

In some embodiments, the OSM present in the washcoat constitutes 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the washcoat by weight. In some embodiments, the OSM constitutes about 10-100% of the washcoat by weight. In other embodiments, the OSM constitutes about 20-60%, 30-50% or 35-45% of the washcoat by weight. In other embodiments, the OSM constitutes about 40-80%, 50-70% or 55-65% of the washcoat by weight. In some embodiments, the OSM constitutes about 40% or 60% of the washcoat by weight. In particular embodiments, the OSM constitutes 40% or 60% of the washcoat by weight.

The OSM present in the washcoat may also constitute up to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the washcoat by weight. In some embodiments, the OSM constitutes up to about 10-100% of the washcoat by weight. In other embodiments, the OSM constitutes up to about 20-60%, 30-50% or 35-45% of the washcoat by weight. In other embodiments, the OSM constitutes up to about 40-80%, 50-70% or 55-65% of the washcoat by weight. In some embodiments, the OSM constitutes up to about 40% or 60% of the washcoat by weight. In particular embodiments, the OSM constitutes up to 40% or 60% of the washcoat by weight.

In some embodiments, the OSM present in the overcoat (if present) constitutes 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the overcoat by weight. In some embodiments, the OSM constitutes about 20-80% or 50-100% of the overcoat by weight. In other embodiments, the OSM constitutes about 20-60%, 30-50%, 35-45%, 50-90%, 60-80%, 65-85%, or 65-75% of the overcoat by weight. In other embodiments, the OSM constitutes about 40-80%, 50-70%, 55-65%, 60-100%, 70-90%, or 75-85% of the overcoat by weight. In some embodiments, the OSM constitutes about 40%, 60%, 70%, 75% or 80% of the overcoat by weight. In particular embodiments, the OSM constitutes 40%, 60%, 70%, 75% or 80% of the overcoat by weight.

The OSM present in the overcoat (if present) may also constitute up to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the overcoat by weight. In some embodiments, the OSM constitutes up to about 20-80% or 50-100% of the overcoat by weight. In other embodiments, the OSM constitutes up to about 20-60%, 30-50%, 35-45%, 50-90%, 60-80%, 65-85%, or 65-75% of the overcoat by weight. In other embodiments, the OSM constitutes up to about 40-80%, 50-70%, 55-65%, 60-100%, 70-90%, or 75-85% of the overcoat by weight. In some embodiments, the OSM constitutes up to about 40%, 60%, 70%, 75% or 80% of the overcoat by weight. In particular embodiments, the OSM constitutes up to 40%, 60%, 70%, 75% or 80% of the overcoat by weight.

In some embodiments, the overcoats of the present invention are composed predominantly or entirely of a SS Pd-OSM, such as SS Pd-IWCP OSM. In some embodiments, the SS Pd-OSM is the only OSM present in the overcoat and constitutes 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the overcoat by weight. In some embodiments, the SS Pd-OSM constitutes about 10-100% of the overcoat by weight. In other embodiments, the SS Pd-OSM constitutes about 50-100%, 50-90%, 60-80%, 65-75%, or 70-80% of the overcoat by weight. In other embodiments, the SS Pd-OSM constitutes about 70% or 75% of the overcoat by weight. In particular embodiments, the SS Pd-OSM constitutes 70% or 75% of the overcoat by weight.

The SS Pd-OSM, such as SS Pd-IWCP OSM, present in the overcoat may also constitute up to 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the overcoat by weight. In some embodiments, the SS Pd-OSM constitutes up to about 10-100% of the overcoat by weight. In other embodiments, the SS Pd-OSM constitutes up to about 50-100%, 50-90%, 60-80%, 65-75%, or 70-80% of the overcoat by weight. In other embodiments, the SS Pd-OSM constitutes up to about 70% or 75% of the overcoat by weight. In particular embodiments, the SS Pd-OSM constitutes up to 70% or 75% of the overcoat by weight.

In other embodiments, the overcoat comprises 10-100 g/L of SS Pd-OSM. In other embodiments, the overcoat comprises 50-100 g/L, 50-90 g/L, 60-80 g/L, 65-75 g/L, or 70-80 g/L of SS Pd-OSM. In other embodiments, the overcoat comprises about 70 g/L of SS Pd-OSM. In particular embodiments, the overcoat comprises 70 g/L of SS Pd-OSM.

In yet other embodiments, the overcoat comprises up to 10-100 g/L of SS Pd-OSM. In other embodiments, the overcoat comprises up to 50-100 g/L, 50-90 g/L, 60-80 g/L, 65-75 g/L, or 70-80 g/L of SS Pd-OSM. In other embodiments, the overcoat comprises about up to 70 g/L of SS Pd-OSM. In particular embodiments, the overcoat comprises up to 70 g/L of SS Pd-OSM.

In some embodiments, the SS Pd-OSM, such as SS Pd-IWCP OSM, is present in the washcoat at the same concentration(s) recited in the context of the overcoat, above. In general, higher amounts of the SS Pd-OSM are present in the washcoat when compared to the overcoat.

In some embodiments, the overcoat and washcoat contain the following OSMs: washcoat OSM of (30% $CeO_2$, 60% $ZrO_2$, 5% $Nd_2O_3$ and 5% $Y_2O_3$) (% by weight) and an overcoat OSM of (30% $CeO_2$, 60% $ZrO_2$, 5% $Nd_2O_3$, 5% $Pr_6O_{11}$) (% by weight).

Methods of Making SS Pd-OSMs

In yet another aspect, the present invention relates to methods of making the SS Pd-OSMs disclosed herein.

In order to form a SS suitable for use in SS Pd-OSMs, the process for the generation of the OSMs must yield Pd which is uniformly dispersed over the surface of, and throughout the OSM. Such an OSM structure can be made by dispersing the Pd precursor on the surface of the OSM as a host oxide. This dispersal permits the migration of Pd into sites within the OSM structure during the calcination process via solid state diffusion.

The SS Pd OSMs of the present invention were generated by an Improved Wet Chemical Process (IWCP) and the High Temperature Process (HTP). The IWCP represents an improvement over the traditional Wet Chemical Process (WCP). Specifically, the IWCP yields SS Pd-IWCP OSMs with even dispersal of Pd throughout and on the surface of the OSM (see Examples 8 and 9 and FIGS. 17-18).

The key differences between the IWCP and the WCP lie in: 1) the support choice (specifically an OSM material); 2) the base used to adjust the pH during the IWCP; and 3) the fact that the amount of base used during the IWCP is linked to the amount of Pd present as opposed to a target pH of the solution (as in the WCP). Details of the IWCP can be found in Example 2.

It had been found that the type of and amount of base used is particularly important (see Example 2).

In some embodiments, the base used in the IWCP is selected from tetraalkylammonium hydroxides (e.g., tetraethylammonium hydroxide, tetramethylammonium hydroxide, tetrapropylammonium hydroxide and tetrabutylammonium hydroxide), BaO, $Ba(OH)_2$, $BaCO_3$, SrO, $Sr(OH)_2$ and $SrCO_3$.

In a particular embodiment, the base is tetraethylammonium hydroxide.

In some embodiments, the base and transition metal are present in a fixed molar ratio. In particular embodiments, the molar ratio of base to transition metal is between about 1.5:1 and 3.5:1. In other embodiments, the molar ratio is about 3.5:1, 3.25:1, 3:1, 2.75:1, 2.5:1, 2.25:1, 2:1, 1.75:1 or 1.5:1. In particular embodiments the molar ratio is 2.5:1 or 2.75:1. In particular embodiments of the methods above, the base is tetraethylammonium hydroxide and the transition metal is Pd. In some embodiments, tetraethylammonium hydroxide and Pd are present in a molar ratio of 2.5:1 or 2.75:1.

The SS Pd-OSMs of the present invention can also be made using a high-temperature process (HTP) (i.e., SS Pd-HTP OSMs). The HTP entails first mixing a Pd chemical precursor and an oxide OSM, and then spraying the mixture into a hot furnace. In some embodiments, the Pd chemical precursor is $Pd(NO_3)_2$. In some embodiments the temperature of the hot zone of the furnace is greater than 500° C. In some embodiments the temperature of the furnace is between 300° C. and 500° C.

SS Pd-OSMs made from either the IWCP or the HTP process exhibit similar CO and hydrocarbon performance.

It is noted that other processes may be used to make a SS Pd-OSM, such as co-precipitation.

Methods of Using SS Pd-OSMs

Catalyst systems comprising the SS Pd-OSMs of the present invention, such the SS Pd-IWCP OSM, are useful for a variety of purposes. As discussed herein, the SS Pd-OSMs may be used in catalytic converter systems present in, for example, automobiles.

Thus, in some embodiments, catalyst systems comprising the SS Pd-OSMs of the present invention are used to reduce toxic exhaust gas emissions from internal combustion engines. Accordingly, the present invention envisions a method of reducing toxic exhaust gas emissions comprising contacting the gas emissions with catalyst systems comprising SS Pd-OSMs, such as the SS Pd-IWCP OSM. The present invention also refers to a method of reducing toxic exhaust gas emissions by utilizing catalyst systems comprising SS Pd-OSMs, such as the SS Pd-IWCP OSM (or by incorporating the same into a catalyst system).

Catalyst systems comprising the SS Pd-OSMs of the present invention, such as the SS Pd-IWCP OSM, exhibit improved oxygen flow as discussed herein. Accordingly, the present invention envisions a method of increasing oxygen flow through a catalyst system by utilizing catalyst systems comprising SS Pd-OSMs, such as the SS Pd-IWCP OSM (or by incorporating the same into a catalyst system).

As discussed herein, catalyst systems comprising the SS Pd-OSMs of the present invention, such as the SS Pd-IWCP OSM, exhibit improved OSCs. Thus, the present invention envisions a method of increasing the OSC of a catalyst system by utilizing a SS Pd-OSM, such as the SS Pd-IWCP OSM (or by incorporating the same into a catalyst system).

Catalyst systems comprising the SS Pd-OSMs of the present invention, such as the SS Pd-IWCP OSM, also improve the lifetime of PGM catalysts present in the system. For example, the SS Pd-OSMs of the present invention reduce poisoning of Pd. Thus, in another aspect, the present invention refers to methods of improving the lifetime of a PGM catalyst, such as Pd, present in a catalyst system by utilizing SS Pd-OSMs, such as the SS Pd-IWCP OSM (or by incorporating the same into a catalyst system).

Further, catalyst systems comprising the SS Pd-OSMs of the present invention, such as the SS Pd-IWCP OSM, improve the light-off performance of a catalyst system, as discussed herein. Thus, in one aspect, the present invention refers to methods of improving the light-off performance of a catalyst system by utilizing SS Pd-OSMs, such as the SS Pd-IWCP OSM, in a catalyst system (or by incorporating the same into a catalyst system).

Catalyst systems comprising the SS Pd-OSMs of the present invention, such as the SS Pd-IWCP OSM, are able to efficiently purify exhaust without the need for high levels of Rh. Indeed, such catalyst systems are able to purify exhaust without the use of any amount of Rh. Thus, in another embodiment, the present invention refers to a method of reducing the amount of Rh present in a catalyst system while maintaining catalyst efficiency by utilizing SS Pd-OSMs, such as the SS Pd—IWCP OSM, in a catalyst system (or by incorporating the same into a catalyst system). In some embodiments, the catalyst system used in such methods is completely free of Rh.

The present invention also refers to methods of simultaneously converting a) nitrogen oxides to nitrogen and oxygen; b) carbon monoxide to carbon dioxide; and c) hydrocarbons to carbon dioxide and water (i.e., TWC) present in exhaust gas emissions, comprising contacting the gas emissions with catalyst systems comprising SS Pd-OSMs, such as the SS Pd-IWCP OSM. The present invention also refers to a methods for such TWC by utilizing catalyst systems comprising SS Pd-OSMs, such as the SS Pd-IWCP OSM (or by incorporating the same into a catalyst system).

These and other embodiments of the invention may be further illustrated in the following non-limiting Examples.

EXAMPLES

Example 1

Generation of Washcoat Using Multiphase Catalyst (MPC)

The multi-phase catalyst (MPC) washcoats of the present invention were produced using standard techniques known in the art (see, for example, U.S. Pat. No. 7,641,875).

A slurry comprising the OSM, alumina powder and lanthanide nitrate solution (commercially available as lanthanum nitrate product code 5248 from Molycorp, Inc., Mountain Pass, Calif.) in deionized water was generated. The slurry was then milled in a Szegvari Type IS Atrittor until the rheology was suitable for coating the support. A cordierite honeycomb support was dipped into the slurry. Excess slurry was blown from the support with an air jet. The support was dried in flowing air at room temperature, was heat-treated in air at about 150° C., and was calcined at 750° C. for 4 hours to yield a MPC composition.

An aqueous solution of palladium nitrate and barium carbonate/acetate was prepared and impregnated into the MPC composition. The impregnated catalyst was dried in flowing air at room temperature followed by heat-treatment in air at 700° C. for 4 hours in air.

Example 2

Generation of OSM Using the Improved Wet Chemical Process (IWCP)

Oxygen storage materials generated using the Improved Wet Chemical Process (IWCP) (e.g., SS Pd-IWCP OSMs) contain a metal catalyst (e.g., Pd) in a solid solution ("SS") with the OSM (in this case a Ce-containing mixed metal oxide). Thus, OSMs generated using the IWCP contain a metal catalyst which is evenly dispersed throughout the OSM and the surface of the OSM.

In order to form a solid solution suitable for use in OSMs, the process for the generation of the OSMs must yield Pd which is uniformly dispersed over the surface of the OSM. Such an OSM structure can be made by dispersing the Pd precursor on the surface of the OSM as a host oxide. This dispersal allows for the migration of Pd into sites within the OSM structure during the calcination process. It is noted that starting with a highly segregated Pd precursor on the surface of the OSM (as in the WCP) would not allow Pd diffusion into the OSM during calcination. Instead, Pd would agglomerate into large particles on the surface of the OSM. Accordingly, a solid solution would not be formed.

Figure 11:
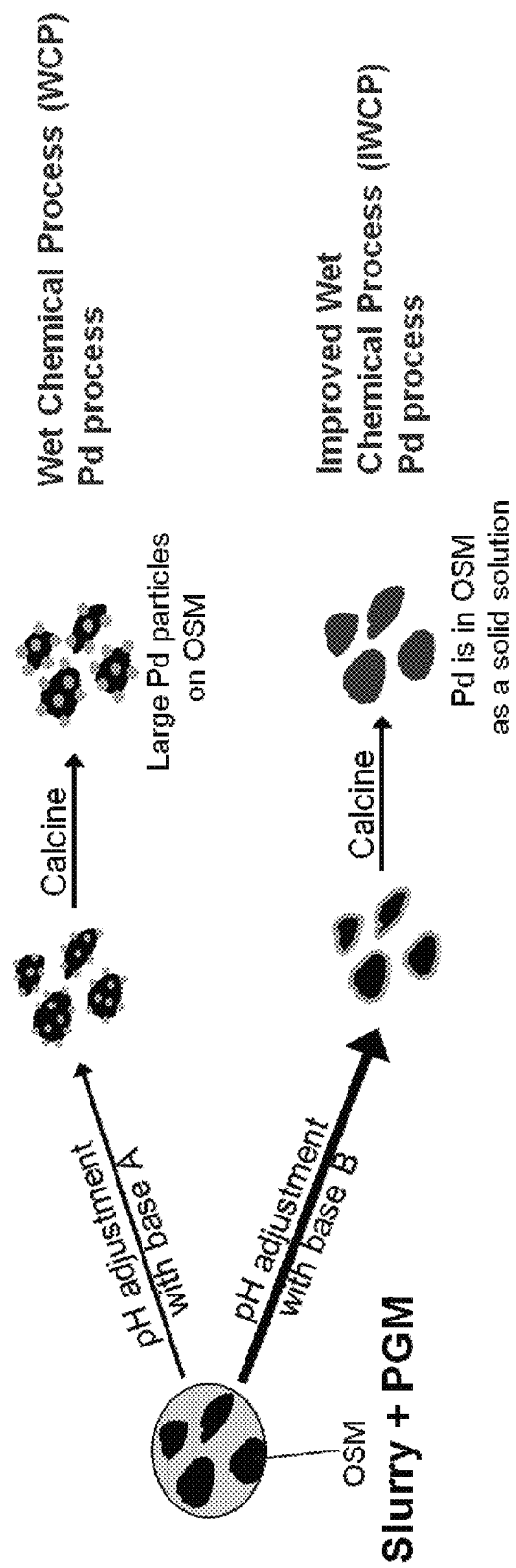
FIG. 11 illustrates the effects of the amount and kind of base used in the generation of mixed-metal oxides. Use of the incorrect base or amount of base can lead to the undesired formation of Pd, in the form of PdO, agglomerated on the surface of the OSM (see WCP). Use of the correct base in the correct amount yields Pd present as a solid solution with the OSM (see IWCP).

The kind of and amount of base used is particularly crucial for the formation of a solid solution. Use of the incorrect or amount of base (i.e., use of the standard WCP) can lead to the undesired formation of Pd, in the form of PdO, agglomerated on the surface of the OSM. The IWCP addresses this agglomeration issue. This is demonstrated in FIG. 11.

The key differences between the IWCP and WCP lie in: 1) the support choice (specifically an OSM material); 2) the base used to adjust the pH during the IWCP; and 3) the fact that the amount of base used during the IWCP is linked to the amount of Pd present as opposed to a target pH of the solution (as in the WCP). A comparison of the key differences between the IWCP and the WCP for making OSMs is laid out in Table 1.

TABLE 1

|  | WCP (Example w/Rh) | IWCP (Example w/ Pd-OSM IWCP) | Differences |
|---|---|---|---|
| Raw material | Alumina + OSM (30% $CeO_2$, 60% $ZrO_2$, 5% $Nd_2O_3$ and 5% $Y_2O_3$) + Rh | OSM (30% $CeO_2$, 60% $ZrO_2$, 5% $Nd_2O_3$, 5% $Pr_6O_{11}$) + Pd | Different support |
| Slurry % solids | ~20% | ~20% | — |
| OC loading | 60 g/L | 60 g/L | — |
| Timing of adding PGM precursor | After milling | After milling | — |
| Base | Ammonium hydroxide | Tetraethylammonium hydroxide | Choice of base |
| Base addition | Amount of ammonium hydroxide added determined by target pH | Amount of base tetraethylammonium hydroxide added determined by amount of Pd present: Molar ratio tetraethyammonium hydroxide:$Pd(NO_3)_2$ = 2.5:1 or 2.75:1 | pH value oriented vs. base amount oriented |

In a representative IWCP procedure, $Pd(NO_3)_2$ was added to an aqueous slurry of milled OSM (30% $CeO_2$, 60% $ZrO_2$, 5% $Nd_2O_3$ and 5% $Pr_6O_{11}$). Tetraethylammonium hydroxide was then added to generate the IWCP-OSM slurry.

Separately, La—$Al_2O_3$ was milled with acetic acid at a pH of ~6.0. $BaCO_3$ was then added to the milled La—$Al_2O_3$ and stirred for approximately 5 minutes. The La—$Al_2O_3$/$BaCO_3$ mixture was then added to IWCP-OSM slurry and the resulting composition was coated on to the washcoat which was calcined to generate the Pd-OSM IWCP containing catalyst composition.

Figure 12:
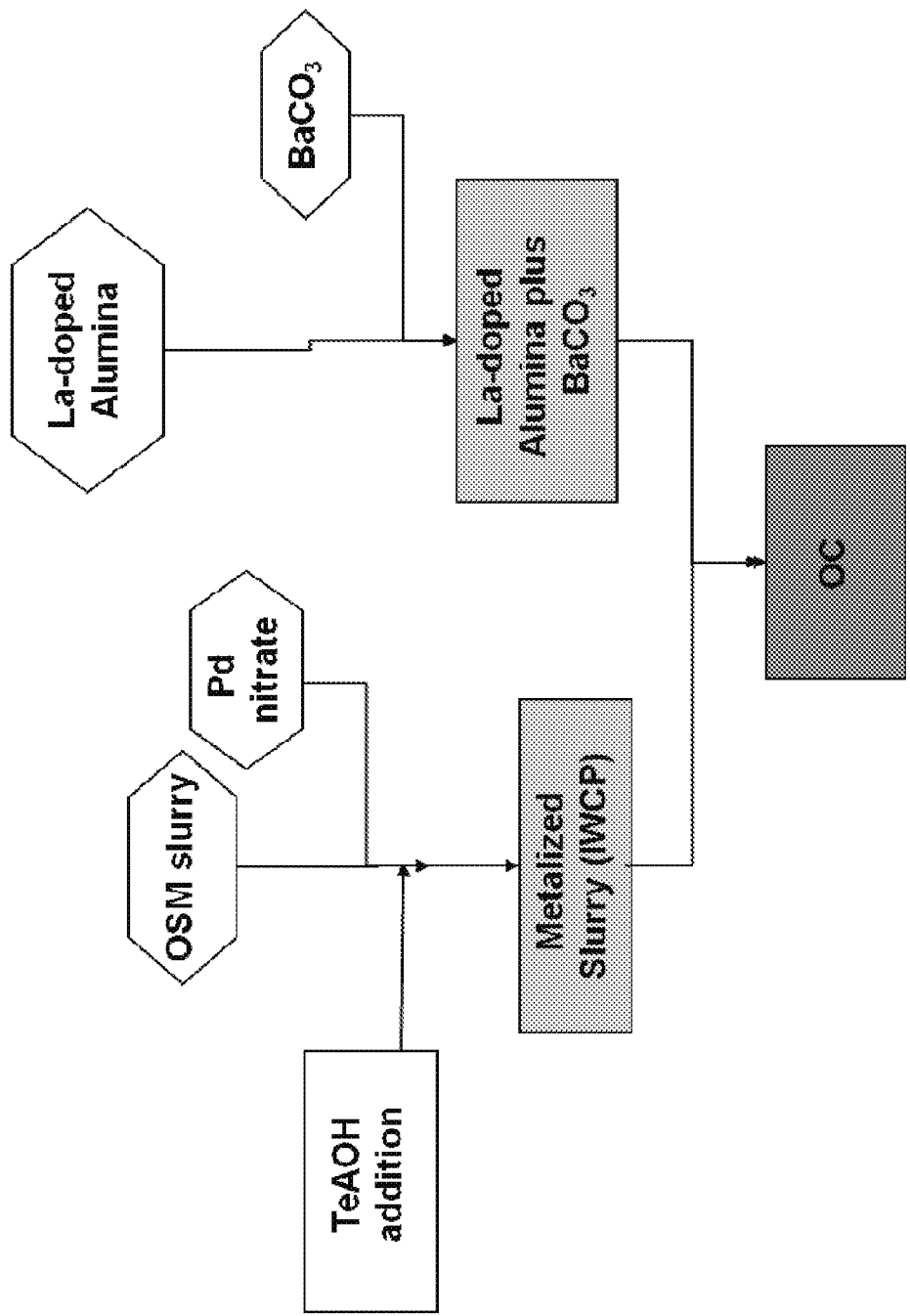
FIG. 12 is a flowchart illustrating the steps of the IWCP used to generate an overcoat (OC).

FIG. 12 is a flowchart illustrating this process.

Example 3

Efficiency of SS Pd-IWCP OSM Based on Vehicle Test Results

The catalytic efficiency of the SS Pd-IWCP OSM generated using the method of Example 2 was evaluated. In addition, the SS Pd-IWCP OSM efficiency was compared to that of a Pd-MPC catalyst generated using the method of Example 1. Both the SS Pd-IWCP OSM and the Pd-MPC: contained the same amount of Pd, contained only Pd as the precious metal catalyst, and were evaluated in a close-coupled system.

Improved OSC's, such as those exhibited by the SS Pd-OSMs of the present invention, are particularly useful in high engine speed environments. This environment is simulated during testing of catalysts in the US06 high-speed drive cycle. Improved OSC's are especially important in these environments because of the very high temperatures and space velocities present (see Table 2). In high engine speed environments such as those in the US06 high-speed drive cycle, the conversion efficiencies of $NO_x$, CO and hydrocarbons are particularly low resulting in increased tailpipe emissions.

Table 2 shows the minimum and maximum catalyst temperature and space velocity a catalyst system is exposed to in standard (FTP-75) and high engine speed (US06) conditions. Note that space velocity is the exhaust flow rate measured in (liters/hour)/(catalyst volume in liters).

TABLE 2

Temperature and Space Velocity (SV) Properties for the FTP and US06 Drive Cycles.

| | FTP-75 | | | US06 | | |
|---|---|---|---|---|---|---|
| Property | Min | Max | Avg | Min | Max | Avg |
| Temp (° C.) | 25 | 777 | 630 | 473 | 886 | 764 |
| System SV (Hours$^{-1}$) | 358 | 83,800 | 15,380 | 2,500 | 172,800 | 33,460 |

Tailpipe emissions of catalyst systems containing a CC and UF catalyst were measured during exposure of the catalyst systems to the FTP-75 and US06 controlled drive cycles. Both tested systems contained a Pd-MPC as the UF catalyst. The CC catalyst, however, was varied with one system containing a SS Pd-IWCP OSM CC catalyst and the other containing a Pd-MPC CC catalyst. The results in Table 3 demonstrate that US06 performance of the Pd-IWCP OSM is superior to that of the Pd-MPC.

TABLE 3

Comparison of the SS Pd-IWCP OSM and Pd MPC catalysts in the FTP-75 and US-06 tests.

| | FTP-75 | | | US-06 | | |
|---|---|---|---|---|---|---|
| Catalyst system (CC + UF) | $NO_x$ (mg/mi) | NMHC (mg/mi) | CO (mg/mi) | $NO_x$ (mg/mi) | NMHC (mg/mi) | CO (mg/mi) |
| (CC: 6 g SS Pd-IWCP OSM) + (UF: 3.6 g Pd-MPC) | 32.6 | 4.6 | 1073 | 192.7 | 6.1 | 1135.9 |
| (CC: 6 g Pd-MPC) + (UF: 3.6 g Pd-MPC) | 14.0 | 4.3 | 353.3 | 309.4 | 7.5 | 974.5 |

In order to demonstrate the effect of the improved OSC of the SS Pd—IWCP OSMs on engine emissions, $NO_x$ emissions of a SS Pd-IWCP OSM catalyst system and a Pd-MPC catalyst system were measured under varying engine speeds and air/fuel mixtures (A/F). FIG. 13 charts the perturbations in A/F versus time of the experiment. FIG. 14 charts the levels of $NO_x$ emissions of the SS Pd-IWCP OSM and standard Pd-MPC catalyst systems versus time. While $NO_x$ emissions were generally lower for the SS Pd-IWCP OSM catalyst system, there are particular regions of interest—see, for example, at about 100 seconds. At these times, it was observed that the SS Pd-IWCP OSM catalyst system was much better able to limit $NO_x$ emissions compared to the Pd-based MPC catalyst system. One possible explanation for the phenomenon at about 100 seconds is demonstrated in FIG. 13. There is a significant lean perturbation around this time—i.e., when the engine speed is varied as it is at about 100 seconds, the air/fuel mixture is particularly lean. Thus, the much improved OSC of the SS Pd-IWCP OSM catalyst system may play a key role in limiting $NO_x$ emissions.

Example 4

Efficiency of SS Pd-IWCP OSM in Different Catalyst System Environments Based on Vehicle Test Results The catalytic efficiency of the SS Pd-IWCP OSM was evaluated as follows. Two catalyst systems were tested. One system contained a Pd-MPC catalyst impregnated onto a washcoat containing alumina and an OSM. The other system contained a) an overcoat containing a SS Pd-IWCP OSM; and b) a Pd-MPC catalyst impregnated onto a washcoat containing alumina and an OSM. Both catalysts were evaluated in a close-coupled system.

The data in Table 4 demonstrate that the SS Pd-IWCP OSM catalyst system exhibited stable NMHC (non-methane hydrocarbon), CO and $NO_x$ emissions even after multiple runs. The emissions were particularly stable when compared to the catalysts system comprising only the Pd-MPC catalyst as the source of precious metal catalyst.

TABLE 4

Comparison of SS Pd-IWCP OSM and Pd-MPC Catalyst Emissions in FTP-75 and US-06 tests (UF Catalyst: = 0/12/6 Pd/Rh bi-layer).

| Close-Coupled Catalyst System | Run | FTP75 (WM) (mg/mile) | | | US-06 (WM) (mg/mile) | | |
|---|---|---|---|---|---|---|---|
| | | NMHC | CO | $NO_x$ | NMHC | CO | $NO_x$ |
| Pd-MPC only | | | | | | | |
| Washcoat: Pd-MPC impregnated into 160 g/L $Al_2O_3$ + OSM (Pd 102.68 g/ft$^3$) No Overcoat | 1 | 8.1 | 303 | 9.2 | 21 | 1653 | 52 |
| | 2 | 12.5 | 585 | 13.8 | 27 | 3559 | 48 |
| Pd-MPC washcoat + Pd-IWCP overcoat | 3 | 15.0 | 414 | 12.0 | N/A | N/A | N/A |
| Washcoat: Pd-MPC impregnated into 100 g/L $Al_2O_3$ + OSM (Pd 54.5 g/ft$^3$) Overcoat: 60 g/L Pd-IWCP OSM (Pd 54.5 g/ft$^3$) | 1 | 11.6 | 325 | 13.9 | 20 | 1367 | 62 |
| | 2 | 10.0 | 347 | 14.3 | N/A | N/A | N/A |

Example 5

Effect of SS Pd-IWCP OSM on Catalyst Temperature

The effect of the SS Pd-IWCP OSM catalyst on catalyst system temperature was evaluated. Two catalysts were evaluated. The first contained a Pd-MPC catalyst (containing 6 g of Pd) impregnated onto a washcoat containing alumina and an OSM. The second contained a) an overcoat containing a SS Pd-IWCP OSM (containing 3.88 g of Pd); and b) a Pd-MPC catalyst (containing 6 g of Pd) impregnated onto a washcoat containing alumina and an OSM. These two catalysts were evaluated in a CC catalyst system. Each was coupled to the same UF catalyst containing 12 g/ft$^3$ Pd and 6 g/ft$^3$ Rh.

Two criteria were measured in these experiments: 1) the rate of temperature increase of the catalyst; and 2) the maximum temperature of the catalyst. Both catalyst systems were exposed to FTP and US06 conditions starting from a cold start. The data in FIG. 15 demonstrate a more rapid temperature rise in the SS Pd—IWCP OSM system when compared to the Pd-MPC catalyst—even though the Pd-OSM only systems contained a higher loading of Pd. The increase in temperature rise was observed in both the CC coupled catalyst (which contained the SS Pd-IWCP OSM catalyst) as well as in the coupled UF catalyst (which contained a Pd-MPC catalyst). Thus, the increase in heating resulting from the SS Pd-IWCP OSM in the CC catalyst acted to warm the coupled UF catalyst. In addition, there was an observed increase in the maximum temperature in both the CC catalyst and the UF catalyst of the SS Pd-IWCP OSM catalyst system. The increase in rate of temperature increase and maximum temperature attained is likely attributable to the efficient catalysis of the exothermic CO oxidation process by the SS Pd-IWCP OSM.

Example 6

Oxygen Storage Capacity of SS Pd-IWCP OSM

The OSC of the SS Pd-IWCP OSM catalyst system was evaluated. As discussed herein, the OSC is a measure of an OSM's ability to supply oxygen to rich exhaust and take up oxygen from lean exhaust, thus buffering a catalyst system against the fluctuating supply of oxygen by maintaining a steady air/fuel ratio. In particular, the ability of the SS Pd-IWCP OSM catalyst system to buffer the air/fuel ratio in both lean and rich A/F environments was evaluated and compared to the OSC of a Pd-MPC catalyst system and the original equipment manufacturer ("OEM") OSM.

In one set of experiments, the amount of CO present in the exhaust was increased from 0 ppm to 8500 ppm (representing a switch to a rich A/F). In these experiments, a longer delay in observing an increase in CO in the catalyst environment corresponds with a higher OSC of the OSM. In another set of experiments, the amount of $O_2$ present in the exhaust was increased from 0 ppm to 4200 ppm (representing a switch to a lean A/F). In these experiments, a longer delay in observing an increase in $O_2$ in the catalyst environment corresponds with a higher OSC of the OSM. In both experiments, the delay time is measured relative to a system with no catalyst. The results of these experiments are summarized in Table 5, below.

As the data in Table 5 demonstrate, the SS Pd-IWCP OSM catalyst system demonstrated a substantially better ability to buffer the air/fuel mixture when compared to the Pd-MPC and OEM catalyst systems. This is evidenced by the significantly longer delay times exhibited with the SS Pd-IWCP OSM catalyst system.

TABLE 5

OSC Delay Times Comparing the Pd-MPC, OEM Pd and SS Pd-IWCP OSM Catalysts

| Sample Type | No catalyst (s) | Sample Time (s) | Delay Time (s) |
|---|---|---|---|
| CO | | | |
| 190 Pd (MPC) | 842 | 847 | 4.8 |
| Std OEM | | 849 | 6.8 |
| SS Pd-IWCP OSM | | 857 | 14.3 |
| $O_2$ | | | |
| 190 Pd(MPC) | 723 | 731 | 9.0 |
| Std OEM | | 733 | 10.4 |
| SS Pd-IWCP OSM | | 745 | 22.7 |

Example 7

Effect of Pd Dispersion on OSC

The OSC of OSMs is dependent on the level of Pd dispersion throughout the OSM. It has been observed that the OSC increases as the Pd dispersion level increases.

The OSC of OSMs generated using the WCP and IWCP was compared to OSMs containing surface bulk PdO. See FIG. 16. The IWCP, which allows for the generation of OSMs with highly dispersed Pd both on the surface and throughout the OSM, yields OSMs (e.g., SS Pd-IWCP OSMs) with improved OSCs.

Example 8

Analysis of Solid Solution Pd-OSM Structure via Scanning Electron Microscopy

Figure 17:
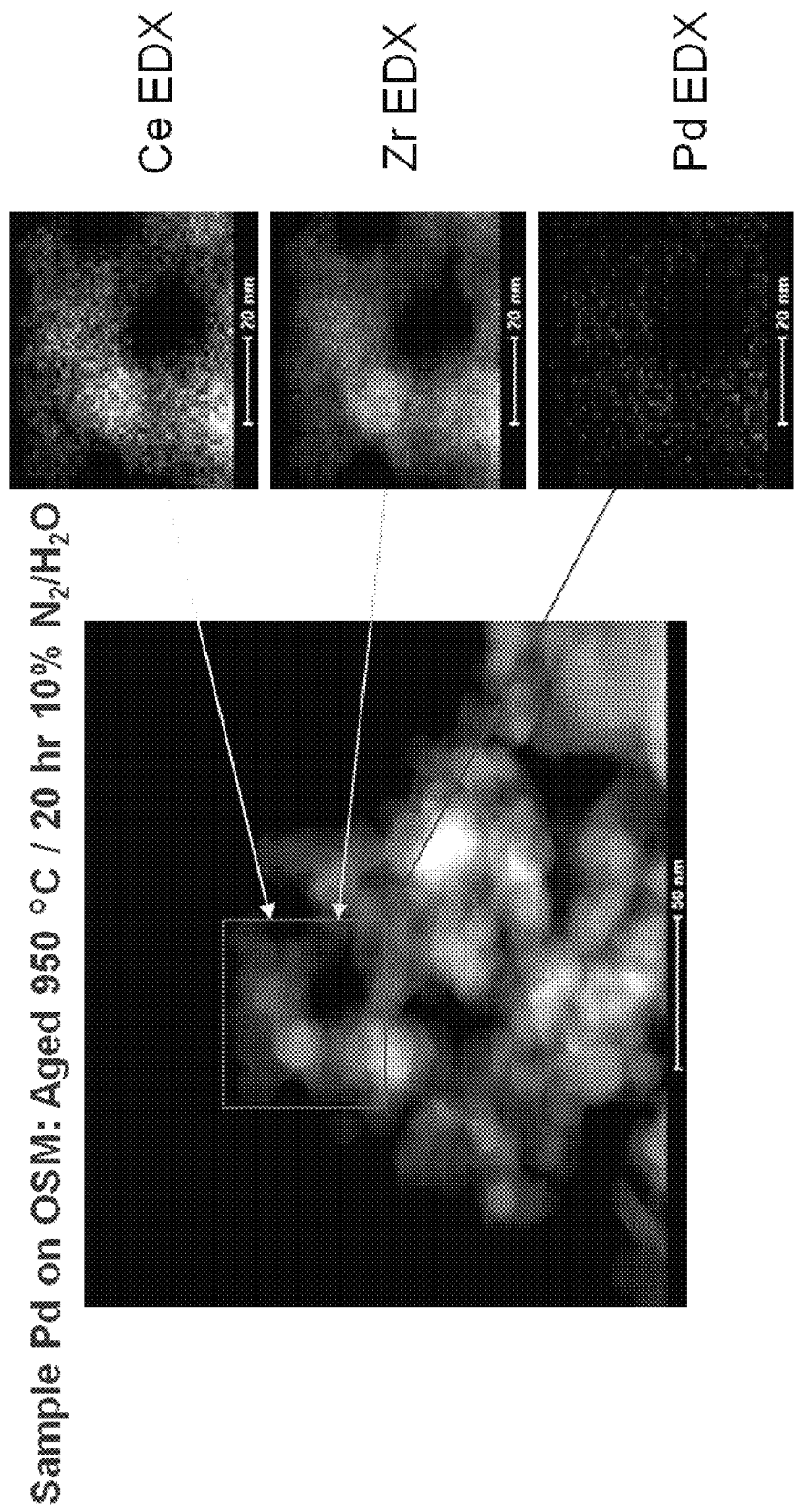
FIG. 17 illustrates SEM and X-ray microanalysis of a SS Pd-OSM generated using the IWCP. As can be seen, the Pd is evenly dispersed throughout the OSM and correlates with Ce and Zr concentrations. The scans also indicate that a stable solid solution of Pd is present in the fluorite phase.
Figure 18:
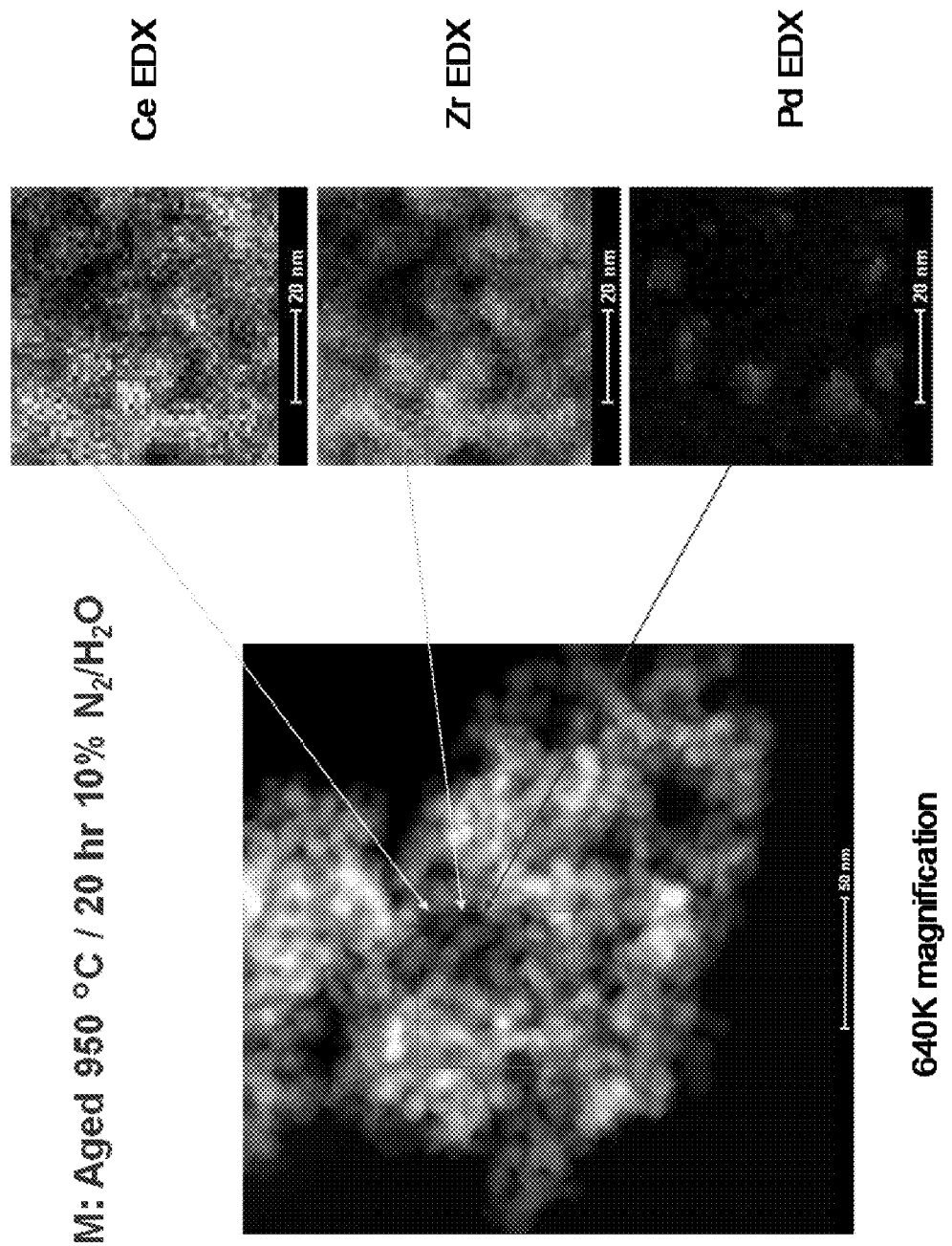
FIG. 18 illustrates SEM and X-ray microanalysis of a SS Pd-OSM generated using the WCP. As can be seen, the WCP does not yield an OSM with Pd present as a solid solution. Rather, the Pd is present as uneven, large PdO particles on the OSM surface.

The structure of the Pd-OSM, wherein the Pd is in a solid solution ("SS"), was analyzed by scanning electron microscopy (SEM). FIGS. 17-18 illustrate the differences in SS Pd-OSM structure (i.e., whether Pd is agglomerates or is well dispersed on the surface of the OSM) based on the method used to generate the SS Pd-OSM.

Figure 26:
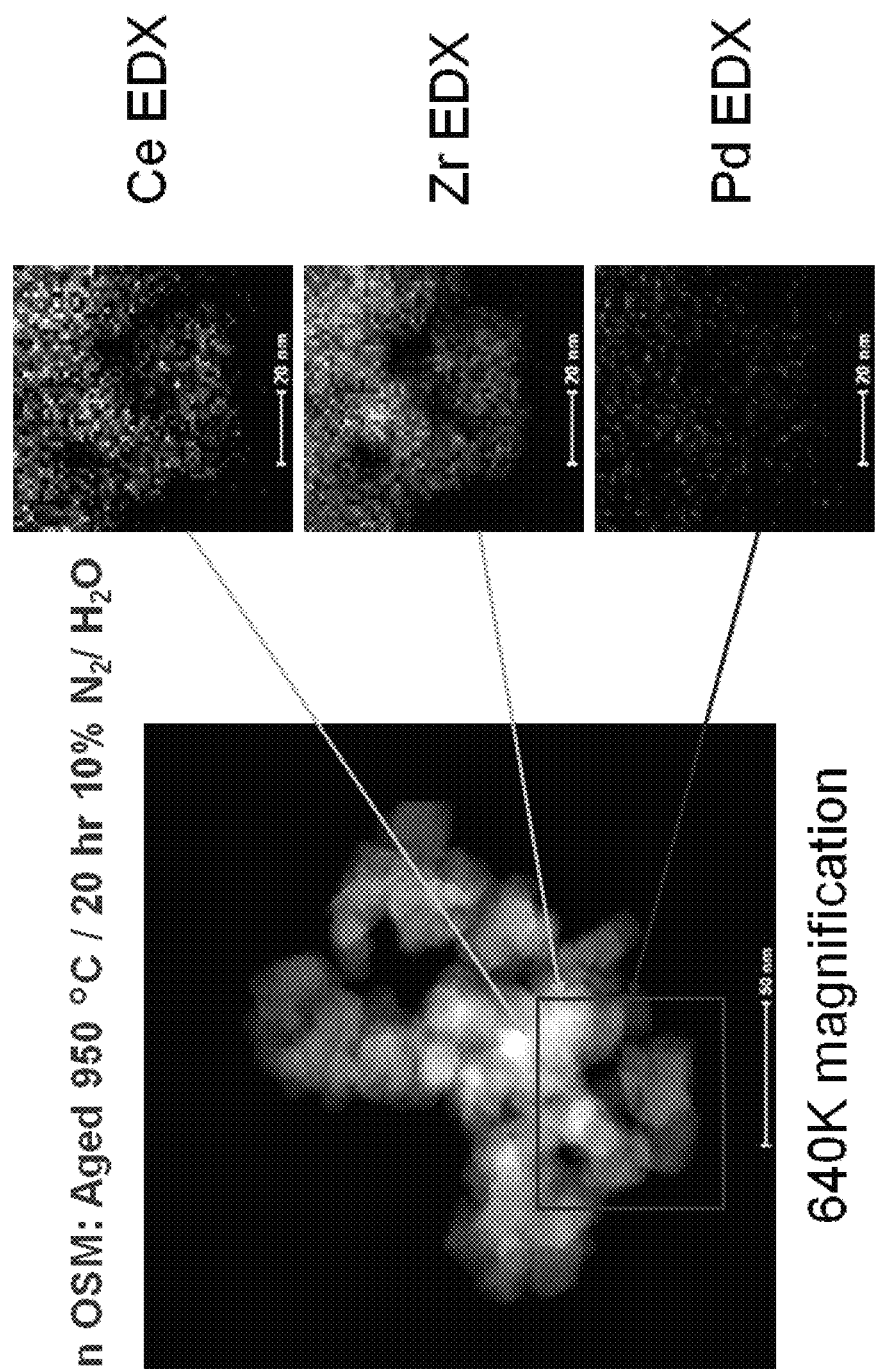
FIG. 26 illustrates SEM and X-ray microanalysis of a SS Pd-OSM generated using the HTP. As can be seen, the Pd is evenly dispersed throughout the OSM and correlates with Ce and Zr concentrations. The scans also indicate that a stable solid solution of Pd is present in the fluorite phase.

FIGS. 17 and 26 illustrate that Pd is finely dispersed on the surface of the SS Pd-OSM when the IWCP or HTP is employed. FIG. 18 illustrates that the WCP does not yield an OSM with Pd present as a SS.

Example 9

Analysis of the SS Pd-IWCP OSM Structure via X-ray Diffraction

X-ray diffraction was used to evaluate the level of Pd dispersion on the surface of the SS Pd-IWCP OSM. X-ray diffraction is used to determine the presence of different crystallographic phases of Pd. In particular, x-ray diffraction can be used to measure the expansion or contraction of a host lattice (e.g., the lattice of the ceria-based OSM) caused by the doping of the lattice sites with Pd. Bragg's law is used to convert 2-theta peak values to lattice parameter distances.

SS Pd-IWCP OSMs with 2%, 5%, and 10% Pd content (doping) were prepared for evaluation using x-ray diffraction. In addition, bulk OSM compositions with 2% and 5% Pd content were prepared to calibrate the SS Pd-IWCP OSM samples. The bulk OSM compositions can be used to determine the x-ray diffraction pattern for the segregated phases present in the bulk compositions—i.e., the segregated Pd (or PdO) and OSM phases. The x-ray diffraction pattern of the Pd (or PdO) in the bulk compositions is representative of Pd which is not in solid solution.

Figure 19:
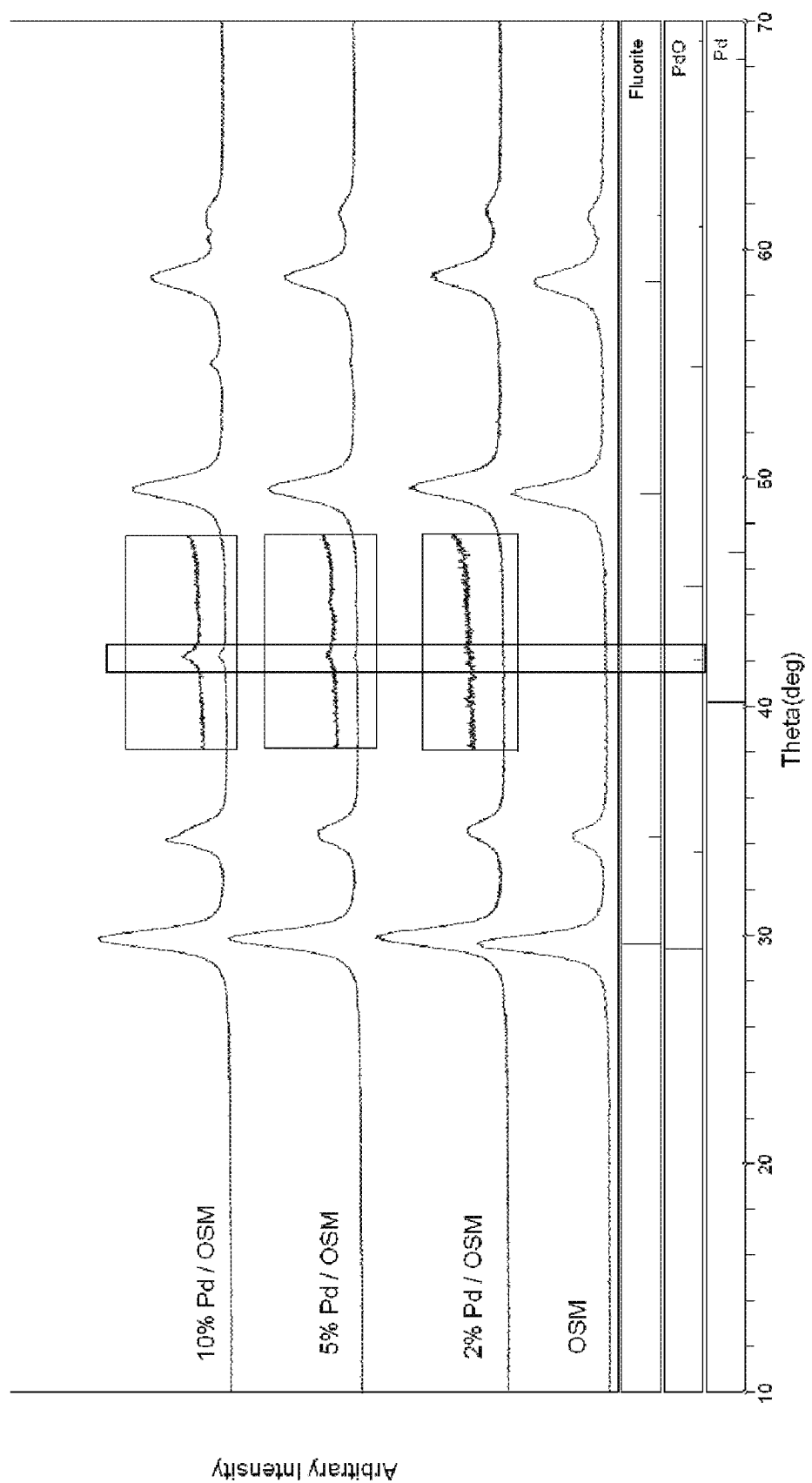
FIG. 19 shows X-ray diffraction plots of 0, 2%, 5% and 10% Pd in OSM before aging (i.e., as-made). The highlighted peaks are PdO peaks. As the amount of Pd is increased, the amount of PdO formed is also increased.
Figure 20:
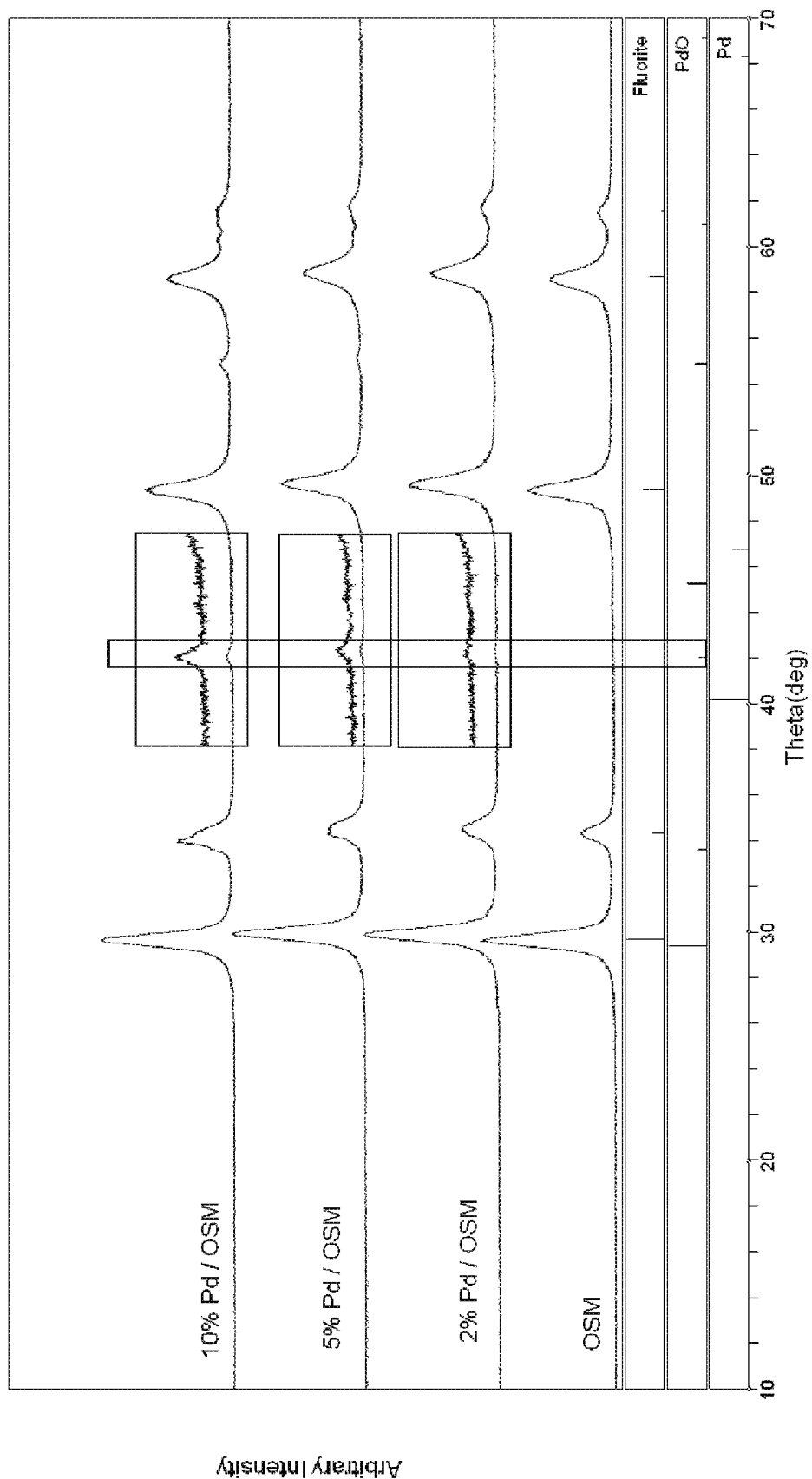
FIG. 20 shows X-ray diffraction plots of 0, 2%, 5% and 10% Pd in OSM after aging for 20 hours at 900° C. in 10% $H_2O/N_2$. The highlighted peaks are PdO peaks. The data indicate that, even after aging, only trace amounts of PdO are present in the 2% Pd sample.

X-ray diffraction plots were generated for the samples before (i.e., as-made) and after aging in 10% $H_2O/N_2$ at 900° C. and 1100° C. Pd concentrations were calculated by measuring the area under the peak located at ~54.9 two-theta, developing standard curves from the physical mixture samples, and subtracting the detected amount of Pd from the nominal amount in the sample. FIGS. 19 and 20 show the results for as-made and thermally aged SS Pd-IWCP OSM and bulk OSM (labeled "PdO") compositions.

As FIGS. 19 and 20 indicate, the maximum efficiency of Pd doping occurs at 2% doping levels. When the OSM is doped with 2% Pd, essentially all of the Pd is incorporated into the solid solution. Increasing the amount of Pd doping, however, results in diminishing returns. For example, when the OSM is doped with 5% Pd, only 2.21% of the Pd is incorporated into the solid solution. Moreover, when the OSM is doped with 10% Pd, only 4.08% of the Pd is incorporated into the solid solution.

Similar results were observed in the context of the aged catalysts. After aging, OSMs doped with 2% Pd retained 1.32% Pd in solid solution. Yet, OSMs doped with 5% and 10% Pd, respectively, retained 1.30% and 3.58% Pd in solid solution. Notably, after aging, the OSMs retain the majority of the Pd in solid-solution form.

In addition to the decreased efficiency of Pd incorporation into the solid solution, the use of higher amounts of Pd during the doping process leads to the undesirable formation of PdO particles on the surface of the OSM. Such particles are formed by the excess Pd—i.e., the Pd not incorporated into the solid solution.

Figure 21:
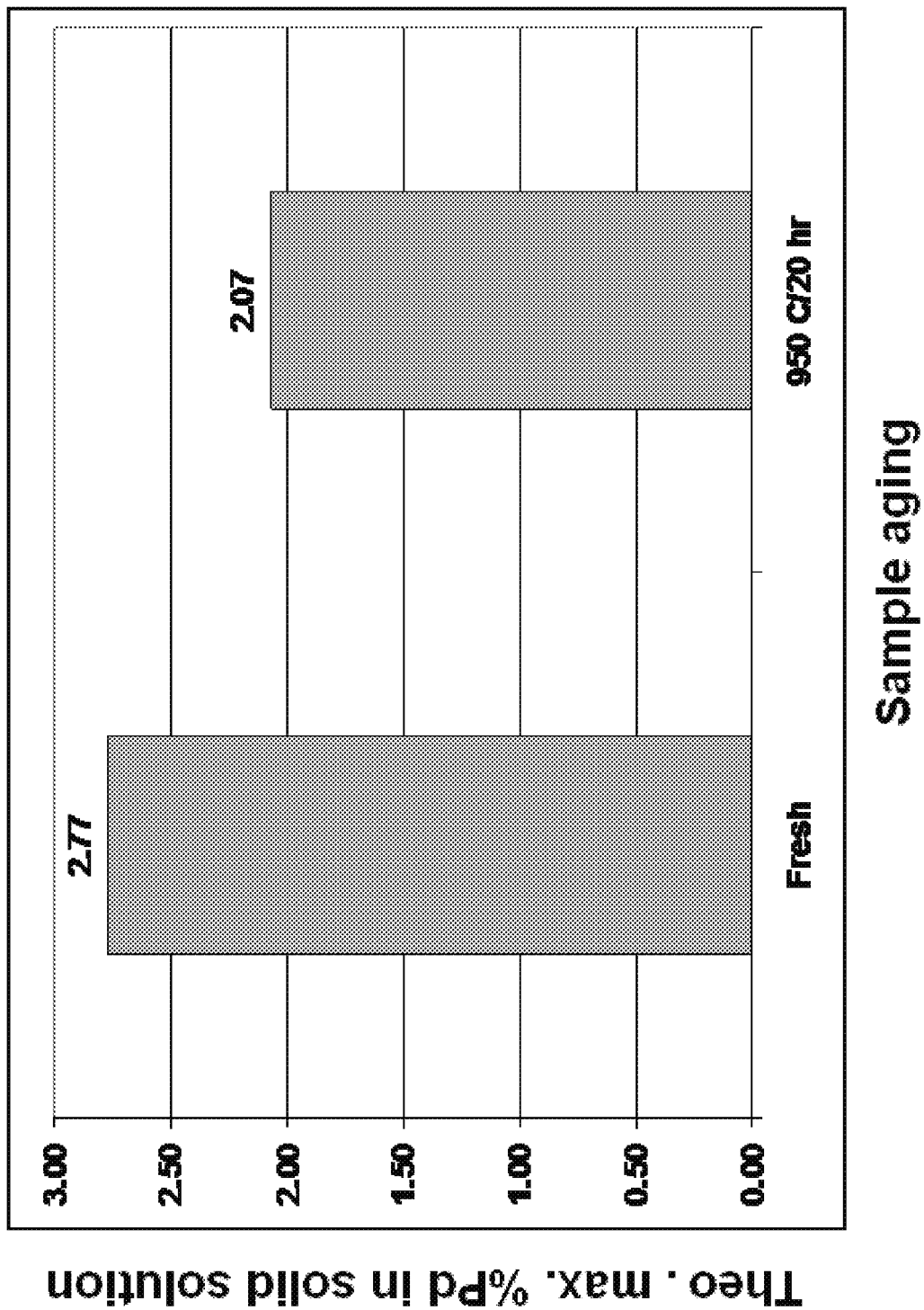
FIG. 21 shows the calculated Pd concentrations (i.e., theoretical or "maximum" values) (as % in solid solution) of fresh and aged samples of SS Pd-IWCP OSM based on a linear fit of XRD peak intensity data.

FIG. 21 uses a linear fit to calculate the theoretical maximum amount of Pd that can be incorporated into a solid solution before and after aging.

Figure 22:
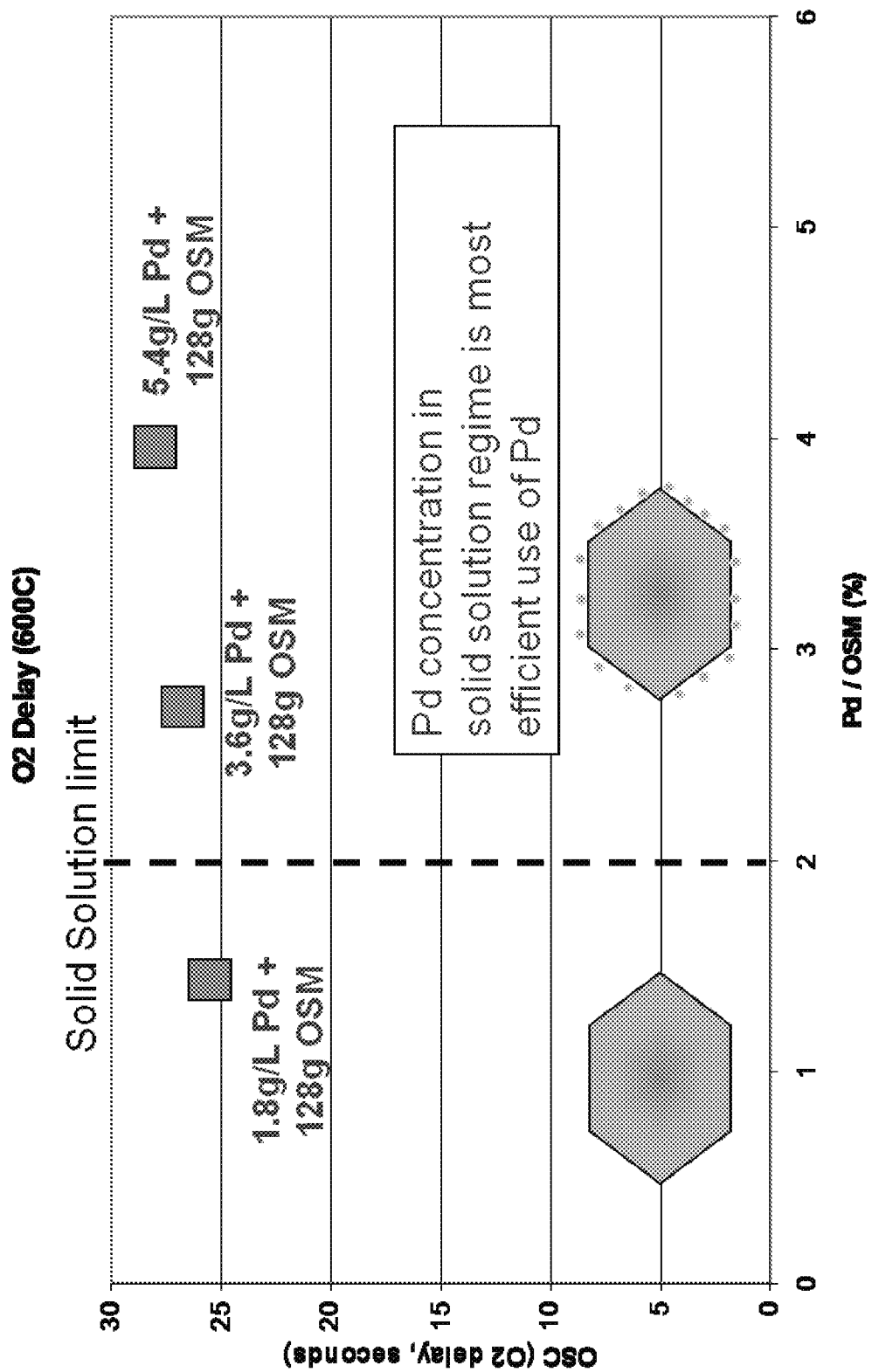
FIG. 22 is a graph OSC capacity versus Pd content of the OSM. This graph illustrates that doping of amounts of Pd in excess of the solid solution limit have a relatively minor impact on the OSC, presumably because the excess Pd forms bulk Pd or PdO particles on the surface of the OSM.

FIG. 22 shows the effect of the amount of Pd doping on the OSC of the OSM. Doping of amounts of Pd in excess of the solid solution limit has a relatively minor impact on the OSC, presumably because the excess Pd forms bulk Pd or PdO particles on the surface of the OSM.

Figure 23:
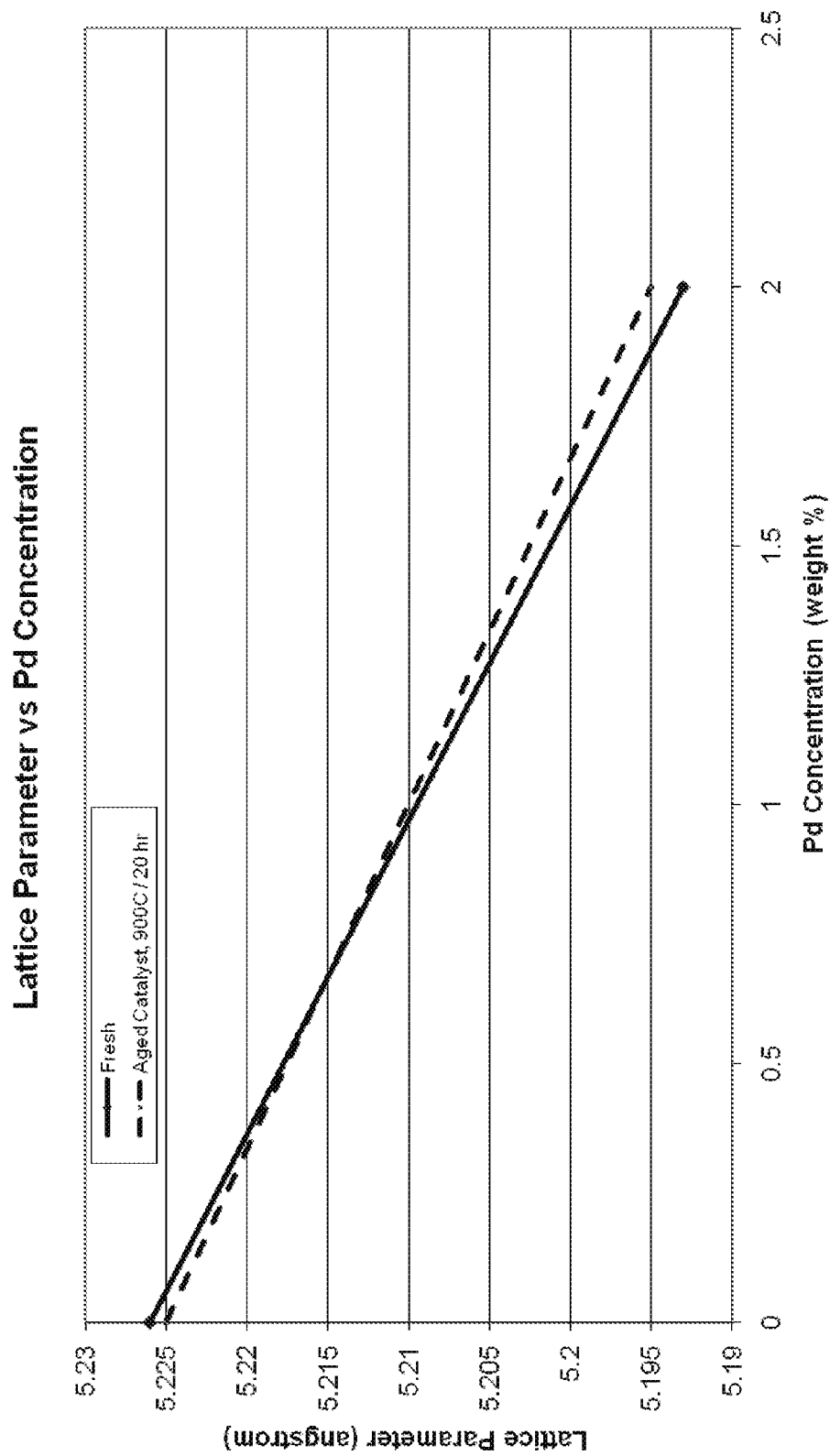
FIG. 23 is graph of lattice parameter versus Pd concentration of the OSM. The observed lattice parameter contraction as the Pd concentration is increased is consistent with the doping of $Pd^{2+}$ cations onto the $Ce^{4+}$ sites.

FIG. 23 demonstrates the effect of doping small $Pd^{2+}$ cations (0.86 Å) onto the $Ce^{4+}$ (1.034 Å) sites of the OSM for a 2% solid solution of Pd in ceria (OSM). As the data indicates, the doping of the small $Pd^{2+}$ cations leads to a contraction of the lattice consistent with the smaller sized dopant cation.

Example 10

Mechanism of OSC Improvement with Solid Solution Pd-OSMs

Figure 6:
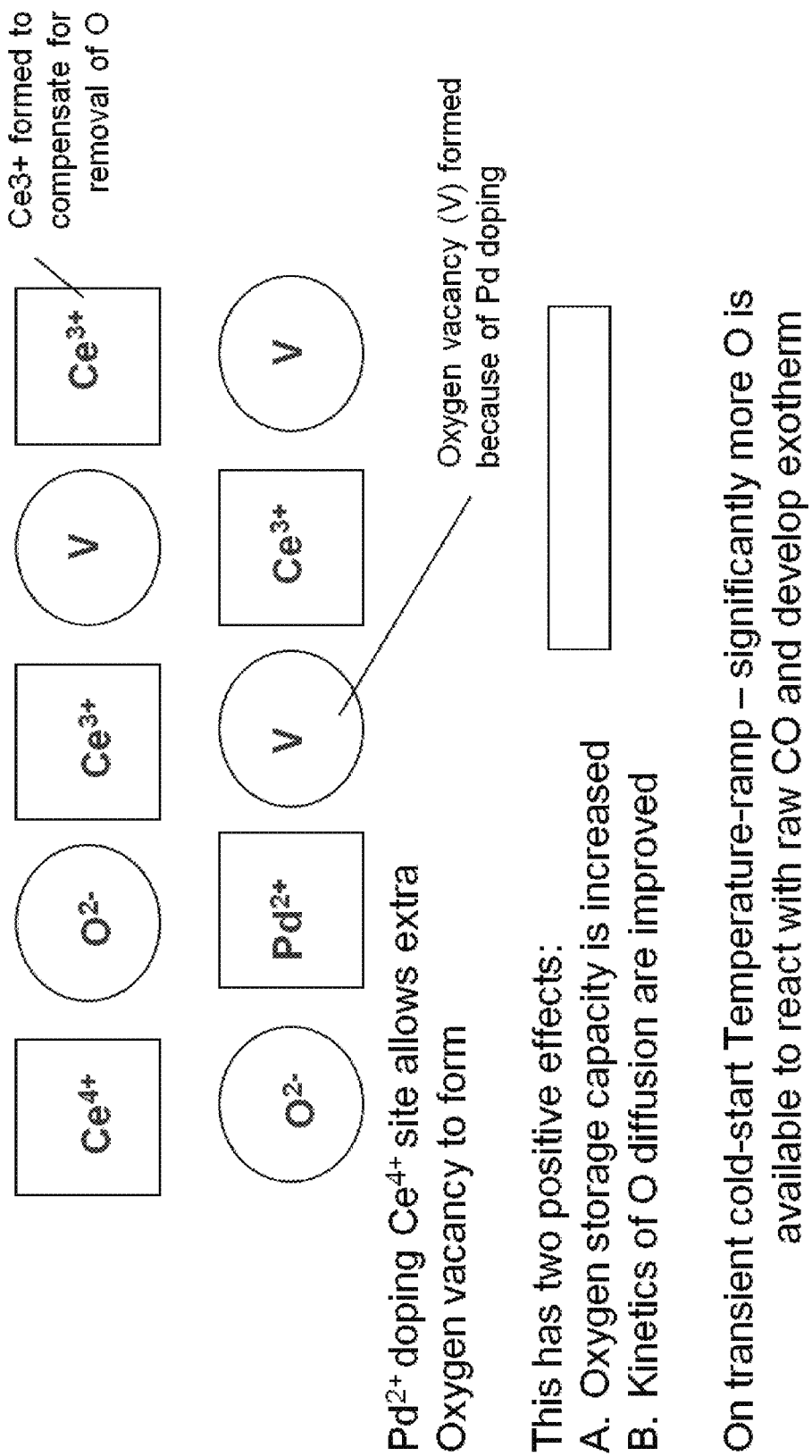
FIG. 6 is a diagram that illustrates how the presence of Pd in a solid solution increases the number of oxygen vacancies in the solid solution and, thus, improves the kinetics of oxygen diffusion.

FIG. 6 illustrates the processes by which Pd doping of the OSM provides improved OSCs. FIG. 6 shows how $Pd^{2+}$ ions occupy $Ce^{4+}$ sites (represented as squares) in the OSM and produce extra oxygen vacancies. This increases the OSC by providing extra $O_2$ storage/release sites. Thus, the doping of the smaller $Pd^{2+}$ ions allows for the easier diffusion of $O_2$ from the internal portion of the OSM to the surface of the OSM. This $O_2$ diffusion results in the formation of an $O_2$ vacancy (resented by a "V" in the $O_2$ binding site (a circle)).

Figure 7:
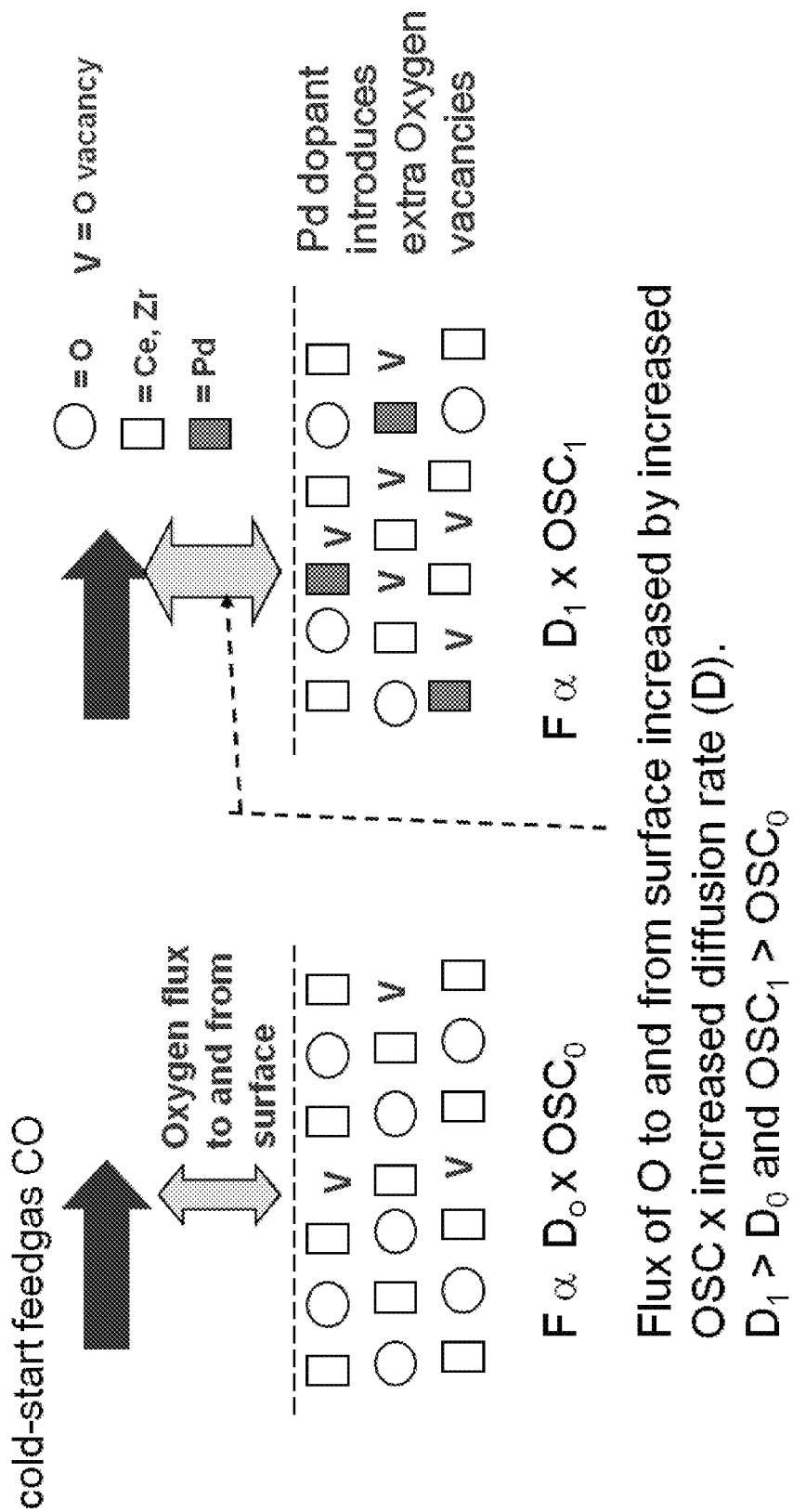
FIG. 7 is a diagram that illustrates the multiplicative effect on oxygen storage capacity (OSC) of a) increasing the number of oxygen vacancies; and b) increasing the rate of oxygen diffusion.

The combination of a) the increased amount of oxygen storage/release sites; and b) the improved oxygen diffusion rates has a multiplicative effect on improving the OSC. This phenomenon is illustrated in FIG. 7.

Example 11

Improving High-Temperature Performance of SS Pd-IWCP OSMs

The high-temperature performance of SS Pd-IWCP OSM generated in Example 2 can be further enhanced in a variety of ways. First, care can be taken to use a Pd concentration of up to 2% in order to ensure that the Pd is present as a solid solution. The effect of the Pd concentration on $NO_2$ conversion is demonstrated in Table 6. The data in Table 6 also demonstrates the beneficial effect of adding alumina to the overcoat in order to maintain Pd concentration below 2%. The catalytic efficiency was measured after high-temperature aging at typical US06 conditions (800° C. with a Space Velocity of 150,000 $hr^{-1}$). All catalysts were evaluated in a CC system.

TABLE 6

$NO_x$ Conversion Efficiency at 800° C. and Space Velocity of 150,000 $hr^{-1}$ After Aging at 1000° C.

| Washcoat | Overcoat | $NO_x$ % |
|---|---|---|
| Pd-MPC impregnated into 100 g/L washcoat of alumina + OSM | 60 g/L SS Pd-IWCP OSM at 2.93% Pd | 74.0 |
| Pd-MPC impregnated into 100 g/L washcoat of alumina + OSM | 120 g/L SS Pd-IWCP OSM at 1.47% Pd | 76.2 |
| Pd-MPC impregnated into 100 g/L washcoat of alumina + OSM | 90 g/L SS Pd-IWCP OSM at 1.96% Pd + 30 g/L $Al_2O_3$ | 82.9 |

The effect of adding alumina to overcoats containing SS Pd-IWCP OSMs on the OSC was also evaluated. Table 7 shows the beneficial impact of the addition of 25% (by weight) of alumina to the SS Pd-IWCP OSM overcoat after thermal (at 1000° C.) and phosphorus aging (2 hours at 700° C.).

TABLE 7

The beneficial effect of the presence of alumina in overcoats containing SS Pd-IWCP OSM.

| Overcoat layer (50 g/ft³ Pd) | Washcoat layer | $O_2$ delay time at 575° C. (seconds) | CO delay time at 575° C. (seconds) |
|---|---|---|---|
| 60 g/L Pd-OSM IWCP (thermal aging) | 100 g/L WC with 40% OSM 50 g/ft³ Pd MPC | 17.00 | 10.04 |
| 120 g/L Pd-OSM IWCP + 25% $Al_2O_3$ (thermal aging) | 100 g/L WC with 40% OSM 50 g/ft³ Pd MPC | 23.22 | 14.30 |
| 90 g/L Pd-OSM IWCP + 25% $Al_2O_3$ (thermal aging) | 150 g/L WC with 40% OSM 50 g/ft³ Pd MPC | 23.70 | 14.34 |
| 90 g/L Pd-OSM IWCP (thermal aging) | 150 g/L WC with 40% OSM 50 g/ft³ Pd MPC | 26.21 | 13.27 |
| 60 g/L Pd-OSM IWCP (thermal aging) | 100 g/L WC with 40% OSM 50 g/ft³ Pd MPC | 8.08 | 2.41 |
| 120 g/L Pd-OSM IWCP + 25% $Al_2O_3$ (thermal aging) | 100 g/L WC with 40% OSM 50 g/ft³ Pd MPC | 10.76 | 3.62 |

TABLE 7-continued

The beneficial effect of the presence of alumina in overcoats containing SS Pd-IWCP OSM.

| Overcoat layer (50 g/ft³ Pd) | Washcoat layer | $O_2$ delay time at 575° C. (seconds) | CO delay time at 575° C. (seconds) |
|---|---|---|---|
| 90 g/L Pd-OSM IWCP + 25% $Al_2O_3$ (thermal aging) | 150 g/L WC with 40% OSM 50 g/ft³ Pd MPC | 10.23 | 3.38 |
| 90 g/L Pd-OSM IWCP (thermal aging) | 150 g/L WC with 40% OSM 50 g/ft³ Pd MPC | 9.60 | 2.81 |

The effect of adding alumina to overcoats containing SS Pd-IWCP OSM on phosphorus aging resistance alone was also evaluated. FIG. 24 illustrates that use of up to 40% by weight La—$Al_2O_3$ improves the $NO_x$ performance after phosphorus aging.

Example 12

Improving Resistance to Phosphorus Aging by Adding $BaCO_3$ to the Overcoats Containing SS Pd-IWCP OSMs The effect of adding varying amounts of $BaCO_3$ to overcoats containing SS Pd-IWCP OSMs was evaluated. In these experiments the composition of the washcoat remained constant: 50 g/ft³ of a Pd-MPC catalyst impregnated onto a 100 g/L washcoat containing alumina and an OSM. The addition of $BaCO_3$ results in an improvement in both T90 (temperature at which there is 90% conversion of exhaust gases) and $NO_x$ conversion efficiency. The data for a series of catalysts with different overcoat designs is shown in Table 8. $NO_x$ conversion efficiency was measured at 575° C. with a 0.125 Hz perturbation. Both $NO_x$ conversion efficiency and T90 values were measured after thermal aging (1000° C.) and phosphorus aging (700° C., 2 hrs).

TABLE 8

Effect of $BaCO_3$ on $NO_x$ Conversion Efficiency and T90.

| Overcoat layer | T90 (0.5 Hz) (° C.) | $NO_x$ % at 575° C. (0.125 Hz) |
|---|---|---|
| A. 60 g/L SS Pd-IWCP OSM (50 g/ft³ Pd) | 459.2 | 50.7 |
| B. 60 g/L SS Pd-IWCP OSM (50 g/ft³ Pd + 30 g/L $BaCO_3$) | 414.0 | 71.7 |
| C. 60 g/L SS Pd-IWCP OSM (50 g/ft³ Pd + 20 g/L Ba acetate + 10 g/L La-alumina) | 388.5 | 72.6 |

Example 13

Figure 25:
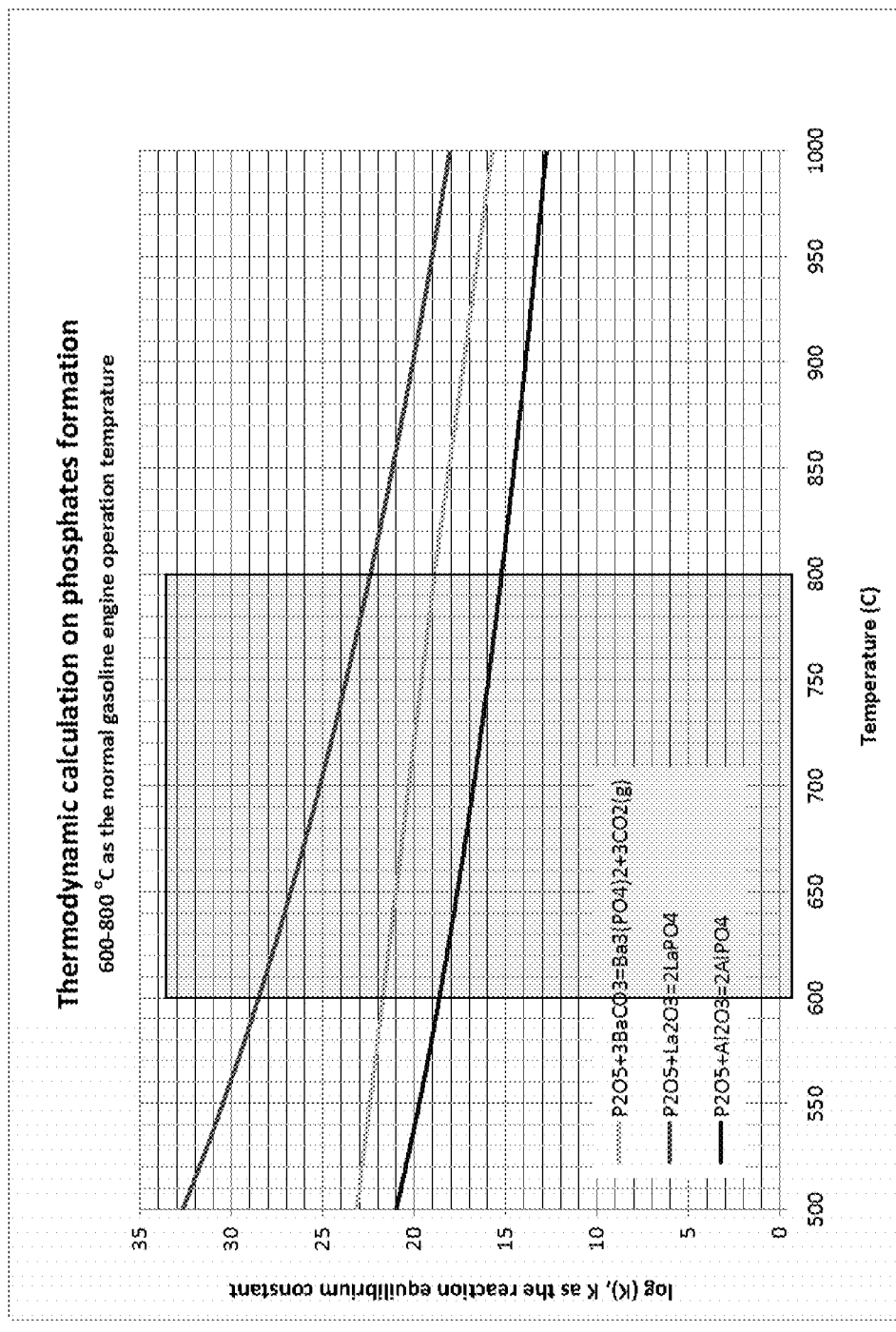
FIG. 25 is a graph that illustrates the higher thermodynamic stability of $LaPO_4$ and $Ba_3(PO_4)_2$ relative to $AlPO_4$. This effect contributes to the improved thermodynamic stability of SS Pd-IWCP OSM overcoat.

Rationale Behind Resistance to Phosphorus Aging by Addition of an Alkaline Earth and Alumina in a SS Pd-IWCP OSM Overcoat The effect of adding $BaCO_3$ and $La_2O_3$ on the stability of overcoats containing SS Pd-IWCP OSMs was evaluated. FIG. 25 compares the thermodynamic terms (log of the reaction equilibrium between the relevant starting components and carbonates) for the reaction of $BaCO_3$, $La_2O_3$ and $Al_2O_3$ (present in the SS Pd-IWCP OSM overcoats) with $P_2O_5$ (in the gas stream). $La_2O_3$ and $BaCO_3$ improve overcoat function after phosphorus aging by preferentially reacting with and trapping phosphorus in the exhaust gas stream. $La_2O_3$ and $BaCO_3$ are particularly useful due to the relative thermodynamic stability of $LaPO_4$ and $Ba_3(PO_4)_2$ (formed upon reaction with $P_2O_5$) compared to $AlPO_4$. The phosphorus trapping reduces the poisoning of the catalyst and, in turn, increases catalyst lifetime and efficiency.

Example 14

Additional Studies on Improvements to Catalyst Efficiency by Addition of $BaCO_3$ in a SS Pd-IWCP OSM Overcoat The data in Table 9 illustrate the beneficial effect of the presence of Ba in the overcoat for NO and CO conversion efficiency after phosphorus aging. Increasing the amount of Ba improves CO and NOx conversion efficiency while maintaining THC efficiency.

TABLE 9

The presence of Ba in the overcoat improves resistance of the catalyst to phosphorus aging. All samples were phosphorus-aged for 2 hours before testing.

| Overcoat layer | $NO_x$ conversion at 575° C. (0.125 Hz) | CO conversion at 575° C. (0.125 Hz) | THC conversion at 575° C. (0.125 Hz) |
|---|---|---|---|
| 60 g/L SS Pd-IWCP OSM (50 g/ft³ Pd) | 50.7% | 68.0% | 96.8% |
| 60 g/L SS Pd-IWCP OSM (50 g/ft³ Pd + 10 g/L $BaCO_3$ + 10 g/L La-alumina) | 62.5% | 70.6% | 97.0% |
| 60 g/L SS Pd-IWCP OSM (50 g/ft³ Pd + 20 g/L $BaCO_3$ + 10 g/L La-alumina) | 72.6% | 73.6% | 97.4% |
| 60 g/L SS Pd-IWCP OSM (50 g/ft³ Pd + 30 g/L $BaCO_3$) | 71.7% | 76.8% | 96.9% |

The data in Table 10 illustrate the differences in light-off temperature for $NO_x$, CO and THC conversions between catalysts containing Ba or Ca in the overcoat after phosphorus aging. As illustrated by the data, the addition of Ba and Ca to the overcoat improves light-off temperatures.

TABLE 10

Comparison of light off temperature for various overcoat compositions, after phosphorus aging (700° C. 2 hrs).

| Overcoat layer (50 g/ft³ Pd) | Washcoat layer | $NO_x$ T90 (0.5 Hz) (° C.) | CO T90 (0.5 Hz) (° C.) | THC T90 (0.5 Hz) (° C.) |
|---|---|---|---|---|
| 60 g/L Pd-OSM IWCP | 100 g/L WC with 40% OSM 51 g/ft³ Pd MPC | — | — | 409.3 |
| 120 g/L; 75% Pd-OSM IWCP + 25% La-alumina + 3 g $CaCO_3$ | 100 g/L WC with 40% OSM 50 g/ft³ Pd MPC | 434.2 | — | 380.0 |
| 120 g/L; 75% Pd-OSM IWCP + 25% La-alumina + 15 g $CaCO_3$ | 100 g/L WC with 40% OSM 50 g/ft³ Pd MPC | 408.4 | 419.6 | 367.2 |

TABLE 10-continued

Comparison of light off temperature for various overcoat compositions, after phosphorus aging (700° C. 2 hrs).

| Overcoat layer (50 g/ft³ Pd) | Washcoat layer | NO$_x$ T90 (0.5 Hz) (° C.) | CO T90 (0.5 Hz) (° C.) | THC T90 (0.5 Hz) (° C.) |
|---|---|---|---|---|
| 120 g/L; 75% Pd-OSM IWCP + 25% La-alumina + 30 g CaCO₃ | 100 g/L WC with 40% OSM 50 g/ft³ Pd MPC | 414.2 | 416.3 | 353.0 |
| 120 g/L; 75% Pd-OSM IWCP + 25% La-alumina + 30 g BaCO₃ | 100 g/L WC with 40% OSM 50 g/ft³ Pd MPC | 362.7 | 344.1 | 349.2 |
| 120 g/L; 75% Pd-OSM IWCP + 25% La-alumina + 60 g BaCO₃ | 100 g/L WC with 40% OSM 50 g/ft³ Pd MPC | 380.9 | 338.0 | 349.4 |
| 120 g/L; 75% Pd-OSM IWCP + 25% La-alumina + 60 g Ba acetate | 100 g/L WC with 40% OSM 50 g/ft³ Pd MPC | 442.3 | — | 400.4 |
| 120 g/L; 75% Pd-OSM IWCP + 25% La-alumina + 11% Ba—Al₂O₃ | 100 g/L WC with 40% OSM 50 g/ft³ Pd MPC | 412.9 | 460.5 | 389.0 |

Example 15

Improved Resistance to Phosphorus Aging by Increasing Washcoat Thickness

Table 11 shows NO$_x$ conversion efficiency at 400° C. as a function of washcoat and overcoat design after thermal and phosphorus aging. The increase in washcoat thickness from 100 g/L to 180 g/L has a positive impact on the NO$_x$ conversion efficiency. The additional surface area of the washcoat layer enables a higher activity in a location removed from the effects of the phosphorus aging (as phosphorus aging is seen primarily in the overcoat).

Table 11 also shows the improved OSC as the washcoat thickness is increased from 100 g/L to 180 g/L. The results indicate that increasing washcoat mass increases OSM content and function.

TABLE 11

NO$_x$ conversion Efficiency at 400° C. and OSC delay time (in seconds) after thermal aging (1000° C.) and Phosphorus aging (700° C. 2 hrs).

| Overcoat layer (50 g/ft³ Pd) | WC layer | NO$_x$ % at 400° C. (0.5 Hz) | CO delay time at 575° C. (seconds) |
|---|---|---|---|
| 60 g/L Pd-OSM IWCP | 100 g/L WC with 40% OSM 50 g/ft³ Pd MPC | 60.6 | 1.45 |
| 120 g/L; 75% Pd-OSM IWCP + 25% La-alumina | 100 g/L WC with 40% OSM 50 g/ft³ Pd MPC | 71.0 | 3.17 |
| 120 g/L; 75% Pd-OSM IWCP + 25% La-alumina | 150 g/L WC with 40% OSM 50 g/ft³ Pd MPC | 86.1 | 5.37 |
| 120 g/L; 75% Pd-OSM IWCP + 25% La-alumina | 180 g/L WC with 40% OSM 50 g/ft³ Pd MPC | 96.9 | 6.08 |

Example 16

Improved OSC Delay Time after Thermal and Phosphorus Aging in 20 g/ft³ Pd Only CC Catalyst by Increasing Washcoat Thickness Table 12 shows the effect of washcoat thickness on OSC compared to a reference Pd/Rh CC catalyst. The OSC delay time at 575° C. after thermal aging (1000° C. for 40 hours) shows an optimal improvement with a washcoat at 180 g/L. The OSC delay time at 575° C. after thermal (1000° C. for 40 hours) and phosphorus (700° C. for 2 hours) aging improves with increasing washcoat loading across the whole range examined (i.e., up to 210 g/L). All catalysts were evaluated in CC catalyst systems.

TABLE 12

The effect of washcoat loading on OSC delay time

| Overcoat layer | Washcoat layer | Relative CO-OSC Delay Time (seconds) after thermal aging | Relative CO-OSC Delay Time (seconds) after thermal and P-aging |
|---|---|---|---|
| Reference Catalyst | | | |
| 60 g/L Rh on La—Al₂O₃ + OSM. 6 g/ft³ Rh | 180 g/L WC with 40% OSM 12 g/ft³ Pd MPC | 1.08 | 0.91 |
| 70 g/L SS Pd-IWCP OSM + 20 g/L BaCO₃ + 10 g/L La—Al₂O₃. 15 g/ft³ Pd | 150 g/L WC with 60% OSM 5 g/ft³ Pd MPC | 0.49 | 0.62 |
| 70 g/L SS Pd-IWCP OSM + 20 g/L BaCO₃ + 10 g/L La—Al₂O₃. 15 g/ft³ Pd | 180 g/L WC with 60% OSM 5 g/ft³ Pd MPC | 0.67 | 0.61 |
| 70 g/L SS Pd-IWCP OSM + 20 g/L BaCO₃ + 10 g/L La—Al₂O₃. 15 g/ft³ Pd | 210 g/L WC with 60% OSM 5 g/ft³ Pd MPC | 0.45 | 1.07 |

Example 17

Improved OSC Delay Time after Thermal and Phosphorus Aging in 20 g/ft³ Pd Only CC Catalyst by Optimizing the Partition of Pd Between the Washcoat and Overcoat Layers Table 13 shows the improved OSC as a function of Pd partitioning between the washcoat and overcoat. Partitioning the Pd between the washcoat:overcoat in a ratio of 15:5 has a beneficial impact on OSC after thermal (1000° C. for 40 hours) and phosphorus (700° C. for 2 hours) aging relative to a Pd partitioning of 10:10.

TABLE 13

The effect of Pd partitioning on OSC delay time

| Overcoat layer | Washcoat layer | CO-OSC Delay Time (seconds) |
|---|---|---|
| Reference Catalyst | | |
| 60 g/L Rh on La—$Al_2O_3$ + OSM. 6 g/ft³ Rh. | 180 g/L WC with 40% OSM 12 g/ft³ Pd MPC | 5.41 |
| 70 g/L SS Pd-IWCP OSM + 20 g/L $BaCO_3$ + 10 g/L La—$Al_2O_3$. 10 g/ft³ Pd | 180 g/L WC with 60% OSM 10 g/ft³ Pd MPC | 1.96 |
| 70 g/L SS Pd-IWCP OSM + 20 g/L $BaCO_3$ + 10 g/L La—$Al_2O_3$. 5 g/ft³ Pd | 180 g/L WC with 60% OSM 15 g/ft³ Pd MPC | 6.49 |

Example 18

Improved OSC Delay Time after Thermal and Phosphorus Aging in 20 g/ft³ Pd Only CC Catalyst by Increasing the OSM Portion of the Washcoat Table 14 shows the improved OSC delay time attributed to increasing the OSM portion of the washcoat. Comparison of catalysts with 60% OSM and 80% OSM in the washcoat shows improved OSC delay with the 80% OSM washcoat in the washcoat after thermal (1000° C. for 40 hours) and phosphorus (700° C. for 2 hours) aging.

TABLE 14

The effect of the OSM fraction present in the washcoat on OSC delay time

| Overcoat layer | Washcoat layer | CO-OSC Delay Time (seconds) |
|---|---|---|
| Reference Catalyst | | |
| 60 g/L Rh on La—$Al_2O_3$ + OSM. 6 g/ft³ Rh | 180 g/L WC with 40% OSM 12 g/ft³ Pd MPC | 5.41 |
| 70 g/L SS Pd-IWCP OSM + 20 g/L $BaCO_3$ and 10 g/L La—$Al_2O_3$. 10 g/ft³ Pd | 100 g/L WC with 60% OSM 10 g/ft³ Pd MPC | 2.72 |
| 70 g/L SS Pd-IWCP OSM + 20 g/L $BaCO_3$ and 10 g/L La—$Al_2O_3$. 10 g/ft³ Pd | 100 g/L WC with 80% OSM 10 g/ft³ Pd MPC | 3.13 |

Example 19

Generation OSM Using the High Temperature Process (HTP)

Oxygen storage materials generated using the High Temperature Process (e.g., SS Pd-HTP OSMs) contain a metal catalyst (e.g., Pd) in a solid solution ("SS") with the OSM (in this case a Ce-containing mixed metal oxide). Thus, OSMs generated using the HTP contain a metal catalyst which is evenly dispersed throughout the OSM and the surface of the OSM.

The HTP entails first mixing a Pd chemical precursor and an oxide OSM, and then spraying the mixture into a hot furnace. In a representative experiment, the SS Pd-HTP OSM was generated by 1) co-milling (30% $CeO_2$, 60% $ZrO_2$, 5% $Nd_2O_3$ and 5% $Pr_6O_{11}$) and a $Pd(NO_3)_2$; and 2) spraying the resulting mixture of into a furnace.

Example 20

SS Pd-OSMs Generated Using Different Processes Perform Similarly

Two different processes were employed to generate the SS Pd-OSMs of the present invention: 1) an Improved Wet Chemical Process (IWCP); and 2) High-Temperature Process (HTP).

The IWCP entails a process described in Example 10. The HTP entails a process described in Example 19.

Figure 27:
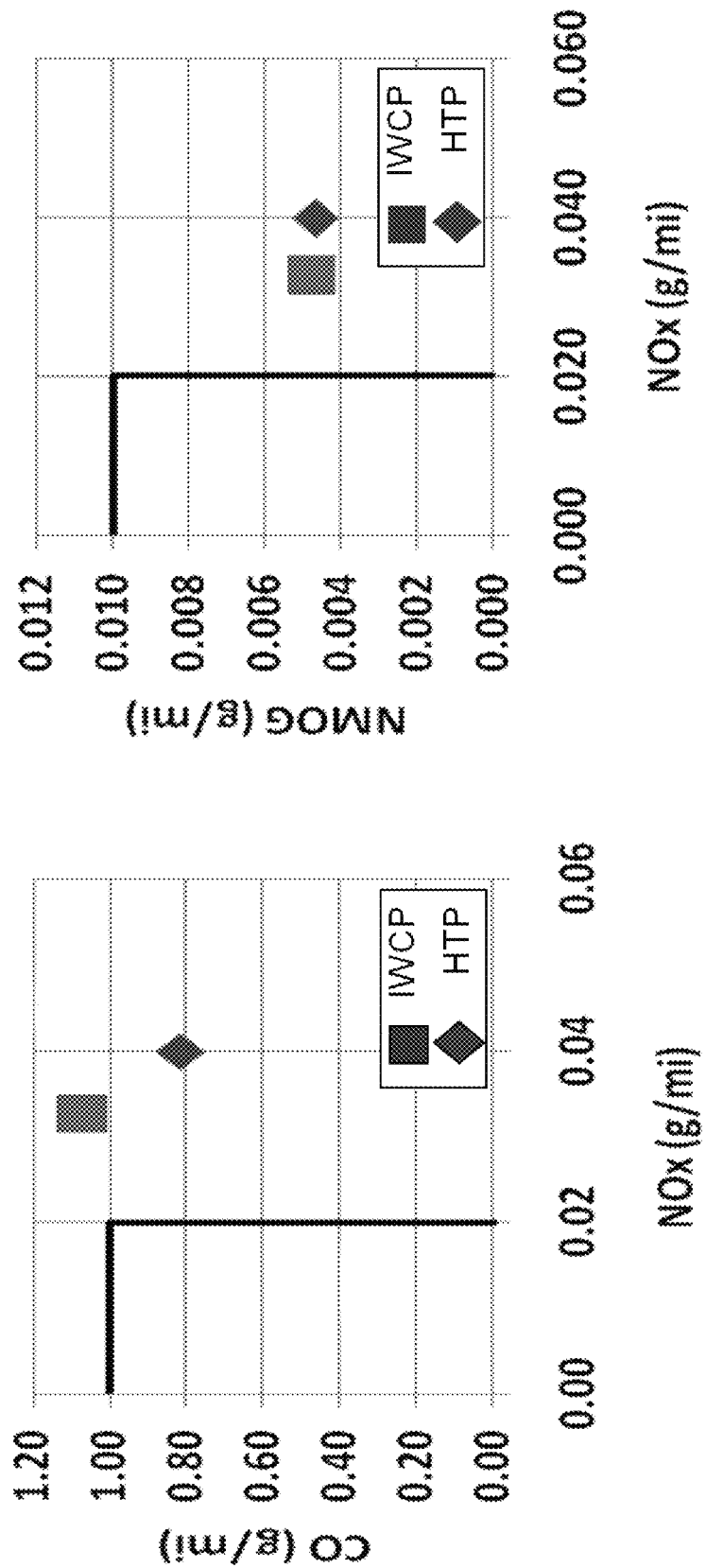
FIG. 27 shows graphs of $NO_x$ emission versus CO emission (left) and $NO_x$ emission versus hydrocarbon emission (NMOG) (right). The graphs illustrate the relative FTP performance of a close coupled catalyst (CCC) comprising a Pd-OSM solid solution made by a High Temperature Process (HTP) or the Improved Wet Chemistry Process (IWCP).

As is seen from FIG. 27, SS Pd-OSMs made from either the IWCP or the HTP process exhibit similar CO and hydrocarbon performance.

What is claimed is:

1. An oxygen storage material (OSM) comprising a metal oxide doped with at least one transition metal, wherein said transition metal and OSM are present as a solid solution, wherein said OSM is doped with about 0.5-10% of said transition metal.

2. The OSM of claim 1, wherein said OSM is a Ce-based oxygen storage material.

3. The OSM of claim 1, wherein said transition metal is selected from the group consisting of: Pd, Cu, Mn and Ni.

4. A washcoat or overcoat comprising the oxygen storage material (OSM) of claim 1.

5. A catalyst system comprising: a substrate and a washcoat,
   wherein said washcoat comprises an oxygen storage material (OSM), and
   wherein said OSM is an OSM of claim 1.

6. A catalyst system according to claim 5, which further includes an overcoat comprising a support oxide, an OSM and a metal catalyst.

7. A catalyst system according to claim 5, further comprising an overcoat,
   wherein said washcoat comprises a support oxide, an oxygen storage material (OSM) and a metal catalyst, and
   wherein said overcoat comprises an OSM.

8. The catalyst system of claim 5, wherein said washcoat comprises platinum group metal (PGM) catalyst.

9. The catalyst system of claim 5, wherein the overcoat further comprises Ca, Sr, Ba or La.

10. The catalyst system of claim 5, wherein the washcoat or overcoat comprises Pd at a concentration of about 5-100 g/ft³ and said catalyst system is substantially free of Rh.

11. An oxygen storage material (OSM) comprising a metal oxide doped with at least one transition metal, wherein said transition metal and OSM are present as a solid solution and wherein said OSM comprises one or more of:
   a. a SS Pd-IWCP OSM;
   b. 30% $CeO_2$, 60% $ZrO_2$, 5% $Nd_2O_3$ and 5% $Y_2O_3$ or (30% $CeO_2$, 60% $ZrO_2$, 5% $Nd_2O_3$ and 5% $Pr_6O_{11}$).

12. A catalyst system comprising: a substrate and a washcoat,
   wherein said washcoat comprises an oxygen storage material (OSM), and
   wherein said OSM is an OSM of claim 11.

13. The catalyst system of claim 12, wherein the washcoat or overcoat comprises Pd at a concentration of about 5-100 g/ft³ and said catalyst system is substantially free of Rh.

14. The catalyst system of claim 12, wherein the overcoat further comprises Ca, Sr, Ba or La.

15. A catalyst system comprising:
   a) an overcoat comprising an OSM and a Pd metal catalyst, wherein said OSM comprises 30% $CeO_2$, 60% $ZrO_2$, 5% $Nd_2O_3$, and 5% $Pr_6O_{11}$ (% by weight), and said overcoat comprises 5 g/ft³ of Pd; and
   b) a washcoat comprising an OSM and a Pd metal catalyst, wherein said OSM comprises 30% $CeO_2$, 60% $ZrO_2$, 5% $Nd_2O_3$ and 5% $Y_2O_3$ (% by weight), and said washcoat comprises 15 g/ft³ of Pd.

* * * * *